(12) United States Patent
Hart et al.

(10) Patent No.: US 11,906,699 B2
(45) Date of Patent: *Feb. 20, 2024

(54) INORGANIC OXIDE ARTICLES WITH THIN, DURABLE ANTI REFLECTIVE STRUCTURES

(71) Applicant: CORNING INCORPORATED, Corning, NY (US)

(72) Inventors: Shandon Dee Hart, Elmira, NY (US); Karl William Koch, III, Elmira, NY (US); Carlo Anthony Kosik Williams, Painted Post, NY (US); Lin Lin, Painted Post, NY (US); Alexandre Michel Mayolet, Corning, NY (US); James Joseph Price, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/571,616

(22) Filed: Jan. 10, 2022

(65) Prior Publication Data

US 2022/0128737 A1    Apr. 28, 2022

Related U.S. Application Data

(63) Continuation of application No. 16/541,835, filed on Aug. 15, 2019.

(Continued)

(51) Int. Cl.
*B32B 15/04* (2006.01)
*B32B 17/06* (2006.01)
(Continued)

(52) U.S. Cl.
CPC .......... *G02B 1/115* (2013.01); *C03C 17/3435* (2013.01); *C03C 2217/734* (2013.01); *C03C 2217/78* (2013.01); *C03C 2218/155* (2013.01)

(58) Field of Classification Search
CPC .................................................. C03C 2217/734
(Continued)

(56) References Cited

U.S. PATENT DOCUMENTS 3,922,068 A    11/1975  Uetsuki
3,934,961 A    1/1976   Itoh et al.
(Continued)

FOREIGN PATENT DOCUMENTS

AU    07667/73 B2    10/2003
AU    2002341016 B2    8/2008
(Continued)

OTHER PUBLICATIONS

Aissa et al; "Comparison of the structural properties and residual stress of AlN films deposited by dc magnetron sputtering and high power impulse magnetron sputtering at different working pressures." Elsevier, Thin Solid Films, 550 (2014) 264-267.
(Continued)

*Primary Examiner* — Lauren R Colgan
(74) *Attorney, Agent, or Firm* — William J. Tucker

(57) ABSTRACT

An article that includes: an inorganic oxide substrate having opposing major surfaces; and an optical film structure disposed on a first major surface of the substrate, the optical film structure comprising one or more of a silicon-containing oxide, a silicon-containing nitride and a silicon-containing oxynitride and a physical thickness from about 50 nm to less than 500 nm. The article exhibits a hardness of 8 GPa or greater measured at an indentation depth of about 100 nm or a maximum hardness of 9 GPa or greater measured over an indentation depth range from about 100 nm to about 500 nm, the hardness and the maximum hardness measured by a Berkovich Indenter Hardness Test. Further, the article exhibits a single-side photopic average reflectance that is less than 1%.

22 Claims, 10 Drawing Sheets

Related U.S. Application Data

(60) Provisional application No. 62/765,081, filed on Aug. 17, 2018.

(51) Int. Cl.
    *G02B 1/115*     (2015.01)
    *C03C 17/34*     (2006.01)

(58) Field of Classification Search
    USPC .................................. 428/426, 428, 432
    See application file for complete search history.

(56) References Cited

U.S. PATENT DOCUMENTS

| | | | |
|---|---|---|---|
| 3,989,350 | A | 11/1976 | Cohen et al. |
| 4,033,667 | A | 7/1977 | Fleming, Jr. |
| 4,137,365 | A | 1/1979 | Fletcher et al. |
| 4,298,366 | A | 11/1981 | Dabby et al. |
| 4,310,595 | A | 1/1982 | Beall et al. |
| 4,423,925 | A | 1/1984 | Dabby et al. |
| 4,495,684 | A | 1/1985 | Sander et al. |
| 4,519,966 | A | 5/1985 | Aldinger et al. |
| 4,537,814 | A | 8/1985 | Itoh et al. |
| 4,568,140 | A | 2/1986 | Van et al. |
| 4,571,519 | A | 2/1986 | Kawabata et al. |
| 4,705,356 | A | 11/1987 | Berning et al. |
| 4,826,734 | A | 5/1989 | Jackson et al. |
| 4,851,095 | A | 7/1989 | Scobey et al. |
| 4,896,928 | A | 1/1990 | Perilloux et al. |
| 4,995,684 | A | 2/1991 | Tustison et al. |
| 5,071,206 | A | 12/1991 | Hood et al. |
| 5,138,219 | A | 8/1992 | Krisl et al. |
| 5,178,911 | A | 1/1993 | Gordon et al. |
| 5,234,769 | A | 8/1993 | Shevlin |
| 5,268,217 | A | 12/1993 | Kimock et al. |
| 5,300,951 | A | 4/1994 | Yamazaki |
| 5,332,888 | A | 7/1994 | Tausch et al. |
| 5,390,274 | A | 2/1995 | Toyoda et al. |
| 5,393,574 | A | 2/1995 | Sulzbach |
| 5,478,634 | A | 12/1995 | Setoyama et al. |
| 5,503,912 | A | 4/1996 | Setoyama et al. |
| 5,506,038 | A | 4/1996 | Knapp et al. |
| 5,508,092 | A | 4/1996 | Kimock et al. |
| 5,549,953 | A | 8/1996 | Li |
| 5,567,363 | A | 10/1996 | Jung et al. |
| 5,597,622 | A | 1/1997 | Zoeller et al. |
| 5,635,245 | A | 6/1997 | Kimock et al. |
| 5,637,353 | A | 6/1997 | Kimock et al. |
| 5,643,638 | A | 7/1997 | Otto et al. |
| 5,718,773 | A | 2/1998 | Shiozaki |
| 5,719,705 | A | 2/1998 | Machol |
| 5,766,783 | A | 6/1998 | Utsumi et al. |
| 5,772,862 | A | 6/1998 | Ando et al. |
| 5,773,148 | A | 6/1998 | Charrue et al. |
| 5,811,191 | A | 9/1998 | Neuman |
| 5,846,650 | A | 12/1998 | Ko et al. |
| 5,935,716 | A | 8/1999 | McCurdy et al. |
| 5,938,898 | A | 8/1999 | Ando et al. |
| 6,045,894 | A | 4/2000 | Jonza et al. |
| 6,074,730 | A | 6/2000 | Laird et al. |
| 6,077,569 | A | 6/2000 | Knapp et al. |
| 6,088,166 | A | 7/2000 | Lee |
| 6,114,043 | A | 9/2000 | Joret |
| 6,129,980 | A | 10/2000 | Tsukada et al. |
| 6,132,650 | A | 10/2000 | Nakamura |
| 6,165,598 | A | 12/2000 | Nelson |
| 6,166,125 | A | 12/2000 | Sugiyama et al. |
| 6,172,812 | B1 | 1/2001 | Haaland et al. |
| 6,174,599 | B1 | 1/2001 | Boire et al. |
| 6,217,272 | B1 | 4/2001 | Felsenthal et al. |
| 6,238,781 | B1 | 5/2001 | Anderson et al. |
| 6,250,758 | B1 | 6/2001 | Yoshihara et al. |
| 6,267,915 | B1 | 7/2001 | Park et al. |
| 6,303,225 | B1 | 10/2001 | Veerasamy |
| 6,337,771 | B1 | 1/2002 | Chu et al. |
| 6,344,288 | B1 | 2/2002 | Oyama et al. |
| 6,355,334 | B1 | 3/2002 | Rondeau et al. |
| 6,355,344 | B1 | 3/2002 | Mamish et al. |
| 6,391,400 | B1 | 5/2002 | Russell et al. |
| 6,395,333 | B2 | 5/2002 | Veerasamy |
| 6,416,872 | B1 | 7/2002 | Maschwitz |
| 6,495,251 | B1 | 12/2002 | Arbab et al. |
| 6,503,557 | B1 | 1/2003 | Joret |
| 6,524,714 | B1 | 2/2003 | Neuman et al. |
| 6,535,333 | B1 | 3/2003 | Piepel et al. |
| 6,570,709 | B2 | 5/2003 | Katayama et al. |
| 6,572,990 | B1 | 6/2003 | Oyama et al. |
| 6,580,512 | B1 | 6/2003 | Hussey et al. |
| 6,583,935 | B1 | 6/2003 | Saif et al. |
| 6,596,368 | B1 | 7/2003 | Liebig et al. |
| 6,605,358 | B1 | 8/2003 | Stachowiak |
| 6,652,974 | B1 | 11/2003 | Krisko |
| 6,707,610 | B1 | 3/2004 | Woodard et al. |
| 6,730,352 | B2 | 5/2004 | Stachowiak |
| 6,746,775 | B1 | 6/2004 | Boire et al. |
| 6,783,253 | B2 | 8/2004 | Thomsen et al. |
| 6,785,468 | B2 | 8/2004 | Takasaki et al. |
| 6,813,096 | B2 | 11/2004 | Ohta |
| 6,838,179 | B1 | 1/2005 | Legrand |
| 6,875,468 | B2 | 4/2005 | Kunz et al. |
| 6,908,480 | B2 | 6/2005 | Jayaraman |
| 6,924,037 | B1 | 8/2005 | Joret et al. |
| 6,950,236 | B2 | 9/2005 | Hokazono et al. |
| 6,986,857 | B2 | 1/2006 | Klemm et al. |
| 6,998,177 | B2 | 2/2006 | Krzyzak et al. |
| 7,005,188 | B2 | 2/2006 | Anderson et al. |
| 7,018,727 | B2 | 3/2006 | Dzick |
| 7,055,954 | B2 | 6/2006 | Marechal |
| 7,156,533 | B2 | 1/2007 | Hoeing |
| 7,166,360 | B2 | 1/2007 | Coustet et al. |
| 7,189,456 | B2 | 3/2007 | King |
| 7,229,684 | B2 | 6/2007 | Enniss et al. |
| 7,332,213 | B2 | 2/2008 | Mimura et al. |
| 7,351,447 | B2 | 4/2008 | Nishida et al. |
| 7,378,146 | B1 | 5/2008 | Hedrick et al. |
| 7,381,469 | B2 | 6/2008 | Moelle et al. |
| 7,405,005 | B2 | 7/2008 | Watanabe |
| 7,426,328 | B2 | 9/2008 | Zhou et al. |
| 7,498,058 | B2 | 3/2009 | Harris et al. |
| 7,521,123 | B2 | 4/2009 | Hattori et al. |
| 7,541,102 | B2 | 6/2009 | Klippe et al. |
| 7,569,269 | B2 | 8/2009 | Takada et al. |
| 7,643,719 | B1 | 1/2010 | Zhou et al. |
| 7,655,298 | B2 | 2/2010 | Thies et al. |
| 7,724,241 | B2 | 5/2010 | Fukui et al. |
| 7,736,728 | B2 | 6/2010 | Loboda et al. |
| 7,736,824 | B2 | 6/2010 | Yoshikawa et al. |
| 7,910,215 | B2 | 3/2011 | Reymond et al. |
| 7,926,939 | B2 | 4/2011 | Kato et al. |
| 7,978,402 | B2 | 7/2011 | Sweeney et al. |
| 8,062,749 | B2 | 11/2011 | Shelestak et al. |
| 8,067,094 | B2 | 11/2011 | Benson et al. |
| 8,088,502 | B2 | 1/2012 | Martin et al. |
| 8,118,896 | B2 | 2/2012 | Can et al. |
| 8,187,671 | B2 | 5/2012 | Sol |
| 8,236,433 | B2 | 8/2012 | Chiu et al. |
| 8,273,801 | B2 | 9/2012 | Baikerikar et al. |
| 8,304,078 | B2 | 11/2012 | Varshneya |
| 8,312,739 | B2 | 11/2012 | Lee et al. |
| 8,360,574 | B2 | 1/2013 | Ishak et al. |
| 8,383,214 | B2 | 2/2013 | Schaepkens et al. |
| 8,400,592 | B2 | 3/2013 | Hirakata et al. |
| 8,409,716 | B2 | 4/2013 | Schultz et al. |
| 8,425,035 | B2 | 4/2013 | Von Blanckenhagen |
| 8,432,611 | B1 | 4/2013 | Wach |
| 8,445,112 | B2 | 5/2013 | Di Stefano |
| 8,446,673 | B2 | 5/2013 | Yoshihara |
| 8,460,804 | B2 | 6/2013 | Henn et al. |
| 8,508,703 | B2 | 8/2013 | Lee et al. |
| 8,561,429 | B2 | 10/2013 | Allan et al. |
| 8,568,890 | B2 | 10/2013 | Murata et al. |
| 8,679,631 | B2 | 3/2014 | Murata |
| 8,691,351 | B2 | 4/2014 | Asakura et al. |
| 8,746,880 | B2 | 6/2014 | Fukagawa et al. |

(56) References Cited

U.S. PATENT DOCUMENTS

| | | |
|---|---|---|
| 8,753,744 B2 | 6/2014 | Borrelli et al. |
| 8,784,933 B2 | 7/2014 | Krzyak et al. |
| 8,840,257 B2 | 9/2014 | Kawagishi et al. |
| 8,842,365 B2 | 9/2014 | Koike et al. |
| 8,854,623 B2 | 10/2014 | Fontaine et al. |
| 9,023,457 B2 | 5/2015 | Carrilero et al. |
| 9,041,885 B2 | 5/2015 | Weber et al. |
| 9,042,019 B2 | 5/2015 | Su et al. |
| 9,079,802 B2 | 7/2015 | Bellman et al. |
| 9,110,230 B2 | 8/2015 | Koch et al. |
| 9,249,049 B2 | 2/2016 | Fujii |
| 9,296,648 B2 | 3/2016 | Henn et al. |
| 9,335,444 B2 | 5/2016 | Hart et al. |
| 9,359,261 B2 | 6/2016 | Bellman et al. |
| 9,366,784 B2 | 6/2016 | Bellman et al. |
| 9,411,180 B2 | 8/2016 | Gollier et al. |
| 9,573,842 B2 | 2/2017 | Gollier et al. |
| 9,574,262 B2 | 2/2017 | Henn et al. |
| 9,663,400 B2 | 5/2017 | O'Malley et al. |
| 9,684,097 B2 | 6/2017 | Koch et al. |
| 9,701,579 B2 | 7/2017 | Gollier et al. |
| 9,726,786 B2 | 8/2017 | Hart et al. |
| 9,790,593 B2 | 10/2017 | Adib et al. |
| 9,957,609 B2 | 5/2018 | Lee et al. |
| 10,162,084 B2 | 12/2018 | Hart et al. |
| 10,416,352 B2 | 9/2019 | Hart et al. |
| 10,444,408 B2 | 10/2019 | Bellman et al. |
| 10,451,773 B2 | 10/2019 | Hart et al. |
| 10,921,492 B2 | 2/2021 | Gregorski et al. |
| 10,948,629 B2 * | 3/2021 | Hart .................... C03C 17/3411 |
| 11,378,719 B2 * | 7/2022 | Amin .................... G02B 1/007 |
| 11,567,237 B2 * | 1/2023 | Hart ........................ G02B 1/115 |
| 2001/0002295 A1 | 5/2001 | Anderson et al. |
| 2001/0016262 A1 | 8/2001 | Toyoshima et al. |
| 2001/0017452 A1 | 8/2001 | Bernard |
| 2001/0031365 A1 | 10/2001 | Anderson et al. |
| 2002/0009593 A1 | 1/2002 | Veerasamy |
| 2002/0017452 A1 | 2/2002 | Zimmermann et al. |
| 2002/0051274 A1 | 5/2002 | Kim et al. |
| 2002/0051294 A1 | 5/2002 | Katayama et al. |
| 2002/0136908 A1 | 9/2002 | Komatsu et al. |
| 2003/0019363 A1 | 1/2003 | Grover et al. |
| 2003/0031879 A1 | 2/2003 | Neuman et al. |
| 2003/0035044 A1 | 2/2003 | Nakayama et al. |
| 2003/0044652 A1 | 3/2003 | Wang |
| 2003/0116270 A1 | 6/2003 | Hawa et al. |
| 2003/0116872 A1 | 6/2003 | Klemm et al. |
| 2003/0179454 A1 | 9/2003 | Thomsen et al. |
| 2003/0193636 A1 | 10/2003 | Allen et al. |
| 2004/0004778 A1 | 1/2004 | Liu et al. |
| 2004/0005482 A1 | 1/2004 | Kobayashi et al. |
| 2004/0065968 A1 | 4/2004 | Klemm et al. |
| 2004/0147185 A1 | 7/2004 | Decroupet |
| 2004/0258947 A1 | 12/2004 | Moelle et al. |
| 2005/0008863 A1 | 1/2005 | Mimura et al. |
| 2005/0012569 A1 | 1/2005 | Sasaki |
| 2005/0074591 A1 | 4/2005 | Zagdoun |
| 2005/0084705 A1 | 4/2005 | Klippe et al. |
| 2005/0123772 A1 | 6/2005 | Coustet et al. |
| 2005/0196632 A1 | 9/2005 | Maschwitz et al. |
| 2005/0233091 A1 | 10/2005 | Kumar et al. |
| 2005/0263775 A1 | 12/2005 | Ikeda et al. |
| 2006/0008656 A1 | 1/2006 | Veerasamy |
| 2006/0017707 A1 | 1/2006 | Fukui et al. |
| 2006/0019119 A1 | 1/2006 | Spitsberg et al. |
| 2006/0093833 A1 | 5/2006 | Meyer et al. |
| 2006/0115651 A1 | 6/2006 | Merfeld et al. |
| 2006/0134436 A1 | 6/2006 | Maschwitz |
| 2006/0139783 A1 | 6/2006 | Decroupet |
| 2006/0154044 A1 | 7/2006 | Yamada et al. |
| 2006/0165963 A1 | 7/2006 | Fleury et al. |
| 2006/0197096 A1 | 9/2006 | Kerdiles et al. |
| 2006/0222863 A1 | 10/2006 | Nadaud et al. |
| 2006/0240266 A1 | 10/2006 | Schicht et al. |
| 2007/0018671 A1 | 1/2007 | Steck, Jr. |
| 2007/0018871 A1 | 1/2007 | Riley |
| 2007/0030569 A1 | 2/2007 | Lu et al. |
| 2007/0063147 A1 | 3/2007 | Yamazaki et al. |
| 2007/0097509 A1 | 5/2007 | Nevitt et al. |
| 2007/0128528 A1 | 6/2007 | Hess et al. |
| 2007/0146887 A1 | 6/2007 | Ikeda et al. |
| 2007/0188871 A1 * | 8/2007 | Fleury ................. C03C 17/3435 359/586 |
| 2007/0237918 A1 | 10/2007 | Jonza et al. |
| 2007/0247567 A1 | 10/2007 | Sato et al. |
| 2007/0285776 A1 | 12/2007 | Nakamura et al. |
| 2008/0024867 A1 | 1/2008 | Kawashima et al. |
| 2008/0032157 A1 | 2/2008 | Koeckert et al. |
| 2008/0239488 A1 | 10/2008 | Asakura et al. |
| 2009/0017314 A1 | 1/2009 | Nadaud et al. |
| 2009/0023254 A1 | 1/2009 | Lim et al. |
| 2009/0040440 A1 | 2/2009 | Park |
| 2009/0052041 A1 | 2/2009 | Watanabe et al. |
| 2009/0086778 A1 | 4/2009 | Kameyama et al. |
| 2009/0086783 A1 | 4/2009 | Kameyama et al. |
| 2009/0104385 A1 | 4/2009 | Reymond et al. |
| 2009/0109537 A1 | 4/2009 | Bright et al. |
| 2009/0141357 A1 | 6/2009 | Kamura et al. |
| 2009/0155490 A1 | 6/2009 | Bicker et al. |
| 2009/0195865 A1 | 8/2009 | Kleideiter et al. |
| 2009/0197048 A1 | 8/2009 | Amin et al. |
| 2009/0217968 A1 | 9/2009 | Joshi et al. |
| 2009/0223437 A1 | 9/2009 | Ballard |
| 2009/0297877 A1 | 12/2009 | Chang et al. |
| 2009/0298669 A1 | 12/2009 | Akiba et al. |
| 2009/0324844 A1 | 12/2009 | Haoto et al. |
| 2010/0009154 A1 | 1/2010 | Allan et al. |
| 2010/0027383 A1 | 2/2010 | Suzuki et al. |
| 2010/0028607 A1 | 2/2010 | Lee et al. |
| 2010/0047521 A1 | 2/2010 | Amin et al. |
| 2010/0060979 A1 | 3/2010 | Harris et al. |
| 2010/0062245 A1 | 3/2010 | Martin et al. |
| 2010/0119486 A1 | 5/2010 | Sakamoto et al. |
| 2010/0127154 A1 | 5/2010 | Kameyama |
| 2010/0177380 A1 | 7/2010 | Nagahama et al. |
| 2010/0183857 A1 | 7/2010 | Nouvelot et al. |
| 2010/0196685 A1 * | 8/2010 | Murata ................. G04B 39/006 428/448 |
| 2010/0215950 A1 | 8/2010 | Schultz et al. |
| 2010/0247745 A1 | 9/2010 | Rudmann et al. |
| 2010/0291353 A1 | 11/2010 | Dejneka et al. |
| 2010/0304090 A1 | 12/2010 | Henn et al. |
| 2010/0311868 A1 | 12/2010 | Bekiarian et al. |
| 2010/0313875 A1 | 12/2010 | Kennedy |
| 2010/0330350 A1 | 12/2010 | Osada et al. |
| 2011/0033635 A1 | 2/2011 | Nishimoto et al. |
| 2011/0033681 A1 | 2/2011 | Adachi et al. |
| 2011/0043719 A1 | 2/2011 | Thunhorst et al. |
| 2011/0100424 A1 | 5/2011 | Roche et al. |
| 2011/0114160 A1 | 5/2011 | Murashige et al. |
| 2011/0120554 A1 | 5/2011 | Chhajed et al. |
| 2011/0129287 A1 | 6/2011 | Lecoutre |
| 2011/0151173 A1 | 6/2011 | Ramadas et al. |
| 2011/0157703 A1 | 6/2011 | Broadway et al. |
| 2011/0177241 A1 | 7/2011 | Lee et al. |
| 2011/0235181 A1 | 9/2011 | Hayashibe et al. |
| 2011/0262742 A1 | 10/2011 | Takeuchi et al. |
| 2011/0262752 A1 | 10/2011 | Bawendi et al. |
| 2011/0262754 A1 | 10/2011 | Zehentmaier et al. |
| 2011/0290982 A1 | 12/2011 | Boutami et al. |
| 2011/0293929 A1 | 12/2011 | Maschwitz |
| 2011/0297979 A1 | 12/2011 | Diana et al. |
| 2012/0008217 A1 | 1/2012 | Ishak et al. |
| 2012/0027968 A1 | 2/2012 | Chang et al. |
| 2012/0040179 A1 | 2/2012 | Dave |
| 2012/0052271 A1 | 3/2012 | Gomez et al. |
| 2012/0099188 A1 | 4/2012 | Akozbek et al. |
| 2012/0099323 A1 | 4/2012 | Thompson |
| 2012/0107607 A1 | 5/2012 | Takaki et al. |
| 2012/0135153 A1 | 5/2012 | Osakabe et al. |
| 2012/0154921 A1 | 6/2012 | Yoshida et al. |
| 2012/0196103 A1 | 8/2012 | Murashige et al. |
| 2012/0212826 A1 | 8/2012 | Henn et al. |
| 2012/0219792 A1 | 8/2012 | Yamamoto et al. |

(56) References Cited

U.S. PATENT DOCUMENTS

| | | |
|---|---|---|
| 2012/0228641 A1 | 9/2012 | Thoumazet et al. |
| 2012/0235399 A1 | 9/2012 | Lochbihler |
| 2012/0247152 A1 | 10/2012 | Ohara et al. |
| 2012/0250314 A1 | 10/2012 | Maikowski et al. |
| 2012/0268809 A1 | 10/2012 | Guo et al. |
| 2012/0281292 A1 | 11/2012 | Baca et al. |
| 2012/0301676 A1 | 11/2012 | Ushida et al. |
| 2012/0321898 A1 | 12/2012 | Meinhardt et al. |
| 2012/0327568 A1 | 12/2012 | Shedletsky et al. |
| 2013/0013574 A1 | 1/2013 | Wu |
| 2013/0021669 A1 | 1/2013 | Xi et al. |
| 2013/0022798 A1 | 1/2013 | Fukawa et al. |
| 2013/0029118 A1 | 1/2013 | Kishi et al. |
| 2013/0057950 A1 | 3/2013 | Lin et al. |
| 2013/0059137 A1 | 3/2013 | Hevesi et al. |
| 2013/0120842 A1 | 5/2013 | Moens et al. |
| 2013/0128342 A1 | 5/2013 | Mitarai et al. |
| 2013/0135741 A1 | 5/2013 | Lee et al. |
| 2013/0135742 A1 | 5/2013 | Fukagawa et al. |
| 2013/0135750 A1 | 5/2013 | Walker et al. |
| 2013/0170044 A1 | 7/2013 | Mont et al. |
| 2013/0176615 A1 | 7/2013 | Uefuji et al. |
| 2013/0177751 A1 | 7/2013 | Oh et al. |
| 2013/0183489 A1 | 7/2013 | Cremer et al. |
| 2013/0187185 A1 | 7/2013 | Deshazer et al. |
| 2013/0189184 A1 | 7/2013 | Lub et al. |
| 2013/0209762 A1 | 8/2013 | Damm et al. |
| 2013/0260115 A1 | 10/2013 | Suzuki et al. |
| 2013/0263784 A1 | 10/2013 | Lee et al. |
| 2013/0271836 A1 | 10/2013 | Fukaya et al. |
| 2013/0322270 A1 | 12/2013 | Ko |
| 2013/0334031 A1 | 12/2013 | Lee et al. |
| 2014/0022630 A1 | 1/2014 | Reymond et al. |
| 2014/0036175 A1 | 2/2014 | Morishima et al. |
| 2014/0049827 A1 | 2/2014 | Fujii et al. |
| 2014/0087101 A1 | 3/2014 | Tixhon et al. |
| 2014/0090864 A1 | 4/2014 | Paulson |
| 2014/0090974 A1 | 4/2014 | Ballet et al. |
| 2014/0091419 A1 | 4/2014 | Hasegawa et al. |
| 2014/0093711 A1 | 4/2014 | Paulson |
| 2014/0106141 A1 | 4/2014 | Bellman et al. |
| 2014/0106146 A1 | 4/2014 | Decker et al. |
| 2014/0106150 A1 | 4/2014 | Decker et al. |
| 2014/0111859 A1 | 4/2014 | Duraes et al. |
| 2014/0113083 A1 | 4/2014 | Lee et al. |
| 2014/0113120 A1 | 4/2014 | Thiel |
| 2014/0139978 A1 | 5/2014 | Kwong |
| 2014/0170765 A1 | 6/2014 | Ockenfuss |
| 2014/0174532 A1 | 6/2014 | Stewart et al. |
| 2014/0186615 A1 | 7/2014 | An et al. |
| 2014/0220327 A1 | 8/2014 | Adib et al. |
| 2014/0226208 A1 | 8/2014 | Vikor |
| 2014/0233104 A1 | 8/2014 | Nagahama et al. |
| 2014/0233106 A1 | 8/2014 | Vergoehl et al. |
| 2014/0247415 A1 | 9/2014 | Kleptsyn |
| 2014/0255616 A1 | 9/2014 | Paulson |
| 2014/0261615 A1 | 9/2014 | Nair et al. |
| 2014/0264321 A1 | 9/2014 | Liang et al. |
| 2014/0295330 A1 | 10/2014 | Pruneri et al. |
| 2014/0320806 A1 | 10/2014 | Cohen-Tannoudji et al. |
| 2014/0334006 A1 | 11/2014 | Adib et al. |
| 2014/0335330 A1 | 11/2014 | Bellman et al. |
| 2014/0347722 A1 | 11/2014 | Hevesi |
| 2014/0353618 A1 | 12/2014 | Shim et al. |
| 2014/0362444 A1 | 12/2014 | Paulson |
| 2014/0368029 A1 | 12/2014 | Park |
| 2014/0370264 A1 | 12/2014 | Ohara et al. |
| 2014/0376094 A1* | 12/2014 | Bellman .................. G02B 1/10 428/428 |
| 2014/0377522 A1 | 12/2014 | Koch et al. |
| 2015/0002809 A1 | 1/2015 | Cohen-Tannoudji et al. |
| 2015/0037554 A1 | 2/2015 | Gao et al. |
| 2015/0043058 A1 | 2/2015 | Saito |
| 2015/0062695 A1 | 3/2015 | Chu et al. |
| 2015/0062710 A1 | 3/2015 | Grillmayer et al. |
| 2015/0079398 A1 | 3/2015 | Amin et al. |
| 2015/0083464 A1 | 3/2015 | Zilbauer et al. |
| 2015/0116832 A1 | 4/2015 | Kamiuto et al. |
| 2015/0212245 A1 | 7/2015 | Ueda |
| 2015/0219798 A1 | 8/2015 | Sonoda et al. |
| 2015/0260888 A1 | 9/2015 | Yoshihara et al. |
| 2015/0284840 A1 | 10/2015 | Henn et al. |
| 2015/0293284 A1 | 10/2015 | Tatemura |
| 2015/0322270 A1* | 11/2015 | Amin .................. C03C 21/002 428/141 |
| 2015/0323705 A1 | 11/2015 | Hart et al. |
| 2015/0346403 A1 | 12/2015 | Jidai et al. |
| 2015/0355382 A1 | 12/2015 | Henn et al. |
| 2015/0376057 A1 | 12/2015 | Koch et al. |
| 2016/0011348 A1 | 1/2016 | Hirakoso et al. |
| 2016/0018576 A1 | 1/2016 | Yamamoto et al. |
| 2016/0076135 A1 | 3/2016 | Cheah et al. |
| 2016/0083835 A1 | 3/2016 | Adib et al. |
| 2016/0372532 A1 | 12/2016 | Song et al. |
| 2017/0075039 A1 | 3/2017 | Hart et al. |
| 2017/0087144 A1 | 3/2017 | Rowe et al. |
| 2017/0184762 A1 | 6/2017 | Fujii et al. |
| 2017/0199307 A1 | 7/2017 | Hart et al. |
| 2017/0317217 A1 | 11/2017 | Ito et al. |
| 2017/0355172 A1 | 12/2017 | Paulson |
| 2017/0369992 A1 | 12/2017 | Adib et al. |
| 2018/0321425 A1* | 11/2018 | Hart .................. C03C 17/3435 |
| 2018/0372919 A1 | 12/2018 | Suzuki et al. |
| 2019/0077352 A1 | 3/2019 | Bhatia et al. |
| 2020/0057177 A1 | 2/2020 | Hart et al. |
| 2023/0010461 A1* | 1/2023 | Hart .................. G02B 1/115 |

FOREIGN PATENT DOCUMENTS

| | | |
|---|---|---|
| CA | 2141536 A1 | 2/1994 |
| CN | 1134555 A | 10/1996 |
| CN | 1423682 A | 6/2003 |
| CN | 1575970 A | 2/2005 |
| CN | 1688904 A | 10/2005 |
| CN | 1703631 A | 11/2005 |
| CN | 101019043 A | 8/2007 |
| CN | 101044266 A | 9/2007 |
| CN | 100360449 C | 1/2008 |
| CN | 101236264 A | 8/2008 |
| CN | 101295030 A | 10/2008 |
| CN | 101349769 A | 1/2009 |
| CN | 101356455 A | 1/2009 |
| CN | 101400619 A | 4/2009 |
| CN | 101639663 A | 2/2010 |
| CN | 101724812 A | 6/2010 |
| CN | 101734867 A | 6/2010 |
| CN | 101809512 A | 8/2010 |
| CN | 101939266 A | 1/2011 |
| CN | 102016962 A | 4/2011 |
| CN | 102278833 A | 12/2011 |
| CN | 102470637 A | 5/2012 |
| CN | 102574736 A | 7/2012 |
| CN | 102681042 A | 9/2012 |
| CN | 102736136 A | 10/2012 |
| CN | 202661651 U | 1/2013 |
| CN | 102934010 A | 2/2013 |
| CN | 102967947 A | 3/2013 |
| CN | 103011618 A | 4/2013 |
| CN | 103068764 A | 4/2013 |
| CN | 103073196 A | 5/2013 |
| CN | 103395247 A | 11/2013 |
| CN | 103492173 A | 1/2014 |
| CN | 103499852 A | 1/2014 |
| CN | 103508678 A | 1/2014 |
| CN | 103707578 A | 4/2014 |
| CN | 103902122 A | 7/2014 |
| CN | 104040016 A | 9/2014 |
| CN | 104422971 A | 3/2015 |
| CN | 104553126 A | 4/2015 |
| CN | 105142900 A | 12/2015 |
| CN | 105593705 A | 5/2016 |
| CN | 105764866 A | 7/2016 |
| CN | 105848883 A | 8/2016 |
| CN | 106604900 A | 4/2017 |

(56) References Cited

FOREIGN PATENT DOCUMENTS

| | | |
|---|---|---|
| CN | 107076874 A | 8/2017 |
| CN | 107735697 A | 2/2018 |
| CN | 108585479 A | 9/2018 |
| DE | 102014104798 A1 | 10/2015 |
| DE | 102015114877 A1 | 3/2017 |
| EP | 0566271 A2 | 10/1993 |
| EP | 0592986 A1 | 4/1994 |
| EP | 2149540 A1 | 2/2010 |
| EP | 2196870 A1 | 6/2010 |
| EP | 1289898 B1 | 8/2012 |
| EP | 2328818 B1 | 12/2012 |
| EP | 1490715 B1 | 1/2013 |
| EP | 2628818 A1 | 8/2013 |
| EP | 2711744 A1 | 3/2014 |
| GB | 1517585 A | 7/1978 |
| JP | 63-238260 A | 10/1988 |
| JP | 63-265846 A | 11/1988 |
| JP | 04-250834 A | 9/1992 |
| JP | 07-035267 B2 | 4/1995 |
| JP | 09-068602 A | 3/1997 |
| JP | 10-000009 A | 1/1998 |
| JP | 11-311702 A | 11/1999 |
| JP | 2974879 B2 | 11/1999 |
| JP | 2000-171601 A | 6/2000 |
| JP | 2000-171605 A | 6/2000 |
| JP | 2000-214302 A | 8/2000 |
| JP | 2001-511539 A | 8/2001 |
| JP | 2001-303246 A | 10/2001 |
| JP | 2002-116303 A | 4/2002 |
| JP | 2002-174810 A | 6/2002 |
| JP | 2002-267835 A | 9/2002 |
| JP | 2003-514746 A | 4/2003 |
| JP | 2003-131011 A | 5/2003 |
| JP | 2003-236970 A | 8/2003 |
| JP | 2003-266607 A | 9/2003 |
| JP | 2003-285343 A | 10/2003 |
| JP | 2004-138662 A | 5/2004 |
| JP | 2004-163549 A | 6/2004 |
| JP | 2004-526605 A | 9/2004 |
| JP | 2005-114649 A | 4/2005 |
| JP | 2005-219223 A | 8/2005 |
| JP | 2005-274527 A | 10/2005 |
| JP | 2006-079067 A | 3/2006 |
| JP | 2006-116754 A | 5/2006 |
| JP | 2006-208726 A | 8/2006 |
| JP | 2007-099557 A | 4/2007 |
| JP | 2007-156017 A | 6/2007 |
| JP | 2007-213021 A | 8/2007 |
| JP | 2007-527328 A | 9/2007 |
| JP | 2007-271958 A | 10/2007 |
| JP | 2008-032949 A | 2/2008 |
| JP | 2008-033348 A | 2/2008 |
| JP | 2008-133535 A | 6/2008 |
| JP | 2008-524030 A | 7/2008 |
| JP | 2008-242425 A | 10/2008 |
| JP | 2008-247732 A | 10/2008 |
| JP | 4250834 B2 | 4/2009 |
| JP | 2009-109850 A | 5/2009 |
| JP | 2009-116218 A | 5/2009 |
| JP | 2009-116219 A | 5/2009 |
| JP | 2009-116220 A | 5/2009 |
| JP | 2009-529715 A | 8/2009 |
| JP | 2009-199022 A | 9/2009 |
| JP | 2009-204506 A | 9/2009 |
| JP | 2009-265601 A | 11/2009 |
| JP | 2010-037115 A | 2/2010 |
| JP | 4421142 B2 | 2/2010 |
| JP | 2010-202514 A | 9/2010 |
| JP | 2011-017782 A | 1/2011 |
| JP | 4612827 B2 | 1/2011 |
| JP | 2011-057547 A | 3/2011 |
| JP | 2011-093728 A | 5/2011 |
| JP | 4707656 B2 | 6/2011 |
| JP | 2011-133800 A | 7/2011 |
| JP | 2011-134464 A | 7/2011 |
| JP | 2011-150821 A | 8/2011 |
| JP | 4765069 B2 | 9/2011 |
| JP | 4790396 B2 | 10/2011 |
| JP | 2011-237789 A | 11/2011 |
| JP | 2012-171866 A | 9/2012 |
| JP | 2012-189760 A | 10/2012 |
| JP | 2012-194546 A | 10/2012 |
| JP | 2012-203187 A | 10/2012 |
| JP | 2012-230290 A | 11/2012 |
| JP | 2013-025318 A | 2/2013 |
| JP | 2013-097356 A | 5/2013 |
| JP | 2013-122516 A | 6/2013 |
| JP | 2013-142817 A | 7/2013 |
| JP | 2013-205634 A | 10/2013 |
| JP | 2013-224964 A | 10/2013 |
| JP | 2013-252992 A | 12/2013 |
| JP | 2013-258209 A | 12/2013 |
| JP | 2014-056215 A | 3/2014 |
| JP | 2014-081522 A | 5/2014 |
| JP | 2014-194530 A | 10/2014 |
| JP | 2015-058605 A | 3/2015 |
| JP | 2015-058606 A | 3/2015 |
| JP | 2015-506895 A | 3/2015 |
| JP | 2015-068944 A | 4/2015 |
| JP | 2015-535804 A | 12/2015 |
| JP | 2015-536892 A | 12/2015 |
| JP | 2016-530194 A | 9/2016 |
| JP | 2016-531330 A | 10/2016 |
| JP | 2016-534962 A | 11/2016 |
| JP | 2017-515780 A | 6/2017 |
| JP | 2017-523310 A | 8/2017 |
| JP | 2018-010275 A | 1/2018 |
| KR | 10-2008-0102154 A | 11/2008 |
| KR | 10-2011-0054057 A | 5/2011 |
| KR | 10-1103041 B1 | 1/2012 |
| KR | 10-1194257 B1 | 10/2012 |
| KR | 10-2013-0031689 A | 3/2013 |
| KR | 2013-0031689 | 3/2013 |
| KR | 10-2014-0034172 A | 3/2014 |
| KR | 10-2015-0045476 A | 4/2015 |
| TW | I245919 B | 12/2005 |
| TW | 200600824 A | 1/2006 |
| TW | 201335090 A | 9/2013 |
| TW | 201500757 A | 1/2015 |
| TW | 201520585 A | 6/2015 |
| TW | 201815720 A | 5/2018 |
| WO | 97/13003 A2 | 4/1997 |
| WO | 98/37254 A2 | 8/1998 |
| WO | 00/37384 A1 | 6/2000 |
| WO | 02/42834 A2 | 5/2002 |
| WO | 02/42843 A2 | 5/2002 |
| WO | 2006/066101 A2 | 6/2006 |
| WO | 2006/099765 A1 | 9/2006 |
| WO | 2008/108332 A1 | 9/2008 |
| WO | 2009/041528 A1 | 4/2009 |
| WO | 2012/043341 A1 | 4/2012 |
| WO | 2012/144499 A1 | 10/2012 |
| WO | 2012/157719 A1 | 11/2012 |
| WO | 2013/001023 A1 | 1/2013 |
| WO | 2013/082477 A2 | 6/2013 |
| WO | 2013/082488 A2 | 6/2013 |
| WO | 2013/088856 A1 | 6/2013 |
| WO | 2013/098641 A2 | 7/2013 |
| WO | 2013/160233 A1 | 10/2013 |
| WO | 2014/041257 A1 | 3/2014 |
| WO | 2014/055489 A1 | 4/2014 |
| WO | 2014/167293 A1 | 10/2014 |
| WO | 2014/182639 A1 | 11/2014 |
| WO | 2014/182640 A1 | 11/2014 |
| WO | 2014/182693 A1 | 11/2014 |
| WO | 2015/000534 A1 | 1/2015 |
| WO | 2015/009377 A1 | 1/2015 |
| WO | 2015/031428 A2 | 3/2015 |
| WO | 2015/041257 A1 | 3/2015 |
| WO | 2015/070254 A1 | 5/2015 |
| WO | 2015/076914 A1 | 5/2015 |
| WO | 2015/085283 A1 | 6/2015 |
| WO | 2015/142837 A1 | 9/2015 |
| WO | 2015/175390 A1 | 11/2015 |

(56) References Cited

FOREIGN PATENT DOCUMENTS

| WO | 2015/179739 A1 | 11/2015 |
|---|---|---|
| WO | 2016/018490 A1 | 2/2016 |
| WO | 2016/118462 A2 | 7/2016 |
| WO | 2018/125676 A1 | 7/2018 |
| WO | 2022/125846 A1 | 6/2022 |

OTHER PUBLICATIONS

Assouar et al; "Study of Acoustical and Optical Properties of AlN Films for SAW and BAW Devices: Correlation Between These Properties." Integrated Ferroelectrics, 82: 45-54, 2006.
Baek et al; "Correlations between optical properties, microstructure, and processing conditions of Aluminum nitride thin films fabricated by pulsed laser deposition." Elsevier, Thin Solid Films 515 (2007) 7096-7104.
Bitierlich et al; "Particle-reinforced SiAlONs for Cutting Tools." Materials Science Forum vol. 554 (2007) pp. 129-134.
Boichot et al; "Epitaxial growth of AlN on c-plane sapphire by High Temperature Hydride Vapor Phase Epitaxy: Incluence of the gas phase NlAi ratio and low temperature protective layer." Elsevier, Surface & Coatings Technology 237 (2013) 118-125.
Borges et al "Optical Properties of AlNxOy Thin Films Deposited by DC Magnetron Sputtering." Proceedings of SPIE, 2011.
Caceres and Prieto, "Mechanical properties of sputtered silicon notride thin films", Journal of Applied Physics 94(12) 2003, pp. 7868-7873.
Caliendo et al; "Structural, optical, and acoustic characterization of high-quality AlN thick films sputtered on Al203 (001) at temperature for GHz band electroacoustic devices applications." Journal of Applied Physics 96, No. 5, 2610 (2004).
Carniero et al. "Hardness Evaluation of Nanolayered PVD Coatings Using Nanoindenlalion", Rev. Adv. Maler. Sci., 2014 p. 83-90.
Chan et al; "Fracture Toughness Improvements of Dental Ceramic Through Use of Ytiria-Stabilized Zirconia (YSZ) Thin-Film Coating"; Dental Materials, 29 (2013) pp. 881-887.
Chang et al. "Characteristics of Si—C—N films deposited by microwave plasma CVD on Si wafers with various buffer layer materials", Diamond and Related Material, 2001, vol. 10, pp. 1910-1915 (Year: 2001).
Chen et al; "Optical Reflectance of Bulk AlN Crystals and AlN Epitaxial Films." AIP Conference Proceedings, 772, 297-298, 2005.
Chen et al; "Thickness-dependent structural transformation in the AlN film." Elsevier, Acta Materialia 53 (2005) 5223-5227.
Chi et. al. "Cracking in coating-substrate composites with multi-layered and FGM coatings," Engineering Fracture Mechanics 70 (2003) p. 1227.
Corbin et al; Aluminum Oxynitride Spinel (ALON): A Review, Jul. 1987. Journal of the European Ceramic Society vol. 5, Issue 3, 1989, pp. 143-154.
Corning, "Corning Gorilla Glass 5," Product Info Sheet, 2 pgs, 2016, retrieved from: https://www.corning.com/microsites/csm/gorillaglass/PI_sheets/Corning%20Gorilla%2-Glass%205%2005%20Sheet.pdf.
Corning, Corning Eagle XG AMLCD Glass Substrates Material Information, MIE 301, Issued: Jan. 2006, pp. 1-3.
Corning, Corning Eagle2000 Glass, Materials Information, Revised Aug. 2000, 5 Pgs.
Corning, Corning Gorilla Glass for Large Cover Glass Applications, 2013, 3 Pgs.
Danylyuk, et al., "Optical and Electrical Properties of Al 1-x InxN Films Grown on Sapphire (0001) by Plasma Source Molecular Beam Epitaxy." Mat. Res. Soc. Symp., vol. 639, 2001.
Easwarakhanthan et al; "Spectroellipsometric investigation of optical, morphological, and structural properties of reactively sputtered polycrystalline AlN films." J_ Vac. Sci. Technology A 28 (3), pp. 495-501, May/Jun. 2010.

Fischer-Cripps; "Critical Review of Analysis and Interpretation of Nanoindentation Test Data"; Surface & Coatings Technology 200 (2006) pp. 4153-4165.
Fraunhofer IWS, Available online at <https://www.iws.fraunhofer.de/content/dam/iws/en/documents/publications/product_sheets/200-1a_large_en.pdf>, retrieved in 2020, 1 page.
Gazda et al; "Formation of ALN films on Ti/TiN Arc-Layer Interface with Al-0.5% Cu Interconects evaluated by XPS and Energy-filtered-TEM." Mat. Res. Soc. Symp. Proc. vol. 589, 365-370, 2001.
General Plasma Inc., "Introducing disruptive large area Coating technology for the 21st century", Available online at https://web.archive.org/web/20140704064921/http://generalplasma.com/products/large-area-pecvd/, retrieved on 2014, 1 page.
Godeker et al., "Antireflection coating for sapphire with consideratino of mechanical properties", Surface & Cotings Technology, 241 (2014) 59-63.
Goldman et al., "Scale Up of Large ALON Windows", Window and Dome Technologies and Materials XIII, edited by Randal W. Tustison, Brian J. Zelinski, Proc. of SPIE vol. 8708, 870804 (Jun. 4, 2013).
Hajakbari et al; "Optical Properties of Amorphous AlN Thin Films on Glass and Silicon Substrates Grown by Single Ion Beam Sputtering." Jpn. J. Appl. Phys. 49, 095802 (2010).
Harding et al; "Cracking During Indentation and Its Use in the Measurement of Fracture Toughness"; Mat. Res. Soc. Symp. Proc.; vol. 356, 1995, pp. 663-668.
Hay et al; "Continuous Stiffness Measurement During Instrumented Indentation Testing"; Experimental Techniques; May/Jun. 2010; pp. 86-94.
Hirai et al; "Formation of Aluminum Nitride by CartJothermic Reduction of Alumina in a Flowing Nitrogen Atmosphere." Nippon Kinzoku Gakkaishi (1989, 53 (10), 1035-40.
Hu et al; "Dynamic Fracturing of Strengthened Glass Under Biaxial Tensile Loading"; Journal of Non-Crystalline Solids; 405 (2014); pp. 153-158.
Huang et al; "Effect of deposition conditions on mechanical properties of low-temperature PECVD silicon nitride films"; Materials Science and Engineering A 435-436 (2006) 453-459.
Huang et al; "Effects of Substrate Temperature on Aluminum Nitride Films by Reactive Magnetron Sputtering." Xiyou Jinshu, 35 (5), pp. 715-718, 2011.
I.V. Afanasyev-Charkin et al. "Hard Si—N—C films with a tunable band gap produced by pulsed glow discharge deposition", Surface & Coatings Technology, 1999, pp. 38-42. (Year: 1999).
Inkin et al; "Properties of aluminium nitride coaling obtained by vacuum arc discharge method with plasma flow separation." Elsevier, Diamond and Related Materials, 10 (2001) 1314-1316.
Ishiguro et al "Solar Light Absorption Property of Sputtered Al—N Films with Enhanced Surface Roughness during Film Growth." Jpn. J. Appl. Phys. vol. 41 (2002) pp. 292-300.
Kitiel, "Introduction to Solid State Physics." Seventh Edition, John Wiley & Sons, Inc., NY, 1996, pp. 611-627.
Krupitskaya, Auner. "Optical Charactization of Inn Films Grown by Plasma Source Molecular Beam Epitaxy." Journal of Applied Physices 84, 2861-2865, 1998.
Li et al, "Low-temperature magnetron sputter deposition, hardness and electrical resistivity of amorphous and crystalline alumina thin films" Journal of Vacuum Science & Technology A 18, 2333 (2000).
Liaoning Provincial Popular Science Writers Association, "High Technology Around Your Life", Popular Science Press, p. 217, Oct. 1992 (English Translation Attached.
Madocks et al Durable Neutral Color Anti-Reflective Coating for Mobile Displays; SVC Bulletin Fall 2014 3 pages.
Mania "Magnetron Sputtering for Deposition of Aluminum Nitride Thin Films." Prace Komisji Nauk Ceramiczynych, 54, 429-433, 1997.
Martinet er al; "Deposition of SiO2 and TiO2 thin films by plasma enhanced chemical vapors deposition for antireflection coating", J_ Non-Crystalline Solids; 216 (1997) 77-82.
McCauley, et al, "AlON: A brief history of its emergence and evolution." Journal of the European Ceramic Society 29 (2009), 223-236.

(56) References Cited

OTHER PUBLICATIONS

Moghal et al., "Nanomechanical study of thin film nanocomposite and PVD thin films on polymer substrate for optical applications", J_ Phys. D: Appl. Phys. 46 (2013).
Moore; "Gradient Index Optics: A Review," Applied Optics, vol. 19, No. 7, Apr. 1, 1980, pp. 1035-1038.
Oliver et al. "An improved technique for determining hardness and elastic modulus using load and displacement sensing indentation experiments". J_ Mater. Res., vol. 7, No. 6, 1992, 1564-1583.
Oliver et al. "Measurement of Hardness and Elastic Modulus by Instrument Indentation: Advances in Understanding and Refinements to Methodology". J_ Mater. Res., vol. 19, No. 1, 2004, 3-20.
Pantano; "Al2O3 Coating by Atomic Layer Deposition (ALD) on various glass substrates for Surface Strength Improvement" The 23rd International Congress on Glass, Jul. 1-5, 2013. 3 pgs.
Paradis, Suzanne, Characterization and optimization of SiO2 and Si3N4 thin films. 2013, Defence Research and Development Canada (Year: 2013).
Park et al; "Atomic Layer Deposition of Yttria-Stabilized Zirconia Thin Films for Enhanced Reactivity and Stability of Solid Oxide Fuel Cells"; Energy; vol. 116; (2016); pp. 170-176.
Portinha et al., "Hard Zr02/Al2O3 nanolamianted PVD coatings evaluated by nanoindentation", Surface & Coatings Technology 200 (2005) 765-768.
Reinhold et al; "Plasma Nitriding of Aluminum Alloys." Proceedings of the 1st International Automotive Heat Treating Conference. Jul. 13-15, 1998. pp. 213-220.
Ruddell et al; "The Effect of Deposition Parameters on the Properties of Yttria-Stabilzed Zrconia Thin Films"; Thin Solid Films, 445 (2003) pp. 14-19.
Savage; "Preparation and properties of hard crystalline materials for optical applications—a review." Journal of Crystal Growth 113 (1991) 698-715.
Schroter et al; "X-ray pholoelectron diffraction on SiC and AlN epitaxial films: polytype structure and polarity." Elsevier, Journal of Electron Spectroscopy and Related Phenomena. 114-116 (2001) 443-450.
Shackelford, Introduction to Materials Science for Engineers, Sixth Edition, Pearson Prentice Hall, New Jersey, 2005, pp. 404-418.
Singh et al; "Structural and optical properties of RF magnetron sputtered aluminium nitride films without external substrate healing." Elsevier, Applied Surface Sceince 257 (2011) 9568-9573.
Smart and Moore; "Solid State Chemistry, an Introduction," Chapman & Hall University and Professional Division, London, 1992, pp. 136-151.
Sonderby et al; "Deposition of Yttria-Stabilized Zirconia Thin Films by High Power Impulse Magnetron Sputiering and Pulsed Magnetron Sputiering"; Surface & Coatings Technology; 240; (2014) pp. 1-6.
Southwell; "Coating design using very thin high- and low-index layers," Applied Optics, vol. 24, Issue 4, pp. 457-460 (1985).
Tang et al. "Optical, structural, and mechanical properties of silicon oxyynitride films sputtering by pulsed magnetron sputtering," Applied Optics 56(4) 2016, pp. C168-C174.
Tsui, et al., "Effects of Adhesion on the Measurement of Thin Film Mechanical Properties by Nanoindenlalion." Mal. Res. Soc. Symp. Proc. vol. 473 1997.
Wang et al. "Tribological and optical properties of crystalline and amorphous alumina thin films grown by low iemperature reactive magnetron sputter-deposition", Surface and coatings technology, 146-147 (2001) pp. 189-194.
Wang et al; "Roughness Improvement and Hardness Enhancement in Nanoscale Al/AlN Multilayered Thin Films." Applied Physics Letters vol. 71, No. 14, 1951-1953, Oct. 6, 1997.
Wang et al; "Study of ALON and CRON films deposited by arc ion plating as diffusion barriers." Jinshu Xuebao (2004), 40, 1, 83-87.
Wang et al; "Towards Hard Yet Touch Ceramic Coatings", Surface & Coatings Technology; 258 (2014) pp. 1-16.
Watanabe et al; "Surface Oxidation of Aluminum Nitride Thin Films." Surface Modification Technologies XIII, Edited by Sudarshan, Khor, Jeandin, ASM International, Materials Park, Ohio, 1999. pp. 209-215.
Wen et al. "The AlN layer thickness dependent coherent epitaxial growth, stress and hardness in NbN/AlN nanostructured multi-layer films." Surface and Coatings Technology 235 (2013) 367-375.
Xi et al; "The Preparation and Optical properties of AlN Thin Films." Diwen Wuli Xuebao (2012), 34)6), 467-470.
XS Miao and YC Chan. "Optical Properties and Reactive Sputtering Conditions of AlN and AlSiN Thin Films for Magneto-Optical Applications." Journal of Electronic Materials, vol. 26, No. 1, 1997.
Xu et al. "Chemical control of physical properties in silicon nitride films", Applied Physics A: Materials Science & Processing, 2012, vol. III, pp. 867-876. (Year: 2012).
Yamamoto et al; "Manufacture of IR-Reflecling Bent Plate Glass." Jpn. Kokai Tokkyo Koho, 1988.
Yamashita et al. "Preparation and Properties of AlON-SiAlON Composites." Journal of the Ceramic Society of Japan 109, pp. 434-439, 2001.
Yan et al; "The Preparation and Properties ofY2O3/AlN Anti-Reflection Films on Chemical Vapor Deposition Diamond." Elsevier, Thin Solid Films, 520, pp. 734-738, 2011.
Yang et al; "Preparation and Properties of AlN Thin Films by Pure Nitrogen Reactive Sputtering." Rengong Jingti Kuebao, 39 (1), pp. 190-196, 2010.
Yang et al; "Preparation and Properties of C-Axis Preferred Orientation AlN Thin Films by Pure Nitrogen Reactive Sputtering." Xianjiang Daxue Xuebao, Ziran Kexueban, 26 (4), pp. 444-449, 2009.
Yun et al.. "Optical and Structural Investigation of AlN Grown on Sapphire with Reactive MBE Using RF Nitrogen or Ammonia." Mat. Res. Soc. Symp. Proc., vol. 764, 2003.
Zabinski et al "Stoichiometry and characterization of aluminium oxynitride thin films grown by ion-beam assisted pulsed laser deposition." Elsevier, Thin Solid Films, 516, pp. 6215-6219, 2008.
Zayats et al; "Optical Studies of AlN/n-Si(100) Films Obtained by the Method of High-Frequency Magnetron Sputtering." Semiconductors, 2008, vol. 42 No. 2 , pp. 195-198.
International Search Report and Written Opinion of the International Searching Authority; PCT/US2022/034624; dated Oct. 25, 2022; 11 pages; European Patent Office.

* cited by examiner

INORGANIC OXIDE ARTICLES WITH THIN, DURABLE ANTI REFLECTIVE STRUCTURES

CROSS-REFERENCE TO RELATED APPLICATIONS

This application is a continuation application of U.S. application Ser. No. 16/541,835, filed Aug. 15, 2019, now U.S. Pat. No. 11,567,237, which claims the benefit of priority under 35 U.S.C. § 119(e) of U.S. Provisional Application No. 62/765,081, filed on Aug. 17, 2018, the contents of which are relied upon and incorporated herein by reference in its entirety.

BACKGROUND

The disclosure relates to inorganic oxide articles with thin, durable anti-reflective structures and methods for making the same, and more particularly to articles with thin, multi-layer anti-reflective coatings.

Cover articles are often used to protect devices within electronic products, to provide a user interface for input and/or display, and/or for many other functions. Such products include mobile devices, for example smart phones, smart watches, mp3 players and computer tablets. Cover articles also include architectural articles, transportation articles (e.g., interior and exterior display and non-display articles used in automotive applications, trains, aircraft, sea craft, etc.), appliance articles, or any article that may benefit from some transparency, scratch-resistance, abrasion resistance or a combination thereof. These applications often demand scratch-resistance and strong optical performance characteristics, in terms of maximum light transmittance and minimum reflectance. Furthermore, for some cover applications it is beneficial that the color exhibited or perceived, in reflection and/or transmission, does not change appreciably as the viewing angle is changed. In display applications, this is because, if the color in reflection or transmission changes with viewing angle to an appreciable degree, the user of the product will perceive a change in color or brightness of the display, which can diminish the perceived quality of the display. In other applications, changes in color may negatively impact the aesthetic appearance or other functional aspects of the device.

These display and non-display articles are often used in applications (e.g., mobile devices) with packaging constraints. In particular, many of these applications can significantly benefit from reductions in overall thickness, even reductions of a few percent. In addition, many of the applications that employ such display and non-display articles benefit from low manufacturing cost, e.g., through the minimization of raw material costs, minimization of process complexity and yield improvements. Smaller packaging with optical and mechanical property performance attributes comparable to existing display and non-display articles can also serve the desire for reduced manufacturing cost (e.g., through less raw material costs, through reductions in the number of layers in an anti-reflective structure, etc.).

The optical performance of cover articles can be improved by using various anti-reflective coatings; however, known anti-reflective coatings are susceptible to wear or abrasion. Such abrasion can compromise any optical performance improvements achieved by the anti-reflective coating. For example, optical filters are often made from multilayer coatings having differing refractive indices and made from optically transparent dielectric material (e.g., oxides, nitrides, and fluorides). Most of the typical oxides used for such optical filters are wide band-gap materials, which do not have the requisite mechanical properties, for example hardness, for use in mobile devices, architectural articles, transportation articles or appliance articles. Most nitrides and diamond-like coatings may exhibit high hardness values, which can be correlated to improved abrasion resistance, but such materials do not exhibit the desired transmittance for such applications.

Abrasion damage can include reciprocating sliding contact from counter face objects (e.g., fingers). In addition, abrasion damage can generate heat, which can degrade chemical bonds in the film materials and cause flaking and other types of damage to the cover glass. Since abrasion damage is often experienced over a longer term than the single events that cause scratches, the coating materials disposed experiencing abrasion damage can also oxidize, which further degrades the durability of the coating.

Accordingly, there is a need for new cover articles, and methods for their manufacture, which are abrasion resistant, have acceptable or improved optical performance and thinner optical structures.

SUMMARY

According to some embodiments of the disclosure, an article is provided that includes: an inorganic oxide substrate having opposing major surfaces; and an optical film structure disposed on a first major surface of the inorganic oxide substrate, the optical film structure comprising one or more of a silicon-containing oxide, a silicon-containing nitride and a silicon-containing oxynitride and a physical thickness from about 50 nm to less than 500 nm. The article exhibits a hardness of 8 GPa or greater measured at an indentation depth of about 100 nm or a maximum hardness of 9 GPa or greater measured over an indentation depth range from about 100 nm to about 500 nm, the hardness and the maximum hardness measured by a Berkovich Indenter Hardness Test. Further, the article exhibits a single-side photopic average reflectance that is less than 1%.

According to some embodiments of the disclosure, an article is provided that includes: an inorganic oxide substrate having opposing major surfaces; and an optical film structure disposed on a first major surface of the inorganic oxide substrate, the optical film structure comprising a physical thickness from about 50 nm to less than 500 nm and a plurality of alternating high index and low index layers with a first low index layer on the first major surface and a capping low index layer. Each layer comprises one or more of a silicon-containing oxide, a silicon-containing nitride and a silicon-containing oxynitride. The refractive index of the low index layers is within a range of a refractive index of the inorganic oxide substrate such that the refractive index of the low index layers is less than about 1.8, and the high index layer comprises a refractive index that is greater than 1.8. The high index layer exhibits a maximum hardness of 18 GPa or greater as measured by a Berkovich Indenter Hardness Test over an indentation depth from about 100 nm to about 500 nm on a hardness test stack comprising the high index layer with a physical thickness of about 2 micrometers (microns or µm) disposed on the inorganic oxide substrate. Further, the article exhibits a single-side photopic average reflectance that is less than 1%.

According to some embodiments of the disclosure, an article is provided that includes: an inorganic oxide substrate having opposing major surfaces; and an optical film structure disposed on a first major surface of the inorganic oxide substrate, the optical film structure comprising a physical thickness from about 50 nm to less than 500 nm and a plurality of alternating high index and low index layers with a first low index layer on the first major surface and a capping low index layer. Each layer comprises one or more of a silicon-containing oxide, a silicon-containing nitride and a silicon-containing oxynitride. The refractive index of the low index layers is within a range of a refractive index of the inorganic oxide substrate such that the refractive index of the low index layers is less than about 1.8, and the high index layer comprises a refractive index that is greater than 1.8. The optical film structure further comprises 30% or more of the high index layer by volume. Further, the article exhibits a single-side photopic average reflectance that is less than 1%.

According to some embodiments of the disclosure, an article is provided that includes: an inorganic oxide substrate having opposing major surfaces; and an optical film structure disposed on a first major surface of the inorganic oxide substrate, the optical film structure comprising a plurality of alternating high index and low index layers with a first low index layer on the first major surface of the substrate and a capping low index layer. The refractive index of the low index layers is within a range of a refractive index of the inorganic oxide substrate such that the refractive index of the low index layers is less than about 1.8, and the high index layer has a refractive index that is greater than 1.8. The article exhibits a hardness of 8 GPa or greater measured at an indentation depth of about 100 nm or a maximum hardness of 9 GPa or greater measured over an indentation depth range from about 100 nm to about 500 nm, the hardness and the maximum hardness measured by a Berkovich Indenter Hardness Test. The optical film structure further comprises 35% or more of the high index layer by volume. The article exhibits a single-side photopic average reflectance that is less than 1%. The high index layer exhibits a maximum hardness of 18 GPa or greater as measured by a Berkovich Indenter Hardness Test over an indentation depth from about 100 nm to about 500 nm on a hardness test stack comprising the high index layer with a physical thickness of about 2 microns disposed on the inorganic oxide substrate. Further, the article exhibits an a* value, in reflectance, from about −10 to +2 and a b* value, in reflectance, from −10 to +2, the a* and b* values each measured on the optical film structure at a normal incident illumination angle.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims.

The accompanying drawings are included to provide a further understanding, and are incorporated in and constitute a part of this specification. The drawings illustrate one or more embodiment(s) and, together with the description, serve to explain, by way of example, principles and operation of the disclosure. It is to be understood that various features of the disclosure disclosed in this specification and in the drawings can be used in any and all combinations. By way of non-limiting examples, the various features of the disclosure may be combined with one another according to the following embodiments.

BRIEF DESCRIPTION OF THE DRAWINGS

These and other features, aspects and advantages of the present disclosure are better understood when the following detailed description of the disclosure is read with reference to the accompanying drawings, in which.

DETAILED DESCRIPTION

Figure 1:
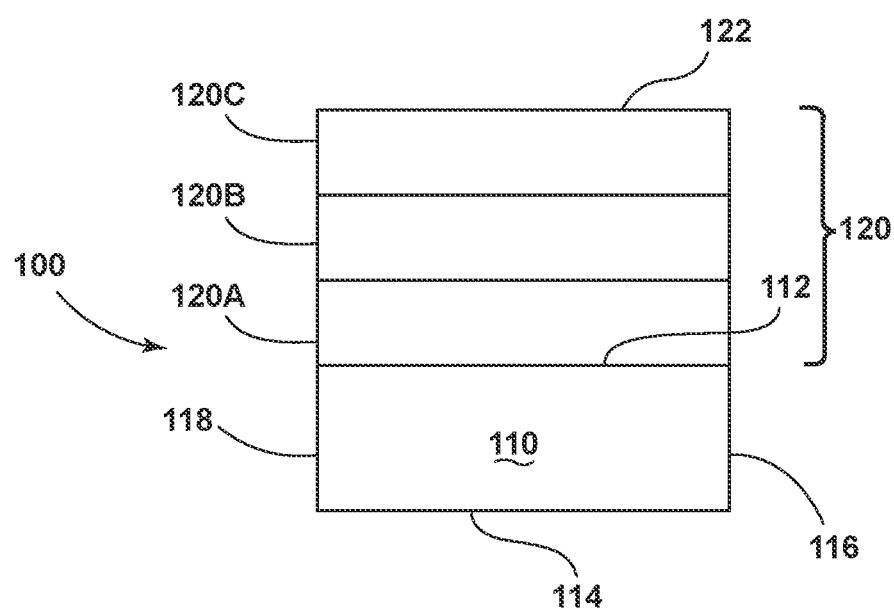
FIG. 1 is a side view of an article, according to one or more embodiments.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Ranges can be expressed herein as from "about" one particular value, and/or to "about" another particular value. As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, for example within about 5% of each other, or within about 2% of each other.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the singular forms "a," "an" and "the" include plural referents unless the context clearly dictates otherwise. Thus, for example, reference to a "component" includes embodiments having two or more such components, unless the context clearly indicates otherwise.

Embodiments of the disclosure relate to inorganic oxide articles with thin, durable anti-reflective structures and methods for making the same, and more particularly to articles with thin, multi-layer anti-reflective coatings exhibiting abrasion resistance, low reflectivity, and colorless transmittance and/or reflectance. Embodiments of these articles possess anti-reflective optical structures with a total physical thickness of less than 500 nm, while maintaining the hardness, abrasion resistance and optical properties associated with the intended applications for these articles (e.g., as covers, housings and substrates for display devices, interior and exterior automotive components, etc.).

Referring to FIG. 1, the article 100 according to one or more embodiments may include a substrate 110, and an anti-reflective coating 120 (also referred herein as an "optical film structure") disposed on the substrate. The substrate 110 includes opposing major surfaces 112, 114 and opposing minor surfaces 116, 118. The anti-reflective coating 120 is shown in FIG. 1 as being disposed on a first opposing major surface 112; however, the anti-reflective coating 120 may be disposed on the second opposing major surface 114 and/or one or both of the opposing minor surfaces, in addition to or instead of being disposed on the first opposing major surface 112. The anti-reflective coating 120 forms an anti-reflective surface 122.

The anti-reflective coating 120 includes at least one layer of at least one material. The term "layer" may include a single layer or may include one or more sub-layers. Such sub-layers may be in direct contact with one another. The sub-layers may be formed from the same material or two or more different materials. In one or more alternative embodiments, such sub-layers may have intervening layers of different materials disposed therebetween. In one or more embodiments a layer may include one or more contiguous and uninterrupted layers and/or one or more discontinuous and interrupted layers (i.e., a layer having different materials formed adjacent to one another). A layer or sub-layers may be formed by a discrete deposition or a continuous deposition process. In one or more embodiments, the layer may be formed using only continuous deposition processes, or, alternatively, only discrete deposition processes.

As used herein, the term "dispose" includes coating, depositing and/or forming a material onto a surface. The disposed material may constitute a layer, as defined herein. The phrase "disposed on" includes the instance of forming a material onto a surface such that the material is in direct contact with the surface and also includes the instance where the material is formed on a surface, with one or more intervening material(s) between the disposed material and the surface. The intervening material(s) may constitute a layer, as defined herein.

According to one or more embodiments, the anti-reflective coating 120 of the article 100 (e.g., as shown and described in connection with FIG. 1) can be characterized with abrasion resistance according to the Alumina SCE Test. As used herein, the "Alumina SCE Test" is conducted by subjecting a sample to a commercial 800 grit alumina sandpaper (10 mm×10 mm) with a total weight of 0.7 kg for fifty (50) abrasion cycles, using an ~1" stroke length powered by a Taber Industries 5750 linear abrader. Abrasion resistance is then characterized, according to the Alumina SCE Test, by measuring reflected specular component excluded (SCE) values from the abraded samples according to principles understood by those with ordinary skill in the field of the disclosure. More particularly, SCE is a measure of diffuse reflection off of the surface of the anti-reflection coating 120, as measured using a Konica-Minolta CM700D with a 6 mm diameter aperture. According to some implementations, the anti-reflective coating 120 of the articles 100 can exhibit SCE values, as obtained from the Alumina SCE Test, of less than 0.4%, less than 0.2%, less than 0.18%, less than 0.16%, or even less than 0.08%. In contrast, commercial anti-reflection coatings (such as a six-layer $Nb_2O_5/SiO_2$ multilayer coating) have a post-sandpaper abrasion SCE value of greater than 0.6%. Abrasion-induced damage increases the surface roughness leading to the increase in diffuse reflection (i.e., SCE values). Lower SCE values indicates less severe damage, indicative of improved abrasion resistance.

The anti-reflective coating 120 and the article 100 may be described in terms of a hardness measured by a Berkovich Indenter Hardness Test. Further, those with ordinary skill in the art can recognize that abrasion resistance of the anti-reflective coating 120 and the article 100 can be correlated to the hardness of these elements. As used herein, the "Berkovich Indenter Hardness Test" includes measuring the hardness of a material on a surface thereof by indenting the surface with a diamond Berkovich indenter. The Berkovich Indenter Hardness Test includes indenting the anti-reflective surface 122 of the article 100 or the surface of the anti-reflective coating 120 (or the surface of any one or more of the layers in the anti-reflective coating) with the diamond Berkovich indenter to form an indent to an indentation depth in the range from about 50 nm to about 1000 nm (or the entire thickness of the anti-reflective coating or layer, whichever is less) and measuring the hardness from this indentation at various points along the entire indentation depth range, along a specified segment of this indentation depth (e.g., in the depth range from about 100 nm to about 500 nm), or at a particular indentation depth (e.g., at a depth of 100 nm, at a depth of 500 nm, etc.) generally using the methods set forth in Oliver, W. C. and Pharr, G. M., "An improved technique for determining hardness and elastic modulus using load and displacement sensing indentation experiments", *J. Mater. Res.*, Vol. 7, No. 6, 1992, 1564-1583; and Oliver, W. C. and Pharr, G. M., "Measurement of Hardness and Elastic Modulus by Instrument Indentation: Advances in Understanding and Refinements to Methodology", *J. Mater. Res.*, Vol. 19, No. 1, 2004, 3-20. Further, when hardness is measured over an indentation depth range (e.g., in the depth range from about 100 nm to about 500 nm), the results can be reported as a maximum hardness within the specified range, wherein the maximum is selected from the measurements taken at each depth within that range. As used herein, "hardness" and "maximum hardness" both refer to as-measured hardness values, not averages of hardness values. Similarly, when hardness is measured at an indentation depth, the value of the hardness obtained from the Berkovich Indenter Hardness Test is given for that particular indentation depth.

Typically, in nanoindentation measurement methods (such as by using a Berkovich indenter) of a coating that is harder than the underlying substrate, the measured hardness may appear to increase initially due to development of the plastic zone at shallow indentation depths and then increases and reaches a maximum value or plateau at deeper indentation depths. Thereafter, hardness begins to decrease at even deeper indentation depths due to the effect of the underlying substrate. Where a substrate having an increased hardness compared to the coating is utilized, the same effect can be seen; however, the hardness increases at deeper indentation depths due to the effect of the underlying substrate.

The indentation depth range and the hardness values at certain indentation depth range(s) can be selected to identify a particular hardness response of the optical film structures and layers thereof, described herein, without the effect of the underlying substrate. When measuring hardness of the optical film structure (when disposed on a substrate) with a Berkovich indenter, the region of permanent deformation (plastic zone) of a material is associated with the hardness of the material. During indentation, an elastic stress field extends well beyond this region of permanent deformation. As indentation depth increases, the apparent hardness and modulus are influenced by stress field interactions with the underlying substrate. The substrate influence on hardness occurs at deeper indentation depths (i.e., typically at depths greater than about 10% of the optical film structure or layer thickness). Moreover, a further complication is that the hardness response utilizes a certain minimum load to develop full plasticity during the indentation process. Prior to that certain minimum load, the hardness shows a generally increasing trend.

At small indentation depths (which also may be characterized as small loads) (e.g., up to about 50 nm), the apparent hardness of a material appears to increase dramatically versus indentation depth. This small indentation depth regime does not represent a true metric of hardness; but instead, it reflects the development of the aforementioned plastic zone, which is related to the finite radius of curvature of the indenter. At intermediate indentation depths, the apparent hardness approaches maximum levels. At deeper indentation depths, the influence of the substrate becomes more pronounced as the indentation depths increase. Hardness may begin to drop dramatically once the indentation depth exceeds about 30% of the optical film structure thickness or the layer thickness.

As noted above, those with ordinary skill in the art can consider various test-related considerations in ensuring that the hardness and maximum hardness values of the coating 120 and article 100 obtained from the Berkovich Indenter Hardness Test are indicative of these elements, rather than being unduly influenced by the substrate 110, for example. Further, those with ordinary skill in the art can also recognize that the embodiments of the disclosure surprisingly demonstrate high hardness values associated with the anti-reflective coating 120 despite the relatively low thickness of the coating 120 (i.e., <500 nm). Indeed, as evidenced by the Examples detailed below in subsequent sections, the hardness of the high refractive index (RI) layer(s) 130B within an anti-reflective coating (see, e.g., FIGS. 2A and 2B), can significantly influence the overall hardness and maximum hardness of the anti-reflective coating 120 and article 100, despite the relatively low thickness values associated with these layers. This is surprising because of the above test-related considerations, which detail how measured hardness is directly influenced by the thickness of a coating, for example the anti-reflective coating 120. In general, as a coating (over a thicker substrate) is reduced in thickness, and as the volume of harder material (e.g., as compared to other layers within the coating having a lower hardness) in the coating decreases, it would be expected that the measured hardness of the coating will trend toward the hardness of the underlying substrate. Nevertheless, the articles 100 of the disclosure, as including the anti-reflective coating 120 (and as also exemplified by the Examples outlined in detail below), surprisingly exhibit significantly high hardness values in comparison to the underlying substrate, thus demonstrating a unique combination of coating thickness (<500 nm), volumetric fraction of higher hardness material and optical properties.

In some embodiments, the anti-reflective coating 120 of the article 100 may exhibit a hardness of greater than about 8 GPa, as measured on the anti-reflective surface 122, by a Berkovich Indenter Hardness Test at an indentation depth of about 100 nm. The antireflective coating 120 may exhibit a hardness of about 8 GPa or greater, about 9 GPa or greater, about 10 GPa or greater, about 11 GPa or greater, about 12 GPa or greater, about 13 GPa or greater, about 14 GPa or greater, or about 15 GPa or greater by a Berkovich Indenter Hardness Test at an indentation depth of about 100 nm. The article 100, including the anti-reflective coating 120 and any additional coatings, as described herein, may exhibit a hardness of about 8 GPa or greater, about 10 GPa or greater or about 12 GPa or greater, as measured on the anti-reflective surface 122 by a Berkovich Indenter Hardness Test at an indentation depth of about 100 nm. Such measured hardness values may be exhibited by the anti-reflective coating 120 and/or the article 100 over an indentation depth of about 50 nm or greater or about 100 nm or greater (e.g., from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, or from about 200 nm to about 600 nm). Similarly, maximum hardness values of about 8 GPa or greater, about 9 GPa or greater, about 10 GPa or greater, about 11 GPa or greater, about 12 GPa or greater, about 13

GPa or greater, about 14 GPa or greater, or about 15 GPa or greater by a Berkovich Indenter Hardness Test may be exhibited by the anti-reflective coating and/or the article over an indentation depth of about 50 nm or greater or about 100 nm or greater (e.g., from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, or from about 200 nm to about 600 nm).

Figure 2A:
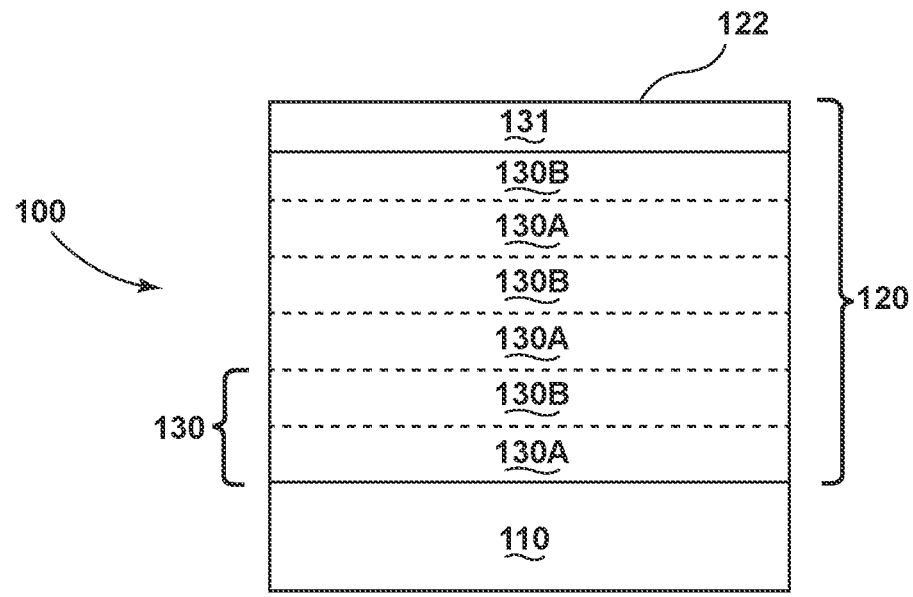
FIG. 2A is a side view of an article, according to one or more embodiments.

The anti-reflective coating 120 may have at least one layer made of material itself having a maximum hardness (as measured on the surface of such a layer, e.g., a surface of the second high RI layer 130B of FIG. 2A) of about 18 GPa or greater, about 19 GPa or greater, about 20 GPa or greater, about 21 GPa or greater, about 22 GPa or greater, about 23 GPa or greater, about 24 GPa or greater, about 25 GPa or greater, and all hardness values therebetween, as measured by the Berkovich Indenter Hardness Test over an indentation depth from about 100 nm to about 500 nm. These measurements are made on a hardness test stack comprising the designated layer of the anti-reflective coating 120 at a physical thickness of about 2 microns, as disposed on a substrate 110, to minimize the thickness-related hardness measurement effects described earlier. The maximum hardness of such a layer may be in the range from about 18 GPa to about 26 GPa, as measured by the Berkovich Indenter Hardness Test over an indentation depth from about 100 nm to about 500 nm. Such maximum hardness values may be exhibited by the material of at least one layer (e.g., the high RI layer(s) 130B, as shown in FIG. 2A) over an indentation depth of about 50 nm or greater or 100 nm or greater (e.g., from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, or from about 200 nm to about 600 nm). In one or more embodiments, the article 100 exhibits a hardness that is greater than the hardness of the substrate (which can be measured on the opposite surface from the anti-reflective surface). Similarly, hardness values may be exhibited by the material of at least one layer (e.g., the high RI layer(s) 130B, as shown in FIG. 2A) over an indentation depth of about 50 nm or greater or about 100 nm or greater (e.g., from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, or from about 200 nm to about 600 nm). In addition, these hardness and/or maximum hardness values associated with the at least one layer (e.g., the high RI layer(s) 130B) can also be observed at particular indentation depths (e.g., at 100 nm, 200 nm, etc.) over the measured indentation depth ranges.

Optical interference between reflected waves from the interface between the anti-reflective coating 120 and air, and from the interface between the anti-reflective coating 120 and substrate 110, can lead to spectral reflectance and/or transmittance oscillations that create apparent color in the article 100. As used herein, the term "transmittance" is defined as the percentage of incident optical power within a given wavelength range transmitted through a material (e.g., the article, the substrate or the optical film or portions thereof). The term "reflectance" is similarly defined as the percentage of incident optical power within a given wavelength range that is reflected from a material (e.g., the article, the substrate, or the optical film or portions thereof). In one or more embodiments, the spectral resolution of the characterization of the transmittance and reflectance is less than 5 nm or 0.02 eV. The color may be more pronounced in reflection. The angular color shifts in reflection with viewing angle due to a shift in the spectral reflectance oscillations with incident illumination angle. Angular color shifts in transmittance with viewing angle are also due to the same shift in the spectral transmittance oscillation with incident illumination angle. The observed color and angular color shifts with incident illumination angle are often distracting or objectionable to device users, particularly under illumination with sharp spectral features, for example, under fluorescent lighting and some LED lighting. Angular color shifts in transmission may also play a factor in angular color shifts in reflection and vice versa. Factors in angular color shifts in transmission and/or reflection may also include angular color shifts due to viewing angle or color shifts away from a certain white point that may be caused by material absorption (somewhat independent of angle) defined by a particular illuminant or test system.

The oscillations may be described in terms of amplitude. As used herein, the term "amplitude" includes the peak-to-valley change in reflectance or transmittance. The phrase "average amplitude" includes the peak-to-valley change in reflectance or transmittance averaged within the optical wavelength regime. As used herein, the "optical wavelength regime" includes the wavelength range from about 400 nm to about 800 nm (and more specifically from about 450 nm to about 650 nm). According to some embodiments, the optical wavelength range further includes the infrared spectrum from 800 nm to 1000 nm.

The embodiments of this disclosure include an anti-reflective coating (e.g., anti-reflective coating 120 or optical film structure 120) to provide improved optical performance, in terms of colorlessness and/or smaller angular color shifts when viewed at varying incident illumination angles from normal incidence under different illuminants.

One aspect of this disclosure pertains to an article that exhibits colorlessness in reflectance and/or transmittance even when viewed at different incident illumination angles under an illuminant. In one or more embodiments, the article exhibits an angular color shift in reflectance and/or transmittance of about 5 or less, or about 2 or less, between a reference illumination angle and any incidental illumination angles, in the ranges provided herein. As used herein, the phrase "color shift" (angular or reference point) refers to the change in both a* and b*, under the International Commission on Illumination (CIE) L*, a*, b* colorimetry system in reflectance and/or transmittance. It should be understood that unless otherwise noted, the L* coordinate of the articles described herein are the same at any angle or reference point and do not influence color shift. For example, angular color shift may be determined using the following Equation (1):

$$\sqrt{((a^*_2-a^*_1)^2+(b^*_2-b^*_1)^2)} \quad (1)$$

with $a^*_1$, and $b^*_1$ representing the a* and b* coordinates of the article when viewed at a reference illumination angle (which may include normal incidence) and $a^*_2$, and $b^*_2$ representing the a* and b* coordinates of the article when viewed at an incident illumination angle, provided that the incident illumination angle is different from reference illumination angle and in some cases differs from the reference illumination angle by about 1 degree or more, 2 degrees or more, about 5 degrees or more, about 10 degrees or more, about 15 degrees or more, or about 20 degrees or more. In some instances, an angular color shift in reflectance and/or transmittance of about 10 or less (e.g., 5 or less, 4 or less, 3 or less, or 2 or less) is exhibited by the article when viewed at various incident illumination angles from a reference illumination angle, under an illuminant. In some instances the angular color shift in reflectance and/or transmittance is about 1.9 or less, 1.8 or less, 1.7 or less, 1.6 or less, 1.5 or less, 1.4 or less, 1.3 or less, 1.2 or less, 1.1 or less, 1 or less, 0.9 or less, 0.8 or less, 0.7 or less, 0.6 or less, 0.5 or less, 0.4 or less, 0.3 or less, 0.2 or less, or 0.1 or less. In some embodiments, the angular color shift may be about 0. The illuminant can include standard illuminants as determined by the CIE, including A illuminants (representing tungsten-filament lighting), B illuminants (daylight simulating illuminants), C illuminants (daylight simulating illuminants), D series illuminants (representing natural daylight), and F series illuminants (representing various types of fluorescent lighting). In specific examples, the articles exhibit an angular color shift in reflectance and/or transmittance of about 2 or less when viewed at an incident illumination angle from the reference illumination angle under a CIE F2, F10, F11, F12 or D65 illuminant or more specifically under a CIE F2 illuminant.

The reference illumination angle may include normal incidence (i.e., 0 degrees), or 5 degrees from normal incidence, 10 degrees from normal incidence, 15 degrees from normal incidence, 20 degrees from normal incidence, 25 degrees from normal incidence, 30 degrees from normal incidence, 35 degrees from normal incidence, 40 degrees from normal incidence, 50 degrees from normal incidence, 55 degrees from normal incidence, or 60 degrees from normal incidence, provided the difference between the reference illumination angle and the difference between the incident illumination angle and the reference illumination angle is about 1 degree or more, 2 degrees or more, about 5 degrees or more, about 10 degrees or more, about 15 degrees or more, or about 20 degrees or more. The incident illumination angle may be, with respect to the reference illumination angle, in the range from about 5 degrees to about 80 degrees, from about 5 degrees to about 75 degrees, from about 5 degrees to about 70 degrees, from about 5 degrees to about 65 degrees, from about 5 degrees to about 60 degrees, from about 5 degrees to about 55 degrees, from about 5 degrees to about 50 degrees, from about 5 degrees to about 45 degrees, from about 5 degrees to about 40 degrees, from about 5 degrees to about 35 degrees, from about 5 degrees to about 30 degrees, from about 5 degrees to about 25 degrees, from about 5 degrees to about 20 degrees, from about 5 degrees to about 15 degrees, and all ranges and sub-ranges therebetween, away from normal incidence. The article may exhibit the angular color shifts in reflectance and/or transmittance described herein at and along all the incident illumination angles in the range from about 2 degrees to about 80 degrees, or from about 5 degrees to about 80 degrees, or from about 10 degrees to about 80 degrees, or from about 15 degrees to about 80 degrees, or from about 20 degrees to about 80 degrees, when the reference illumination angle is normal incidence. In some embodiments, the article may exhibit the angular color shifts in reflectance and/or transmittance described herein at and along all the incident illumination angles in the range from about 2 degrees to about 80 degrees, or from about 5 degrees to about 80 degrees, or from about 10 degrees to about 80 degrees, or from about 15 degrees to about 80 degrees, or from about 20 degrees to about 80 degrees, when the difference between the incident illumination angle and the reference illumination angle is about 1 degree or more, 2 degrees or more, about 5 degrees or more, about 10 degrees or more, about 15 degrees or more, or about 20 degrees or more. In one example, the article may exhibit an angular color shift in reflectance and/or transmittance of 2 or less at any incident illumination angle in the range from about 2 degrees to about 60 degrees, from about 5 degrees to about 60 degrees, or from about 10 degrees to about 60 degrees away from a reference illumination angle equal to normal incidence. In other examples, the article may exhibit an angular color shift in reflectance and/or transmittance of 2 or less when the reference illumination angle is 10 degrees and the incident illumination angle is any angle in the range from about 12 degrees to about 60 degrees, from about 15 degrees to about 60 degrees, or from about 20 degrees to about 60 degrees away from the reference illumination angle.

In some embodiments, the angular color shift may be measured at all angles between a reference illumination angle (e.g., normal incidence) and an incident illumination angle in the range from about 20 degrees to about 80 degrees. In other words, the angular color shift may be measured and may be less than about 5, or less than about 2, at all angles in the range from about 0 degrees to about 20 degrees, from about 0 degrees to about 30 degrees, from about 0 degrees to about 40 degrees, from about 0 degrees to about 50 degrees, from about 0 degrees to about 60 degrees, or from about 0 degrees to about 80 degrees.

In one or more embodiments, the article 100 exhibits a color in the CIE L*, a*, b* colorimetry system in reflectance and/or transmittance such that the distance or reference point color shift between the transmittance color or reflectance coordinates from a reference point is less than about 5, or less than about 2, under an illuminant (which can include standard illuminants as determined by the CIE, including A illuminants (representing tungsten-filament lighting), B illuminants (daylight simulating illuminants), C illuminants (daylight simulating illuminants), D series illuminants (representing natural daylight), and F series illuminants (representing various types of fluorescent lighting). In specific examples, the articles exhibit a color shift in reflectance and/or transmittance of about 2 or less when viewed at an incident illumination angle from the reference illumination angle under a CIE F2, F10, F11, F12 or D65 illuminant or more specifically under a CIE F2 illuminant. Stated another way, the article may exhibit a transmittance color (or transmittance color coordinates) and/or a reflectance color (or reflectance color coordinates) measured at the anti-reflective surface 122 having a reference point color shift of less than about 2 from a reference point, as defined herein. Unless otherwise noted, the transmittance color or transmittance color coordinates are measured on two surfaces of the article including at the anti-reflective surface 122 and the opposite bare surface of the article (i.e., 114). Unless otherwise noted, the reflectance color or reflectance color coordinates are measured on only the anti-reflective surface 122 of the article.

In one or more embodiments, the reference point may be the origin (0, 0) in the CIE L*, a*, b* colorimetry system (or the color coordinates a*=0, b*=0), color coordinates (a*=−2, b*=−2) or the transmittance or reflectance color coordinates of the substrate. It should be understood that unless otherwise noted, the L* coordinate of the articles described herein are the same as the reference point and do not influence color shift. Where the reference point color shift of the article is defined with respect to the substrate, the transmittance color coordinates of the article are compared to the transmittance color coordinates of the substrate and the reflectance color coordinates of the article are compared to the reflectance color coordinates of the substrate.

In one or more specific embodiments, the reference point color shift of the transmittance color and/or the reflectance color may be less than 1 or even less than 0.5. In one or more specific embodiments, the reference point color shift for the transmittance color and/or the reflectance color may be 1.8, 1.6, 1.4, 1.2, 0.8, 0.6, 0.4, 0.2, 0 and all ranges and sub-ranges therebetween. Where the reference point is the color coordinates a*=0, b*=0, the reference point color shift is calculated by Equation (2):

$$\text{reference point color shift} = \sqrt{((a^*_{article})^2(b^*_{article})^2)}. \quad (2)$$

Where the reference point is the color coordinates a*=−2, b*=−2, the reference point color shift is calculated by Equation (3):

$$\text{reference point color shift} = \sqrt{((a^*_{article}+2)^2+(b^*_{article}+2)^2)}. \quad (3)$$

Where the reference point is the color coordinates of the substrate, the reference point color shift is calculated by Equation (4):

$$\text{reference point color shift} = \sqrt{((a^*_{article}-a^*_{substrate})^2+(b^*_{article}-b^*_{substrate})^2)} \quad (4)$$

In some embodiments, the article 100 may exhibit a transmittance color (or transmittance color coordinates) and a reflectance color (or reflectance color coordinates) such that the reference point color shift is less than 2 when the reference point is any one of the color coordinates of the substrate, the color coordinates a*=0, b*=0 and the color coordinates a*=−2, b*=−2.

In some embodiments, the article 100 may exhibit a b* value in reflectance (as measured at the anti-reflective surface 122 only) in the range from about −10 to about +2, from about −7 to about 0, from about −6 to about −1, from about −6 to about 0, or from about −4 to about 0, in the CIE L*, a*, b* colorimetry system at a near-normal incident angle (i.e., at about 0 degrees, or within 10 degrees of normal). In other implementations, the article 100 may exhibit a b* value in reflectance (as measured at the anti-reflective surface 122 only) in the range from about −10 to about +10, from about −8 to about +8, or from about −5 to about +5, in the CIE L*, a*, b* colorimetry system at all incidence illumination angles in the range from about 0 to about 60 degrees (or from about 0 degrees to about 40 degrees, or from about 0 degrees to about 30 degrees).

In some embodiments, the article 100 may exhibit a b* value in transmittance (as measured at the anti-reflective surface and the opposite bare surface of the article) in the range from about −2 to about 2, from about −1 to about 2, from about −0.5 to about 2, from about 0 to about 2, from about 0 to about 1, from about −2 to about 0.5, from about −2 to about 1, from about −1 to about 1, or from about 0 to about 0.5, in the CIE L*, a*, b* colorimetry system at a near-normal incident angle (i.e., at about 0 degrees, or within 10 degrees of normal). In other implementations, the article may exhibit a b* value in transmittance in the range from about −2 to about 2, from about −1 to about 2, from about −0.5 to about 2, from about 0 to about 2, from about 0 to about 1, from about −2 to about 0.5, from about −2 to about 1, from about −1 to about 1, or from about 0 to about 0.5, in the CIE L*, a*, b* colorimetry system for all incidence illumination angles in the range from about 0 to about 60 degrees (or from about 0 degrees to about 40 degrees or from about 0 degrees to about 30 degrees).

In some embodiments, the article 100 may exhibit an a* value in transmittance (as measured at the anti-reflective surface and the opposite bare surface of the article) in the range from about −2 to about 2, from about −1 to about 2, from about −0.5 to about 2, from about 0 to about 2, from about 0 to about 1, from about −2 to about 0.5, from about −2 to about 1, from about −1 to about 1, or from about 0 to about 0.5, in the CIE L*, a*, b* colorimetry system at a near-normal incident angle (i.e., at about 0 degrees, or within 10 degrees of normal). In other implementations, the article may exhibit an a* value in transmittance in the range from about −2 to about 2, from about −1 to about 2, from about −0.5 to about 2, from about 0 to about 2, from about 0 to about 1, from about −2 to about 0.5, from about −2 to about 1, from about −1 to about 1, or from about 0 to about 0.5, in the CIE L*, a*, b* colorimetry system for all incidence illumination angles in the range from about 0 to about 60 degrees (or from about 0 degrees to about 40 degrees or from about 0 degrees to about 30 degrees).

In some embodiments, the article 100 exhibits a* and/or b* values in transmittance (at the anti-reflective surface and the opposite bare surface) in the range from about −1.5 to about 1.5 (e.g., −1.5 to −1.2, −1.5 to −1, −1.2 to 1.2, −1 to 1, −1 to 0.5, or −1 to 0) at incident illumination angles in the range from about 0 degrees to about 60 degrees under illuminants D65, A, and F2.

In some embodiments, the article 100 exhibits an a* value in reflectance (at only the anti-reflective surface) in the range from about −10 to about +5, −5 to about +5 (e.g., −4.5 to +4.5, −4.5 to +1.5, −3 to 0, −2.5 to −0.25), or from about −4 to +4, at a near-normal incident angle (i.e., at about 0 degrees, or within 10 degrees of normal) in the CIE L*, a*, b* colorimetry system. In other embodiments, the article 100 exhibits an a* value in reflectance (at only the anti-reflective surface) in the range from about −5 to about +15 (e.g., −4.5 to +14) or from about −3 to +13 at incident illumination angles in the range from about 0 degrees to about 60 degrees in the CIE L*, a*, b* colorimetry system.

The article 100 of one or more embodiments, or the anti-reflective surface 122 of one or more articles, may exhibit a photopic average light transmittance of about 94% or greater (e.g., about 94% or greater, about 95% or greater, about 96% or greater, about 96.5% or greater, about 97% or greater, about 97.5% or greater, about 98% or greater, about 98.5% or greater or about 99% or greater) over the optical wavelength regime in the range from about 400 nm to about 800 nm. In some embodiments, the article 100, or the anti-reflective surface 122 of one or more articles, may exhibit an average light reflectance of about 2% or less (e.g., about 1.5% or less, about 1% or less, about 0.75% or less, about 0.5% or less, or about 0.25% or less) over the optical wavelength regime in the range from about 400 nm to about 800 nm. These light transmittance and light reflectance values may be observed over the entire optical wavelength regime or over selected ranges of the optical wavelength regime (e.g., a 100 nm wavelength range, 150 nm wavelength range, a 200 nm wavelength range, a 250 nm wavelength range, a 280 nm wavelength range, or a 300 nm wavelength range, within the optical wavelength regime). In some embodiments, these light reflectance and transmittance values may be a total reflectance or total transmittance (taking into account reflectance or transmittance on both the anti-reflective surface 122 and the opposite major surface, 114). Unless otherwise specified, the average reflectance or transmittance is measured at an incident illumination angle of 0 degrees (however, such measurements may be provided at incident illumination angles of 45 degrees or 60 degrees).

The article 100 of one or more embodiments, or the anti-reflective surface 122 of one or more articles, may exhibit an average light transmittance of about 87% or greater (e.g., about 87% or greater, about 88% or greater, about 89% or greater, about 90% or greater, about 91% or greater, about 92% or greater, about 93% or greater, about 94% or greater or about 95% or greater) over the optical wavelength regime in the infrared spectrum from about 800 nm to about 1000 nm, from about 900 nm to 1000 nm or from 930 nm to 950 nm. In these embodiments, the article 100, or the anti-reflective surface 122 of one or more articles, may exhibit an average light reflectance of about 2% or less, about 1% or less, or about 0.5% or less (e.g., about 1.5% or less, about 1% or less, about 0.75% or less, about 0.5% or less, or about 0.25% or less) over the optical wavelength regime in the range from about 400 nm to about 800 nm. These light transmittance and light reflectance values may be observed over the entire optical wavelength regime or over selected ranges of the optical wavelength regime (e.g., a 100 nm wavelength range, a 150 nm wavelength range, a 200 nm wavelength range, a 250 nm wavelength range, a 280 nm wavelength range, or a 300 nm wavelength range, within the optical wavelength regime). In some of these embodiments, the light reflectance and transmittance values may be a total reflectance or total transmittance (taking into account reflectance or transmittance on both the anti-reflective surface 122 and the opposite major surface, 114). Unless otherwise specified, the average reflectance or transmittance of these embodiments is measured at an incident illumination angle of 0 degrees (however, such measurements may be provided at incident illumination angles of 45 degrees or 60 degrees).

In some embodiments, the article 100 of one or more embodiments, or the anti-reflective surface 122 of one or more articles, may exhibit a visible photopic average reflectance of about 1% or less, about 0.9% or less, about 0.8% or less, about 0.7% or less, about 0.6% or less, about 0.5% or less, about 0.4% or less, about 0.3% or less, or about 0.2% or less, over the optical wavelength regime. These photopic average reflectance values may be exhibited at incident illumination angles in the range from about 0° to about 20°, from about 0° to about 40°, or from about 0° to about 60°. As used herein, "photopic average reflectance" mimics the response of the human eye by weighting the reflectance versus wavelength spectrum according to the human eye's sensitivity. Photopic average reflectance may also be defined as the luminance, or tristimulus Y value of reflected light, according to known conventions for example CIE color space conventions. The photopic average reflectance is defined in Equation (5) as the spectral reflectance, $R(\lambda)$, multiplied by the illuminant spectrum, $I(\lambda)$, and the CIE's color matching function, $\bar{y}(\lambda)$, related to the eye's spectral response:

$$\langle R_p \rangle = \int_{380\ nm}^{720\ nm} R(\lambda) \times I(\lambda) \times \bar{y}(\lambda) d\lambda. \quad (5)$$

In some embodiments, the anti-reflective surface 122 of one or more articles (i.e., when measuring the anti-reflective surface 122 only through a single-sided measurement) may exhibit a visible photopic average reflectance of about 2% or less, about 1.8% or less, about 1.5% or less, about 1.2% or less, about 1% or less, about 0.9% or less, about 0.7% or less, about 0.5% or less, about 0.45% or less, about 0.4% or less, about 0.35% or less, about 0.3% or less, about 0.25% or less, or about 0.2% or less. In such "single-sided" measurements as described in this disclosure, the reflectance from the second major surface (e.g., surface 114 shown in FIG. 1) is removed by coupling this surface to an index-matched absorber. In some cases, the visible photopic average reflectance ranges are exhibited while simultaneously exhibiting a maximum reflectance color shift, over the entire incident illumination angle range from about 5 degrees to about 60 degrees (with the reference illumination angle being normal incidence) using D65 illumination, of less than about 5.0, less than about 4.0, less than about 3.0, less than about 2.0, less than about 1.5, or less than about 1.25. These maximum reflectance color shift values represent the lowest color point value measured at any angle from about 5 degrees to about 60 degrees from normal incidence, subtracted from the highest color point value measured at any angle in the same range. The values may represent a maximum change in a* value ($a^*_{highest} - a^*_{lowest}$), a maximum change in b* value ($b^*_{highest} - b^*_{lowest}$), a maximum change in both a* and b* values, or a maximum change in the quantity $\sqrt{((a^*_{highest} - a^*_{lowest})^2 + (b^*_{highest} - b^*_{lowest})^2)}$.

Substrate

The substrate 110 may include an inorganic oxide material and may include an amorphous substrate, a crystalline substrate or a combination thereof. In one or more embodiments, the substrate exhibits a refractive index in the range from about 1.45 to about 1.55, e.g., 1.45, 1.46, 1.47, 1.48, 1.49, 1.50, 1.51, 1.52, 1.53, 1.54, 1.55, and all refractive indices therebetween.

Suitable substrates 110 may exhibit an elastic modulus (or Young's modulus) in the range from about 30 GPa to about 120 GPa. In some instances, the elastic modulus of the substrate may be in the range from about 30 GPa to about 110 GPa, from about 30 GPa to about 100 GPa, from about 30 GPa to about 90 GPa, from about 30 GPa to about 80 GPa, from about 30 GPa to about 70 GPa, from about 40 GPa to about 120 GPa, from about 50 GPa to about 120 GPa, from about 60 GPa to about 120 GPa, from about 70 GPa to about 120 GPa, and all ranges and sub-ranges therebetween. The Young's modulus values for the substrate itself as recited in this disclosure refer to values as measured by a resonant ultrasonic spectroscopy technique of the general type set forth in ASTM E2001-13, titled "Standard Guide for Resonant Ultrasound Spectroscopy for Defect Detection in Both Metallic and Non-metallic Parts."

In one or more embodiments, the amorphous substrate may include glass, which may be strengthened or non-strengthened. Examples of suitable glass include soda lime glass, alkali aluminosilicate glass, alkali containing borosilicate glass and alkali aluminoborosilicate glass. In some variants, the glass may be free of lithia. In one or more alternative embodiments, the substrate 110 may include crystalline substrates, for example, glass-ceramic, or ceramic, substrates (which may be strengthened or non-strengthened), or may include a single crystal structure, for example, sapphire. In one or more specific embodiments, the substrate 110 includes an amorphous base (e.g., glass) and a crystalline cladding (e.g., sapphire layer, a polycrystalline alumina layer and/or or a spinel ($MgAl_2O_4$) layer).

The substrate 110 may be substantially planar or sheet-like, although other embodiments may utilize a curved or otherwise shaped or sculpted substrate. The substrate 110 may be substantially optically clear, transparent and free from light scattering. In such embodiments, the substrate may exhibit an average light transmission over the optical wavelength regime of about 85% or greater, about 86% or greater, about 87% or greater, about 88% or greater, about 89% or greater, about 90% or greater, about 91% or greater or about 92% or greater. In one or more alternative embodiments, the substrate 110 may be opaque or exhibit an average light transmission over the optical wavelength regime of less than about 10%, less than about 9%, less than about 8%, less than about 7%, less than about 6%, less than about 5%, less than about 4%, less than about 3%, less than about 2%, less than about 1%, or less than about 0%. In some embodiments, these light reflectance and transmittance values may be a total reflectance or total transmittance (taking into account reflectance or transmittance on both major surfaces of the substrate) or may be observed on a single side of the substrate (i.e., on the anti-reflective surface 122 only, without taking into account the opposite surface). Unless otherwise specified, the average reflectance or transmittance is measured at an incident illumination angle of 0 degrees (however, such measurements may be provided at incident illumination angles of 45 degrees or 60 degrees). The substrate 110 may optionally exhibit a color, for example white, black, red, blue, green, yellow, orange, etc.

Additionally or alternatively, the physical thickness of the substrate 110 may vary along one or more of its dimensions for aesthetic and/or functional reasons. For example, the edges of the substrate 110 may be thicker as compared to more central regions of the substrate 110. The length, width and physical thickness dimensions of the substrate 110 may also vary according to the application or use of the article 100.

The substrate 110 may be provided using a variety of different processes. For instance, where the substrate 110 includes an amorphous substrate, for example, glass, various forming methods can include float glass processes, rolling processes, updraw processes, and down-draw processes, for example fusion draw and slot draw.

Once formed, a substrate 110 may be strengthened to form a strengthened substrate. As used herein, the term "strengthened substrate" may refer to a substrate that has been chemically strengthened, for example through ion-exchange of larger ions for smaller ions in the surface of the substrate. However, other strengthening methods known in the art, for example thermal tempering, or utilizing a mismatch of the coefficient of thermal expansion between portions of the substrate to create compressive stress and central tension regions, may be utilized to form strengthened substrates.

Where the substrate is chemically strengthened by an ion exchange process, the ions in the surface layer of the substrate are replaced by—or exchanged with—larger ions having the same valence or oxidation state. Ion exchange processes are typically carried out by immersing a substrate in a molten salt bath containing the larger ions to be exchanged with the smaller ions in the substrate. It will be appreciated by those skilled in the art that parameters for the ion exchange process, including, but not limited to, bath composition and temperature, immersion time, the number of immersions of the substrate in a salt bath (or baths), use of multiple salt baths, and any additional steps (e.g., annealing, washing, and the like) are generally determined by the composition of the substrate, the desired compressive stress (CS), and the desired depth of compressive stress (CS) layer (or depth of layer) of the substrate that result from the strengthening operation. By way of example, ion exchange of alkali metal-containing glass substrates may be achieved by immersion in at least one molten bath containing a salt for example, but not limited to, nitrates, sulfates, and chlorides of the larger alkali metal ion. The temperature of the molten salt bath typically is in a range from about 380° C. up to about 450° C., while immersion times range from about 15 minutes up to about 40 hours. However, temperatures and immersion times different from those described above may also be used.

In addition, non-limiting examples of ion exchange processes in which glass substrates are immersed in multiple ion exchange baths, with washing and/or annealing steps between immersions, are described in U.S. patent application Ser. No. 12/500,650, filed Jul. 10, 2009, by Douglas C. Allan et al., entitled "Glass with Compressive Surface for Consumer Applications", claiming priority from U.S. Provisional Patent Application No. 61/079,995, filed Jul. 11, 2008, in which glass substrates are strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," claiming priority from U.S. Provisional Patent Application No. 61/084,398, filed Jul. 29, 2008, in which glass substrates are strengthened by ion exchange in a first bath diluted with an effluent ion, followed by immersion in a second bath having a smaller concentration of the effluent ion than the first bath. The contents of U.S. patent application Ser. No. 12/500,650 and U.S. Pat. No. 8,312,739 are incorporated herein by reference in their entirety.

The degree of chemical strengthening achieved by ion exchange may be quantified based on the parameters of central tension (CT), peak CS, depth of compression (DOC, which is the point along the thickness wherein compression changes to tension), and depth of ion layer (DOL). Peak CS, which is a maximum observed compressive stress, may be measured near the surface of the substrate 110 or within the strengthened glass at various depths. A peak CS value may include the measured CS at the surface ($CS_s$) of the strengthened substrate. In other embodiments, the peak CS is measured below the surface of the strengthened substrate. Compressive stress (including surface CS) is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety. As used herein, DOC means the depth at which the stress in the chemically strengthened alkali aluminosilicate glass article described herein changes from compressive to tensile. DOC may be measured by FSM or a scattered light polariscope (SCALP) depending on the ion exchange treatment. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass articles is measured by FSM. Maximum CT values are measured using a scattered light polariscope (SCALP) technique known in the art. Refracted near-field (RNF) method or SCALP may be used to measure (graph, depict visually, or otherwise map out) the complete stress profile. When the RNF method is utilized to measure the stress profile, the maximum CT value provided by SCALP is utilized in the RNF method. In particular, the stress profile measured by RNF is force balanced and calibrated to the maximum CT value provided by a SCALP measurement. The RNF method is described in U.S. Pat. No. 8,854,623, entitled "Systems and methods for measuring a profile characteristic of a glass sample", which is incorporated herein by reference in its entirety. In particular, the RNF method includes placing the glass article adjacent to a reference block, generating a polarization-switched light beam that is switched between orthogonal polarizations at a rate of from 1 Hz to 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal.

In some embodiments, a strengthened substrate 110 can have a peak CS of 250 MPa or greater, 300 MPa or greater, 400 MPa or greater, 450 MPa or greater, 500 MPa or greater, 550 MPa or greater, 600 MPa or greater, 650 MPa or greater, 700 MPa or greater, 750 MPa or greater, or 800 MPa or greater. The strengthened substrate may have a DOC of 10 µm or greater, 15 µm or greater, 20 µm or greater (e.g., 25 µm, 30 µm, 35 µm, 40 µm, 45 µm, 50 µm, or greater) and/or a CT of 10 MPa or greater, 20 MPa or greater, 30 MPa or greater, 40 MPa or greater (e.g., 42 MPa, 45 MPa, or 50 MPa or greater) but less than 100 MPa (e.g., 95, 90, 85, 80, 75, 70, 65, 60, 55 MPa or less). In one or more specific embodiments, the strengthened substrate has one or more of the following: a peak CS greater than 500 MPa, a DOC greater than 15 µm, and a CT greater than 18 MPa.

Example glasses that may be used in the substrate may include alkali aluminosilicate glass compositions or alkali aluminoborosilicate glass compositions, though other glass compositions are contemplated. Such glass compositions are capable of being chemically strengthened by an ion exchange process. One example glass composition comprises $SiO_2$, $B_2O_3$ and $Na_2O$, where $(SiO_2+B_2O_3) \geq 66$ mol. %, and $Na_2O \geq 9$ mol. %. In some embodiments, the glass composition includes about 6 wt. % aluminum oxide or more. In some embodiments, the substrate includes a glass composition with one or more alkaline earth oxides, such that a content of alkaline earth oxides is about 5 wt. % or more. Suitable glass compositions, in some embodiments, further comprise at least one of $K_2O$, MgO, or CaO. In some embodiments, the glass compositions used in the substrate can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for the substrate comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq (MgO+CaO) \leq 10$ mol. %.

A still further example glass composition suitable for the substrate comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $\leq (Li_2O+Na_2O+K_2O)$ 18 mol. % and 2 mol. % $\leq (MgO+CaO) \leq 7$ mol. %.

In some embodiments, an alkali aluminosilicate glass composition suitable for the substrate 110 comprises alumina, at least one alkali metal and, in some embodiments, greater than 50 mol. % $SiO_2$, in other embodiments 58 mol. % $SiO_2$ or more, and in still other embodiments 60 mol. % $SiO_2$ or more, wherein the ratio $(Al_2O_3+B_2O_3)/\Sigma$modifiers (i.e., sum of modifiers) is greater than 1, wherein the ratio of these components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $(Al_2O_3+B_2O_3)/\Sigma$modifiers (i.e., sum of modifiers) is greater than 1.

In some embodiments, the substrate 110 may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. % $\leq SiO_2+B_2O_3+CaO \leq 69$ mol. %; $Na_2O+K_2O+B_2O_3+MgO+CaO+SrO > 10$ mol. %; 5 mol. % $\leq MgO+CaO+SrO \leq 8$ mol. %; $(Na_2O+B_2O_3)-Al_2O_3 \leq 2$ mol. %; 2 mol. % $\leq Na_2O-Al_2O_3 \leq 6$ mol. %; and 4 mol. % $\leq (Na_2O+K_2O)-Al_2O_3 \leq 10$ mol. %.

In some embodiments, the substrate 110 may comprise an alkali aluminosilicate glass composition comprising: 2 mol. % or more of $Al_2O_3$ and/or $ZrO_2$, or 4 mol. % or more of $Al_2O_3$ and/or $ZrO_2$.

Where the substrate 110 includes a crystalline substrate, the substrate may include a single crystal, which may include $Al_2O_3$. Such single crystal substrates are referred to as sapphire. Other suitable materials for a crystalline substrate include polycrystalline alumina layer and/or spinel ($MgAl_2O_4$).

Optionally, the crystalline substrate 110 may include a glass-ceramic substrate, which may be strengthened or non-strengthened. Examples of suitable glass-ceramics may include $Li_2O$—$Al_2O_3$—$SiO_2$ system (i.e., LAS-System) glass-ceramics, MgO—$Al_2O_3$—$SiO_2$ system (i.e., MAS-System) glass-ceramics, and/or glass-ceramics that include a predominant crystal phase including β-quartz solid solution, β-spodumene ss, cordierite, and lithium disilicate. The glass-ceramic substrates may be strengthened using the chemical strengthening processes disclosed herein. In one or more embodiments, MAS-System glass-ceramic substrates may be strengthened in $Li_2SO_4$ molten salt, whereby an exchange of $2Li^+$ for $Mg^{2+}$ can occur.

The substrate 110, according to one or more embodiments, can have a physical thickness ranging from about 50 µm to about 5 mm. Example substrate 110 physical thicknesses range from about 50 µm to about 500 µm (e.g., 50, 100, 200, 300, 400 or 500 µm). Further example substrate 110 physical thicknesses range from about 500 µm to about 1000 µm (e.g., 500, 600, 700, 800, 900 or 1000 µm). The substrate 110 may have a physical thickness greater than about 1 mm (e.g., about 2, 3, 4, or 5 mm). In one or more specific embodiments, the substrate 110 may have a physical thickness of 2 mm or less or less than 1 mm. The substrate 110 may be acid polished or otherwise treated to remove or reduce the effect of surface flaws.

Anti-Reflective Coating

As shown in FIG. 1, the anti-reflective coating 120 of the article 100 may include a plurality of layers 120A, 120B, 120C. In some embodiments, one or more layers may be disposed on the opposite side of the substrate 110 from the anti-reflective coating 120 (i.e., on major surface 114) (not shown). In some embodiments of the article 100, layer 120C, as shown in FIG. 1, can serve as a capping layer (e.g., capping layer 131 as shown in FIGS. 2A and 2B and described in the sections below).

The physical thickness of the anti-reflective coating 120 may be in the range from about 50 nm to less than 500 nm. In some instances, the physical thickness of the anti-reflective coating 120 may be in the range from about 10 nm to less than 500 nm, from about 50 nm to less than 500 nm, from about 75 nm to less than 500 nm, from about 100 nm to less than 500 nm, from about 125 nm to less than 500 nm, from about 150 nm to less than 500 nm, from about 175 nm to less than 500 nm, from about 200 nm to less than 500 nm, from about 225 nm to less than 500 nm, from about 250 nm to less than 500 nm, from about 300 nm to less than 500 nm, from about 350 nm to less than 500 nm, from about 400 nm to less than 500 nm, from about 450 nm to less than 500 nm, from about 200 nm to about 450 nm, and all ranges and sub-ranges therebetween. For example, the physical thickness of the anti-reflective coating 120 may be from 10 nm to 490 nm, or from 10 nm to 480 nm, or from 10 nm to 475 nm, or from 10 nm to 460 nm, or from 10 nm to 450 nm, or from 10 nm to 430 nm, or from 10 nm to 425 nm, or from 10 nm to 420 nm, or from 10 nm to 410 nm, or from 10 nm to 400 nm, or from 10 nm to 350 nm, or from 10 nm to 300 nm, or from 10 nm to 250 nm, or from 10 nm to 225 nm, or from 10 nm to 200 nm, or from 15 nm to 490 nm, or from 20 nm to 490 nm, or from 25 nm to 490 nm, or from 30 nm to 490 nm, or from 35 nm to 490 nm, or from 40 nm to 490 nm, or from 45 nm to 490 nm, or from 50 nm to 490 nm, or from 55 nm to 490 nm, or from 60 nm to 490 nm, or from 65 nm to 490 nm, or from 70 nm to 490 nm, or from 75 nm to 490 nm, or from 80 nm to 490 nm, or from 85 nm to 490 nm, or from 90 nm to 490 nm, or from 95 nm to 490 nm, or from 100 nm to 490 nm, or from 10 nm to 485 nm, or from 15 nm to 480 nm, or from 20 nm to 475 nm, or from 25 nm to 460 nm, or from 30 nm to 450 nm, or from 35 nm to 440 nm, or from 40 nm to 430 nm, or from 50 nm to 425 nm, or from 55 nm to 420 nm, or from 60 nm to 410 nm, or from 70 nm to 400 nm, or from 75 nm to 400 nm, or from 80 nm to 390 nm, or from 90 nm to 380 nm, or from 100 nm to 375 nm, or from 110 nm to 370 nm, or from 120 nm to 360 nm, or from 125 nm to 350 nm, or from 130 nm to 325 nm, or from 140 nm to 320 nm, or from 150 nm to 310 nm, or from 160 nm to 300 nm, or from 170 nm to 300 nm, or from 175 nm to 300 nm, or from 180 nm to 290 nm, or from 190 nm to 280 nm, or from 200 nm to 275 nm.

Figure 2B:
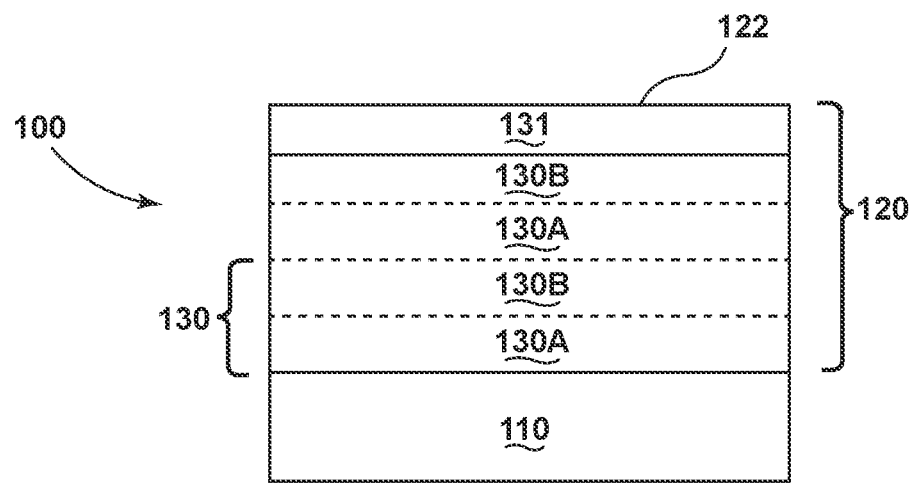
FIG. 2B is a side view of an article, according to one or more embodiments.

In one or more embodiments, as shown in FIGS. 2A and 2B, the anti-reflective coating 120 of the article 100 may include a period 130 comprising two or more layers. In one or more embodiments, the two or more layers may be characterized as having different refractive indices from each another. In some embodiments, the period 130 includes a first low RI layer 130A and a second high RI layer 130B. The difference in the refractive index of the first low RI layer 130A and the second high RI layer 130B may be about 0.01 or greater, 0.05 or greater, 0.1 or greater or even 0.2 or greater. In some implementations, the refractive index of the low RI layer(s) 130A is within the refractive index of the substrate 110 such that the refractive index of the low RI layer(s) 130A is less than about 1.8, and the high RI layer(s) 130B have a refractive index that is greater than 1.8.

As shown in FIG. 2A, the anti-reflective coating 120 may include a plurality of periods (130). A single period includes a first low RI layer 130A and a second high RI layer 130B, such that when a plurality of periods are provided, the first low RI layer 130A (designated for illustration as "L") and the second high RI layer 130B (designated for illustration as "H") alternate in the following sequence of layers: L/H/L/H or H/L/H/L, such that the first low RI layer and the second high RI layer appear to alternate along the physical thickness of the anti-reflective coating 120. In the example in FIG. 2A, the anti-reflective coating 120 includes three periods 130 such that there are three pairs of low RI and high RI layers 130A and 130B, respectively. In the example in FIG. 2B, the anti-reflective coating 120 includes two periods 130 such that there are two pairs of low RI and high RI layers 130A and 130B, respectively. In some embodiments, the anti-reflective coating 120 may include up to 25 periods. For example, the anti-reflective coating 120 may include from about 2 to about 20 periods, from about 2 to about 15 periods, from about 2 to about 10 periods, from about 2 to about 12 periods, from about 3 to about 8 periods, from about 3 to about 6 periods.

In the embodiments of the article 100 shown in FIGS. 2A and 2B, the anti-reflective coating 120 may include an additional capping layer 131, which may include a lower refractive index material than the second high RI layer 130B. In some implementations, the refractive index of the capping layer 131 is the same or substantially the same as the refractive index of the low RI layers 130A.

As used herein, the terms "low RI" and "high RI" refer to the relative values for the RI of each layer relative to the RI of another layer within the anti-reflective coating 120 (e.g., low RI<high RI). In one or more embodiments, the term "low RI" when used with the first low RI layer 130A or with the capping layer 131, includes a range from about 1.3 to about 1.7. In one or more embodiments, the term "high RI" when used with the high RI layer 130B, includes a range from about 1.6 to about 2.5. In some instances, the ranges for low RI and high RI may overlap; however, in most instances, the layers of the anti-reflective coating 120 have the general relationship regarding RI of: low RI<high RI.

Exemplary materials suitable for use in the anti-reflective coating 120 include: $SiO_2$, $Al_2O_3$, $GeO_2$, SiO, $AlO_xN_y$, AlN, oxygen-doped $SiN_x$, $SiN_x$, $SiO_xN_y$, $Si_uAl_vO_xN_y$, $TiO_2$, $ZrO_2$, TiN, MgO, $HfO_2$, $Y_2O_3$, $ZrO_2$, diamond-like carbon, and $MgAl_2O_4$.

Some examples of suitable materials for use in the low RI layer(s) 130A include $SiO_2$, $Al_2O_3$, $GeO_2$, SiO, $AlO_xN_y$, $SiO_xN_y$, $Si_uAl_vO_xN_y$, MgO, and $MgAl_2O_4$. The nitrogen content of the materials for use in the first low RI layer 130A (i.e., the layer 130A in contact with the substrate 110) may be minimized (e.g., in materials, for example, $Al_2O_3$ and $MgAl_2O_4$). In some embodiments, the low RI layer(s) 130A and a capping layer 131, if present, in the anti-reflective coating 120 can comprise one or more of a silicon-containing oxide (e.g., silicon dioxide), a silicon-containing nitride (e.g., an oxide-doped silicon nitride, silicon nitride, etc.), and a silicon-containing oxynitride (e.g., silicon oxynitride). In some embodiments of the article 100, the low RI layer(s) 130A and the capping layer 131 comprise a silicon-containing oxide, e.g., $SiO_2$.

Some examples of suitable materials for use in the high RI layer(s) 130B include $Si_uAl_vO_xN_y$, AN, oxygen-doped $SiN_x$, $SiN_x$, $Si_3N_4$, $AlO_xN_y$, $SiO_xN_y$, $HfO_2$, $TiO_2$, $ZrO_2$, $Y_2O_3$, $ZrO_2$, $Al_2O_3$, and diamond-like carbon. The oxygen content of the materials for the high RI layer(s) 130B may be minimized, especially in $SiN_x$ or $AlN_x$ materials. The foregoing materials may be hydrogenated up to about 30% by weight. In some embodiments, the high RI layer(s) 130B in the anti-reflective coating 120 can comprise one or more of a silicon-containing oxide (e.g., silicon dioxide), a silicon-containing nitride (e.g., an oxide-doped silicon nitride, silicon nitride, etc.), and a silicon-containing oxynitride (e.g., silicon oxynitride). In some embodiments of the article 100, the high RI layer(s) 130B comprise a silicon-containing nitride, e.g., $Si_3N_4$. Where a material having a medium refractive index is desired between a high RI and a low RI, some embodiments may utilize AlN and/or $SiO_xN_y$. The hardness of the high RI layer may be characterized specifically. In some embodiments, the maximum hardness of the high RI layer(s) 130B, as measured by the Berkovich Indenter Hardness Test over an indentation depth from about 100 nm to about 500 nm (i.e., as on a hardness test stack with a 2 micron thick layer of the material of the layer 130B disposed on a substrate 110), may be about 18 GPa or greater, about 20 GPa or greater, about 22 GPa or greater, about 24 GPa or greater, about 26 GPa or greater, and all values therebetween.

In one or more embodiments at least one of the layers of the anti-reflective coating 120 of the article 100 may include a specific optical thickness range. As used herein, the term "optical thickness" is determined by (n*d), where "n" refers to the RI of the sub-layer and "d" refers to the physical thickness of the layer. In one or more embodiments, at least one of the layers of the anti-reflective coating 120 may include an optical thickness in the range from about 2 nm to about 200 nm, from about 10 nm to about 100 nm, or from about 15 nm to about 100 nm. In some embodiments, all of the layers in the anti-reflective coating 120 may each have an optical thickness in the range from about 2 nm to about 200 nm, from about 10 nm to about 100 nm, or from about 15 nm to about 100 nm. In some cases, at least one layer of the anti-reflective coating 120 has an optical thickness of about 50 nm or greater. In some cases, each of the low RI layers 130A have an optical thickness in the range from about 2 nm to about 200 nm, from about 10 nm to about 100 nm, or from about 15 nm to about 100 nm. In other cases, each of the high RI layers 130B have an optical thickness in the range from about 2 nm to about 200 nm, from about 10 nm to about 100 nm, or from about 15 nm to about 100 nm. In some embodiments, each of the high RI layers 130B have an optical thickness in the range from about 2 nm to about 500 nm, or from about 10 nm to about 490 nm, or from about 15 nm to about 480 nm, or from about 25 nm to about 475 nm, or from about 25 nm to about 470 nm, or from about 30 nm to about 465 nm, or from about 35 nm to about 460 nm, or from about 40 nm to about 455 nm, or from about 45 nm to about 450 nm, and any and all sub-ranges between these values. In some embodiments, the capping layer 131 (see FIGS. 2A, 2B and 3), or the outermost low RI layer 130A for configurations without a capping layer 131, has a physical thickness of less than about 100 nm, less than about 90 nm, less than about 85 nm, or less than 80 nm.

As noted earlier, embodiments of the article 100 are configured such that the physical thickness of one or more of the layers of the anti-reflective coating 120 are minimized. In one or more embodiments, the physical thickness of the high RI layer(s) 130B and/or the low RI layer(s) 130A are minimized such that they total less than 500 nm. In one or more embodiments, the combined physical thickness of the high RI layer(s) 130B, the low RI layer(s) 130A and any capping layer 131 is less than 500 nm, less than 490 nm, less than 480 nm, less than 475 nm, less than 470 nm, less than 460 nm, less than about 450 nm, less than 440 nm, less than 430 nm, less than 425 nm, less than 420 nm, less than 410 nm, less than about 400 nm, less than about 350 nm, less than about 300 nm, less than about 250 nm, or less than about 200 nm, and all total thickness values below 500 nm and above 10 nm. For example, the combined physical thickness of the high RI layer(s) 130B, the low RI layer(s) 130A and any capping layer 131 may be from 10 nm to 490 nm, or from 10 nm to 480 nm, or from 10 nm to 475 nm, or from 10 nm to 460 nm, or from 10 nm to 450 nm, or from 10 nm to 450 nm, or from 10 nm to 430 nm, or from 10 nm to 425 nm, or from 10 nm to 420 nm, or from 10 nm to 410 nm, or from 10 nm to 400 nm, or from 10 nm to 350 nm, or from 10 nm to 300 nm, or from 10 nm to 250 nm, or from 10 nm to 225 nm, or from 10 nm to 200 nm, or from 15 nm to 490 nm, or from 20 nm to 490 nm, or from 25 nm to 490 nm, or from 30 nm to 490 nm, or from 35 nm to 490 nm, or from 40 nm to 490 nm, or from 45 nm to 490 nm, or from 50 nm to 490 nm, or from 55 nm to 490 nm, or from 60 nm to 490 nm, or from 65 nm to 490 nm, or from 70 nm to 490 nm, or from 75 nm to 490 nm, or from 80 nm to 490 nm, or from 85 nm to 490 nm, or from 90 nm to 490 nm, or from 95 nm to 490 nm, or from 100 nm to 490 nm, or from 10 nm to 485 nm, or from 15 nm to 480 nm, or from 20 nm to 475 nm, or from 25 nm to 460 nm, or from 30 nm to 450 nm, or from 35 nm to 440 nm, or from 40 nm to 430 nm, or from 50 nm to 425 nm, or from 55 nm to 420 nm, or from 60 nm to 410 nm, or from 70 nm to 400 nm, or from 75 nm to 400 nm, or from 80 nm to 390 nm, or from 90 nm to 380 nm, or from 100 nm to 375 nm, or from 110 nm to 370 nm, or from 120 nm to 360 nm, or from 125 nm to 350 nm, or from 130 nm to 325 nm, or from 140 nm to 320 nm, or from 150 nm to 310 nm, or from 160 nm to 300 nm, or from 170 nm to 300 nm, or from 175 nm to 300 nm, or from 180 nm to 290 nm, or from 190 nm to 280 nm, or from 200 nm to 275 nm.

In one or more embodiments, the combined physical thickness of the high RI layer(s) 130B may be characterized. For example, in some embodiments, the combined physical thickness of the high RI layer(s) 130B may be about 90 nm or greater, about 100 nm or greater, about 150 nm or greater, about 200 nm or greater, about 250 nm or greater, or about 300 nm or greater, but less than 500 nm. The combined physical thickness is the calculated combination of the physical thicknesses of the individual high RI layer(s) 130B in the anti-reflective coating 120, even when there are intervening low RI layer(s) 130A or other layer(s). In some embodiments, the combined physical thickness of the high RI layer(s) 130B, which may also comprise a high-hardness material (e.g., a nitride or an oxynitride), may be greater than 30% of the total physical thickness of the anti-reflective coating (or, alternatively referred to in the context of volume). For example, the combined physical thickness (or volume) of the high RI layer(s) 130B may be about 30% or greater, about 35% or greater, about 40% or greater, about 45% or greater, about 50% or greater, about 55% or greater, or even about 60% or greater, of the total physical thickness (or volume) of the anti-reflective coating 120.

In some embodiments, the anti-reflective coating 120 exhibits a photopic average light reflectance of 1% or less, 0.9% or less, 0.8% or less, 0.7% or less, 0.6% or less, 0.5% or less, 0.4% or less, 0.3% or less, 0.25% or less, or 0.2% or less, over the optical wavelength regime, when measured at the anti-reflective surface 122 (e.g., when removing the reflections from an uncoated back surface (e.g., 114 in FIG. 1) of the article 100, for example through using index-matching oils on the back surface coupled to an absorber, or other known methods). In some instances, the anti-reflective coating 120 may exhibit such average light reflectance over other wavelength ranges, for example, from about 450 nm to about 650 nm, from about 420 nm to about 680 nm, from about 420 nm to about 700 nm, from about 420 nm to about 740 nm, from about 420 nm to about 850 nm, or from about 420 nm to about 950 nm. In some embodiments, the anti-reflective surface 122 exhibits a photopic average light transmission of about 90% or greater, 92% or greater, 94% or greater, 96% or greater, or 98% or greater, over the optical wavelength regime. In some embodiments, the anti-reflective surface 122 exhibits an average light transmission of about 87% or greater, 88% or greater, 89% or greater, 90% or greater, 91% or greater, 92% or greater, 93% or greater, 94% or greater, or 95% or greater, over the optical wavelength regime in the infrared spectrum from 800 nm to 1000 nm, from 900 nm to 1000 nm, or from 930 nm to 950 nm. Unless otherwise specified, the average reflectance or transmittance is measured at an incident illumination angle of 0 degrees (however, such measurements may be provided at incident illumination angles of 45 degrees or 60 degrees).

Figure 3:
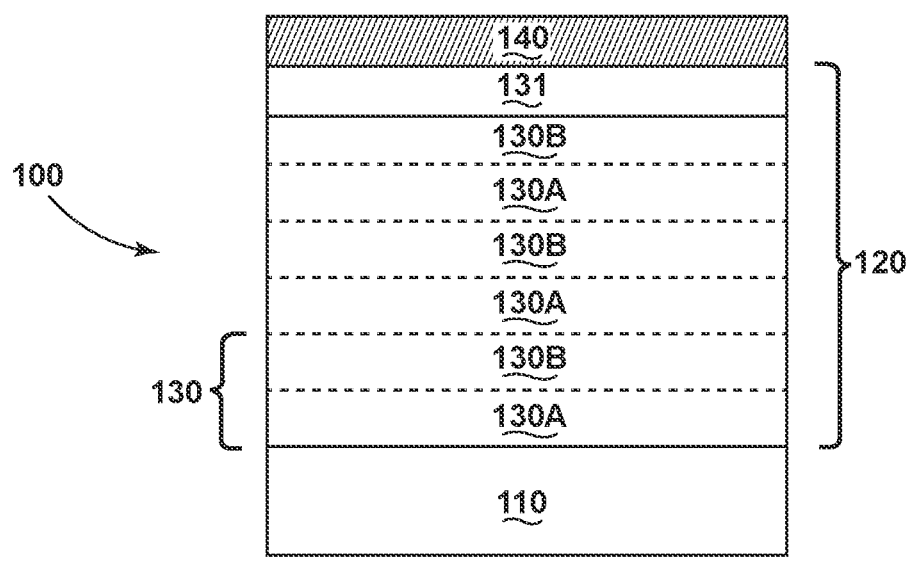
FIG. 3 is a side view of an article, according to one or more embodiments.

The article 100 may include one or more additional coatings 140 disposed on the anti-reflective coating, as shown in FIG. 3. In one or more embodiments, the additional coating may include an easy-to-clean coating. An example of a suitable easy-to-clean coating is described in U.S. patent application Ser. No. 13/690,904, entitled "PROCESS FOR MAKING OF GLASS ARTICLES WITH OPTICAL AND EASY-TO-CLEAN COATINGS," filed on Nov. 30, 2012, which is incorporated herein in its entirety by reference. The easy-to-clean coating may have a physical thickness in the range from about 5 nm to about 50 nm and may include known materials, for example, fluorinated silanes. In some embodiments, the easy-to-clean coating may have a physical thickness in the range from about 1 nm to about 40 nm, from about 1 nm to about 30 nm, from about 1 nm to about 25 nm, from about 1 nm to about 20 nm, from about 1 nm to about 15 nm, from about 1 nm to about 10 nm, from about 5 nm to about 50 nm, from about 10 nm to about 50 nm, from about 15 nm to about 50 nm, from about 7 nm to about 20 nm, from about 7 nm to about 15 nm, from about 7 nm to about 12 nm or from about 7 nm to about 10 nm, and all ranges and sub-ranges therebetween.

The additional coating 140 may include a scratch resistant coating. Exemplary materials used in the scratch resistant coating may include an inorganic carbide, nitride, oxide, diamond-like material, or combination of these. Examples of suitable materials for the scratch resistant coating include metal oxides, metal nitrides, metal oxynitride, metal carbides, metal oxycarbides, and/or combinations thereof. Exemplary metals include B, Al, Si, Ti, V, Cr, Y, Zr, Nb, Mo, Sn, Hf, Ta and W. Specific examples of materials that may be utilized in the scratch resistant coating may include $Al_2O_3$, AlN, $AlO_xN_y$, $Si_3N_4$, $SiO_xN_y$, $Si_uAl_vO_xN_y$, diamond, diamond-like carbon, $Si_xC_y$, $Si_xO_yC_z$, $ZrO_2$, $TiO_xN_y$, and combinations thereof.

In some embodiments, the additional coating 140 includes a combination of easy-to-clean material and scratch resistant material. In one example, the combination includes an easy-to-clean material and diamond-like carbon. Such additional coatings 140 may have a physical thickness in the range from about 5 nm to about 20 nm. The constituents of the additional coating 140 may be provided in separate layers. For example, the diamond-like carbon material may be disposed as a first layer and the easy-to-clean material can be disposed as a second layer on the first layer of diamond-like carbon. The physical thicknesses of the first layer and the second layer may be in the ranges provided above for the additional coating. For example, the first layer of diamond-like carbon may have a physical thickness of about 1 nm to about 20 nm or from about 4 nm to about 15 nm (or more specifically about 10 nm) and the second layer of the easy-to-clean material may have a physical thickness of about 1 nm to about 10 nm (or more specifically about 6 nm). The diamond-like coating may include tetrahedral amorphous carbon (Ta—C), Ta—C:H, and/or Ta—C—H.

A further aspect of this disclosure pertains to a method for forming the articles 100 described herein (e.g., as shown in FIGS. 1-3). In some embodiments, the method includes providing a substrate having a major surface in a coating chamber, forming a vacuum in the coating chamber, forming a durable anti-reflective coating having a physical thickness of about 500 nm or less on the major surface, optionally forming an additional coating comprising at least one of an easy-to-clean coating and a scratch resistant coating, as situated on the anti-reflective coating, and removing the substrate from the coating chamber. In one or more embodiments, the anti-reflective coating and the additional coating are formed in either the same coating chamber or without breaking vacuum in separate coating chambers.

In one or more embodiments, the method may include loading the substrate on carriers which are then used to move the substrate in and out of different coating chambers, under load lock conditions so that a vacuum is preserved as the substrate is moved.

The anti-reflective coating 120 (e.g., including layers 130A, 130B and 131) and/or the additional coating 140 may be formed using various deposition methods, for example, vacuum deposition techniques, chemical vapor deposition (e.g., plasma enhanced chemical vapor deposition (PECVD), low-pressure chemical vapor deposition, atmospheric pressure chemical vapor deposition, and plasma-enhanced atmospheric pressure chemical vapor deposition), physical vapor deposition (e.g., reactive or nonreactive sputtering or laser ablation), thermal or e-beam evaporation and/or atomic layer deposition. Liquid-based methods may also be used for example spraying or slot coating. Where vacuum deposition is utilized, inline processes may be used to form the anti-reflective coating 120 and/or the additional coating 140 in one deposition run. In some instances, the vacuum deposition can be made by a linear PECVD source. In some implementations of the method, and articles 100 made according to the method, the anti-reflective coating 120 can be prepared using a sputtering process (e.g., a reactive sputtering process), chemical vapor deposition (CVD) process, plasma-enhanced chemical vapor deposition process, or some combination of these processes. In one implementation, an anti-reflective coating 120 comprising low RI layer(s) 130A and high RI layer(s) 130B can be prepared according to a reactive sputtering process. According to some embodiments, the anti-reflective coating 120 (including low RI layer 130A, high RI layer 130B and capping layer 131) of the article 100 is fabricated using a metal-mode, reactive sputtering in a rotary drum coater. The reactive sputtering process conditions were defined through careful experimentation to achieve the desired combinations of hardness, refractive index, optical transparency, low color and controlled film stress.

In some embodiments, the method may include controlling the physical thickness of the anti-reflective coating 120 (e.g., including its layers 130A, 130B and 131) and/or the additional coating 140 so that it does not vary by more than about 4% along about 80% or more of the area of the anti-reflective surface 122 or from the target physical thickness for each layer at any point along the substrate area. In some embodiments, the physical thickness of the anti-reflective layer coating 120 and/or the additional coating 140 is controlled so that it does not vary by more than about 4% along about 95% or more of the area of the anti-reflective surface 122.

In some embodiments of the article 100 depicted in FIGS. 1-3, the anti-reflective coating 120 is characterized by a residual stress of less than about +50 MPa (tensile) to about −1000 MPa (compression). In some implementations of the article 100, the anti-reflective coating 120 is characterized by a residual stress from about −50 MPa to about −1000 MPa (compression), or from about −75 MPa to about −800 MPa (compression). Unless otherwise noted, residual stress in the anti-reflective coating 120 is obtained by measuring the curvature of the substrate 110 before and after deposition of the anti-reflective coating 120, and then calculating residual film stress according to the Stoney equation according to principles known and understood by those with ordinary skill in the field of the disclosure.

Figure 4A:
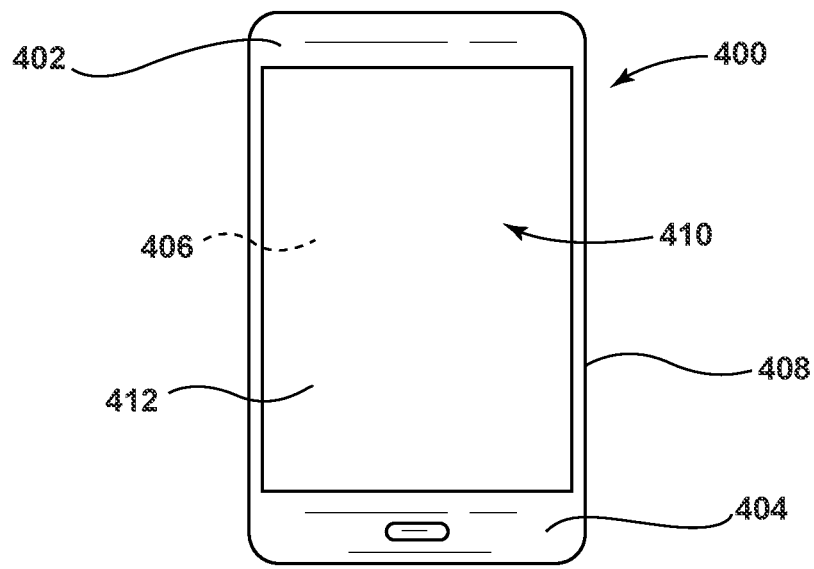
FIG. 4A is a plan view of an exemplary electronic device incorporating any of the articles disclosed herein.
Figure 4B:
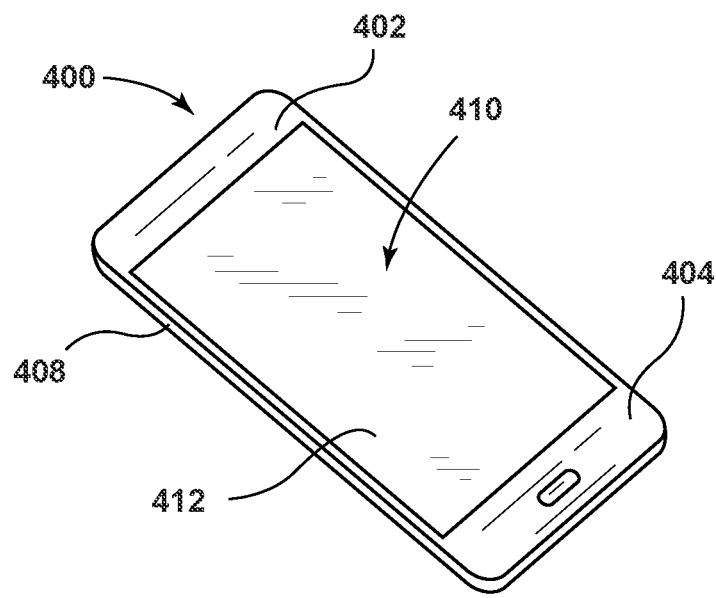
FIG. 4B is a perspective view of the exemplary electronic device of FIG. 4A.

The articles 100 disclosed herein (e.g., as shown in FIGS. 1-3) may be incorporated into a device article, for example, a device article with a display (or display device articles) (e.g., consumer electronics, including mobile phones, tablets, computers, navigation systems, wearable devices (e.g., watches) and the like), augmented-reality displays, heads-up displays, glasses-based displays, architectural device articles, transportation device articles (e.g., automotive, trains, aircraft, sea craft, etc.), appliance device articles, or any device article that benefits from some transparency, scratch-resistance, abrasion resistance or a combination thereof. An exemplary device article incorporating any of the articles disclosed herein (e.g., as consistent with the articles 100 depicted in FIGS. 1-3) is shown in FIGS. 4A and 4B. Specifically, FIGS. 4A and 4B show a consumer electronic device 400 including a housing 402 having a front 404, a back 406, and side surfaces 408; electrical components (not shown) that are at least partially inside or entirely within the housing and including at least a controller, a memory, and a display 410 at or adjacent to the front surface of the housing; and a cover substrate 412 at or over the front surface of the housing such that it is over the display. In some embodiments, the cover substrate 412 may include any of the articles disclosed herein. In some embodiments, at least one of a portion of the housing or the cover glass comprises the articles disclosed herein.

Figure 5:
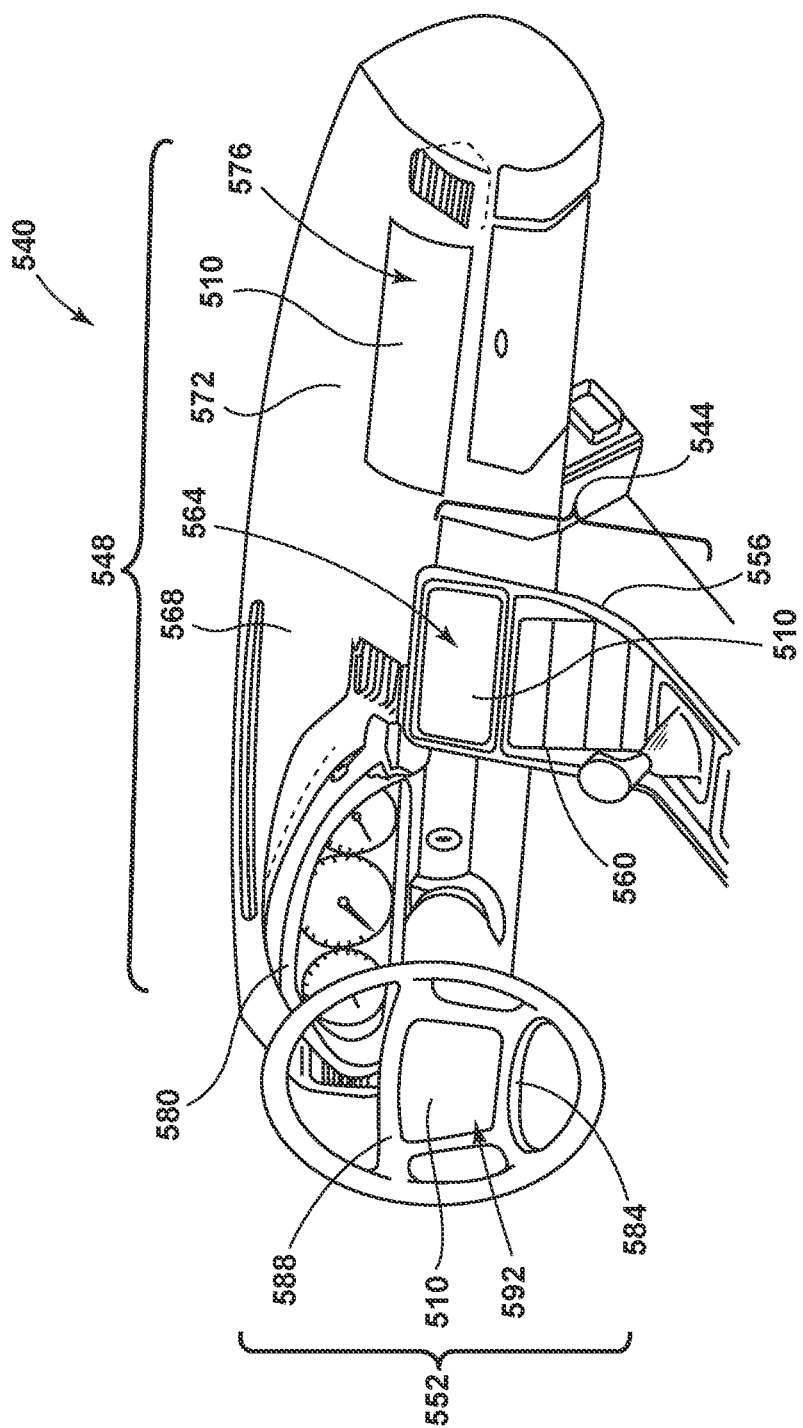
FIG. 5 is a perspective view of a vehicle interior with vehicular interior systems that may incorporate any of the articles disclosed herein.

According to some embodiments, the articles 100 (e.g., as shown in FIGS. 1-3) may be incorporated within a vehicle interior with vehicular interior systems, as depicted in FIG. 5. More particularly, the article 100 may be used in conjunction with a variety of vehicle interior systems. A vehicle interior 540 is depicted that includes three different examples of a vehicle interior system 544, 548, 552. Vehicle interior system 544 includes a center console base 556 with a surface 560 including a display 564. Vehicle interior system 548 includes a dashboard base 568 with a surface 572 including a display 576. The dashboard base 568 typically includes an instrument panel 580 which may also include a display. Vehicle interior system 552 includes a dashboard steering wheel base 584 with a surface 588 and a display 592. In one or more examples, the vehicle interior system may include a base that is an armrest, a pillar, a seat back, a floor board, a headrest, a door panel, or any portion of the interior of a vehicle that includes a surface. It will be understood that the article 100 described herein can be used interchangeably in each of vehicle interior systems 544, 548 and 552.

According to some embodiments, the articles 100 (e.g., as shown in FIGS. 1-3) may be used in a passive optical element, for example a lens, windows, lighting covers, eyeglasses, or sunglasses, that may or may not be integrated with an electronic display or electrically active device.

Referring again to FIG. 5, the displays 564, 576 and 592 may each include a housing having front, back, and side surfaces. At least one electrical component is at least partially within the housing. A display element is at or adjacent to the front surface of the housings. The article 100 (see FIGS. 1-3) is disposed over the display elements. It will be understood that the article 100 may also be used on, or in conjunction with, the armrest, the pillar, the seat back, the floor board, the headrest, the door panel, or any portion of the interior of a vehicle that includes a surface, as explained above. According to various examples, the displays 564, 576 and 592 may be a vehicle visual display system or vehicle infotainment system. It will be understood that the article 100 may be incorporated in a variety of displays and structural components of autonomous vehicles and that the description provided herein with relation to conventional vehicles is not limiting.

EXAMPLES

Various embodiments will be further clarified by the following examples.

Example 1

The as-fabricated samples of Example 1 ("Ex. 1") were formed by providing a glass substrate having a nominal composition of 69 mol. % $SiO_2$, 10 mol. % $Al_2O_3$, 15 mol. % $Na_2O$, and 5 mol. % MgO and disposing an anti-reflective coating having five (5) layers on the glass substrate, as shown in FIG. 2B and Table 1 below. The anti-reflective coating (e.g., as consistent with the anti-reflective coatings 120 outlined in the disclosure) of each of the as-fabricated samples in this Example was deposited using a reactive sputtering process.

The modeled samples of Example 1 ("Ex. 1-M") were assumed to employ a glass substrate having the same composition of the glass substrate employed in the as-fabricated samples of this example. Further, the anti-reflective coating of each of the modeled samples was assumed to have the layer materials and physical thickness as shown in Table 1 below. Optical properties reported for all examples were measured at near-normal incidence, unless otherwise noted.

TABLE 1

Anti-reflective coating attributes for Example 1

| Reference No. (see FIG. 2B) | Material | Refractive Index | Ex. 1-M Thickness (nm) | Ex. 1 Thickness (nm) |
|---|---|---|---|---|
| N/A | Air | 1.0 | | |
| 131 | $SiO_2$ | 1.48 | 84.7 | 86.0 |
| 130B | $Si_xN_y$ | 2.05 | 96.1 | 97.9 |
| 130A | $SiO_2$ | 1.48 | 21.2 | 21.7 |
| 130B | $Si_xN_y$ | 2.05 | 20.3 | 20.1 |
| 130A | $SiO_2$ | 1.48 | 25.0 | 25.0 |
| 110 | Glass substrate | 1.51 | | |
| Total thickness | | | 247.3 | 250.7 |
| Reflected color | Y | | 0.35 | 0.28 |
| | L* | | 3.2 | 5.8 |
| | a* | | −1.2 | 0.9 |
| | b* | | −2.7 | −5.7 |
| Hardness (GPa) | @ 100 nm depth | | | 10.6 |
| | @ 500 nm depth | | | 8.8 |
| Max hardness (from 100 nm to 500 nm depth) | Hmax (GPa) | | | 11.4 |
| | Depth (nm) | | | 147.0 |

TABLE 1-continued

Anti-reflective coating attributes for Example 1

| Reference No. (see FIG. 2B) | Material | Refractive Index | Ex. 1-M Thickness (nm) | Ex. 1 |
|---|---|---|---|---|
| Film stress | (MPa) | | | −466 |
| Surface roughness, $R_a$ | (nm) | | | 0.83 |

Example 2

The as-fabricated samples of Example 2 ("Ex. 2") were formed by providing a glass substrate having a nominal composition of 69 mol. % $SiO_2$, 10 mol. % $Al_2O_3$, 15 mol. % $Na_2O$, and 5 mol. % MgO and disposing an anti-reflective coating having five (5) layers on the glass substrate, as shown in FIG. 2B and Table 2 below. The anti-reflective coating (e.g., as consistent with the anti-reflective coatings 120 outlined in the disclosure) of each of the as-fabricated samples in this Example was deposited using a reactive sputtering process.

The modeled samples of Example 2 ("Ex. 2-M") were assumed to employ a glass substrate having the same composition of the glass substrate employed in the as-fabricated samples of this example. Further, the anti-reflective coating of each of the modeled samples was assumed to have the layer materials and physical thickness as shown in Table 2 below.

TABLE 2

Anti-reflective coating attributes for Example 2

| Reference No. (see FIG. 2B) | Material | Refractive Index | Ex. 2-M Thickness (nm) | Ex. 2 |
|---|---|---|---|---|
| N/A | Air | 1.0 | | |
| 131 | $SiO_2$ | 1.48 | 81.7 | 81.1 |
| 130B | $Si_xN_y$ | 2.05 | 119.0 | 117.8 |
| 130A | $SiO_2$ | 1.48 | 33.3 | 32.7 |
| 130B | $Si_xN_y$ | 2.05 | 14.2 | 14.4 |
| 130A | $SiO_2$ | 1.48 | 25.0 | 25.0 |
| 110 | Glass substrate | 1.51 | | |
| Total thickness | | | 273.2 | 271.0 |
| Reflected color | Y | | 0.56 | 0.47 |
| | L* | | 5.1 | 6.4 |
| | a* | | −1.5 | −0.3 |
| | b* | | −3.4 | −3.7 |
| Hardness (GPa) | @ 100 nm depth | | | 11.1 |
| | @ 500 nm depth | | | 8.9 |
| Max hardness (from 100 nm to 500 nm depth) | Hmax (GPa) | | | 11.8 |
| | Depth (nm) | | | 135.0 |
| Film stress | (MPa) | | | −521 |
| Surface roughness, $R_a$ | (nm) | | | 0.91 |

Example 3

The as-fabricated samples of Example 3 ("Ex. 3") were formed by providing a glass substrate having a nominal composition of 69 mol. % $SiO_2$, 10 mol. % $Al_2O_3$, 15 mol. % $Na_2O$, and 5 mol. % MgO and disposing an anti-reflective coating having five (5) layers on the glass substrate, as shown in FIG. 2B and Table 3 below. The anti-reflective coating (e.g., as consistent with the anti-reflective coatings 120 outlined in the disclosure) of each of the as-fabricated samples in this Example was deposited using a reactive sputtering process.

The modeled samples of Example 3 ("Ex. 3-M") were assumed to employ a glass substrate having the same composition of the glass substrate employed in the as-fabricated samples of this example. Further, the anti-reflective coating of each of the modeled samples was assumed to have the layer materials and physical thickness as shown in Table 3 below.

TABLE 3

Anti-reflective coating attributes for Example 3

| Reference No. (see FIG. 2B) | Material | Refractive Index | Ex. 3-M Thickness (nm) | Ex. 3 |
|---|---|---|---|---|
| N/A | Air | 1.0 | | |
| 131 | $SiO_2$ | 1.48 | 90.7 | 89.7 |
| 130B | $Si_xN_y$ | 2.05 | 70.0 | 69.9 |
| 130A | $SiO_2$ | 1.48 | 23.3 | 21.5 |
| 130B | $Si_xN_y$ | 2.05 | 27.5 | 27.5 |
| 130A | $SiO_2$ | 1.48 | 25.0 | 25.0 |
| 110 | Glass substrate | 1.51 | | |
| Total thickness | | | 236.5 | 233.6 |
| Reflected color | Y | | 0.28 | 0.24 |
| | L* | | 2.5 | 2.9 |
| | a* | | 0.1 | −0.9 |
| | b* | | −3.1 | −1.3 |
| Hardness (GPa) | @ 100 nm depth | | | 10.5 |
| | @ 500 nm depth | | | 8.9 |
| Max hardness (from 100 nm to 500 nm depth) | Hmax (GPa) | | | 10.7 |
| | Depth (nm) | | | 135.0 |
| Film stress | (MPa) | | | −523 |
| Surface roughness, $R_a$ | (nm) | | | 0.83 |

Example 3A

The as-fabricated samples of Example 3A ("Ex. 3A") were formed by providing a glass substrate having a nominal composition of 69 mol. % $SiO_2$, 10 mol. % $Al_2O_3$, 15 mol. % $Na_2O$, and 5 mol. % MgO and disposing an anti-reflective coating having five (5) layers on the glass substrate, as shown in FIG. 2B and Table 3A below. The anti-reflective coating (e.g., as consistent with the anti-reflective coatings 120 outlined in the disclosure) of each of the as-fabricated samples in this Example was deposited using a reactive sputtering process.

The modeled samples of Example 3A ("Ex. 3-M") were assumed to employ a glass substrate having the same composition of the glass substrate employed in the as-fabricated samples of this example. Further, the anti-reflective coating of each of the modeled samples was assumed to have the layer materials and physical thickness as shown in Table 3A below.

TABLE 3A

Anti-reflective coating attributes for Example 3A

| Reference No. (see FIG. 2B) | Material | Refractive Index | Ex. 3-M Thickness (nm) | Ex. 3A |
|---|---|---|---|---|
| N/A | Air | 1.0 | | |
| 131 | $SiO_2$ | 1.48 | 90.7 | 90.8 |
| 130B | $Si_xN_y$ | 2.05 | 70.0 | 73.5 |
| 130A | $SiO_2$ | 1.48 | 23.3 | 20.6 |
| 130B | $Si_xN_y$ | 2.05 | 27.5 | 27.4 |
| 130A | $SiO_2$ | 1.48 | 25.0 | 25.0 |
| 110 | Glass substrate | 1.51 | | |
| Total thickness | | | 236.5 | 237.4 |

TABLE 3A-continued

Anti-reflective coating attributes for Example 3A

| Reference No. (see FIG. 2B) | Material | Refractive Index | Ex. 3-M Thickness (nm) | Ex. 3A Thickness (nm) |
|---|---|---|---|---|
| Reflected color | Y | | 0.28 | 0.24 |
| | L* | | 2.5 | 4.3 |
| | a* | | 0.1 | 0.7 |
| | b* | | −3.1 | −3.7 |
| Hardness (GPa) | @ 100 nm depth | | | 10.2 |
| | @ 500 nm depth | | | 8.8 |
| Max hardness (from 100 nm to 500 nm depth) | Hmax (GPa) | | | 10.5 |
| | Depth (nm) | | | 135.0 |
| Film stress | (MPa) | | | −517 |
| Surface roughness, $R_a$ | (nm) | | | 0.85 |

Example 4

The as-fabricated samples of Example 4 ("Ex. 4") were formed by providing a glass substrate having a nominal composition of 69 mol. % $SiO_2$, 10 mol. % $Al_2O_3$, 15 mol. % $Na_2O$, and 5 mol. % MgO and disposing an anti-reflective coating having seven (7) layers on the glass substrate, as shown in FIG. 2A and Table 4 below. The anti-reflective coating (e.g., as consistent with the anti-reflective coatings 120 outlined in the disclosure) of each of the as-fabricated samples in this Example was deposited using a reactive sputtering process.

The modeled samples of Example 4 ("Ex. 4-M") were assumed to employ a glass substrate having the same composition of the glass substrate employed in the as-fabricated samples of this example. Further, the anti-reflective coating of each of the modeled samples was assumed to have the layer materials and physical thickness as shown in Table 4 below.

TABLE 4

Anti-reflective coating attributes for Example 4

| Reference No. (see FIG. 2A) | Material | Refractive Index | Ex. 4-M Thickness (nm) | Ex. 4 Thickness (nm) |
|---|---|---|---|---|
| N/A | Air | 1.0 | | |
| 131 | $SiO_2$ | 1.48 | 87.0 | 89.5 |
| 130B | $Si_xN_y$ | 2.05 | 135.1 | 136.1 |
| 130A | $SiO_2$ | 1.48 | 9.3 | 9.2 |
| 130B | $Si_xN_y$ | 2.05 | 135.7 | 138.3 |
| 130A | $SiO_2$ | 1.48 | 28.0 | 28.1 |
| 130B | $Si_xN_y$ | 2.05 | 19.7 | 19.9 |
| 130A | $SiO_2$ | 1.48 | 25.0 | 25.0 |
| 110 | Glass substrate | 1.51 | | |
| Total thickness | | | 439.7 | 446.1 |
| Reflected color | Y | | 0.41 | 0.39 |
| | L* | | 3.7 | 6.5 |
| | a* | | −0.8 | −3.0 |
| | b* | | −4.0 | −5.1 |
| Hardness (GPa) | @ 100 nm depth | | | 11.3 |
| | @ 500 nm depth | | | 10.3 |
| Max hardness (from 100 nm to 500 nm depth) | Hmax (GPa) | | | 13.5 |
| | Depth (nm) | | | 172.0 |
| Film stress | (MPa) | | | −724 |
| Surface roughness, $R_a$ | (nm) | | | 1.00 |

Example 5

The as-fabricated samples of Example 5 ("Ex. 5") were formed by providing a glass substrate having a nominal composition of 69 mol. % $SiO_2$, 10 mol. % $Al_2O_3$, 15 mol. % $Na_2O$, and 5 mol. % MgO and disposing an anti-reflective coating having five (5) layers on the glass substrate, as shown in FIG. 2B and Table 5 below. The anti-reflective coating (e.g., as consistent with the anti-reflective coatings 120 outlined in the disclosure) of each of the as-fabricated samples in this Example was deposited using a reactive sputtering process.

The modeled samples of Example 5 ("Ex. 5-M") were assumed to employ a glass substrate having the same composition of the glass substrate employed in the as-fabricated samples of this example. Further, the anti-reflective coating of each of the modeled samples was assumed to have the layer materials and physical thickness as shown in Table 5A below.

TABLE 5A

Anti-reflective coating attributes for Example 5

| Reference No. (see FIG. 2B) | Material | Refractive Index | Ex. 5-M Thickness (nm) | Ex. 5 Thickness (nm) |
|---|---|---|---|---|
| N/A | Air | 1.0 | | |
| 131 | $SiO_2$ | 1.48 | 82.2 | 81.9 |
| 130B | $Si_xN_y$ | 2.05 | 225.0 | 226.6 |
| 130A | $SiO_2$ | 1.48 | 15.7 | 16.7 |
| 130B | $Si_xN_y$ | 2.05 | 28.2 | 27.9 |
| 130A | $SiO_2$ | 1.48 | 25.0 | 25.0 |
| 110 | Glass substrate | 1.51 | | |
| Total thickness | | | 376.0 | 378.0 |
| Reflected color | Y | | 0.80 | 0.77 |
| | L* | | 7.2 | 10.2 |
| | a* | | −2.0 | −1.2 |
| | b* | | −4.4 | −5.5 |
| Hardness (GPa) | @ 100 nm depth | | | 11.9 |
| | @ 500 nm depth | | | 9.7 |
| Max hardness (from 100 nm to 500 nm depth) | Hmax (GPa) | | | 13.7 |
| | Depth (nm) | | | 200.0 |
| Film stress | (MPa) | | | −770 |
| Surface roughness, $R_a$ | (nm) | | | 0.99 |

Example 5A

The as-fabricated samples of Example 5A ("Ex. 5A") were formed by providing a glass substrate having a nominal composition of 69 mol. % $SiO_2$, 10 mol. % $Al_2O_3$, 15 mol. % $Na_2O$, and 5 mol. % MgO and disposing an anti-reflective coating having five (5) layers on the glass substrate, as shown in FIG. 2B and Table 5B below. The anti-reflective coating (e.g., as consistent with the anti-reflective coatings 120 outlined in the disclosure) of each of the as-fabricated samples in this Example was deposited using a reactive sputtering process.

The modeled samples of Example 5A ("Ex. 5-M") were assumed to employ a glass substrate having the same composition of the glass substrate employed in the as-fabricated samples of this example. Further, the anti-reflective coating of each of the modeled samples was assumed to have the layer materials and physical thickness as shown in Table 5B below.

TABLE 5B

Anti-reflective coating attributes for Example 5A

| Reference No. (see FIG. 2B) | Material | Refractive Index | Ex. 5-M Thickness (nm) | Ex. 5A Thickness (nm) |
|---|---|---|---|---|
| N/A | Air | 1.0 | | |
| 131 | $SiO_2$ | 1.48 | 82.2 | 85.1 |
| 130B | $Si_xN_y$ | 2.05 | 225.0 | 220.9 |
| 130A | $SiO_2$ | 1.48 | 15.7 | 19.6 |
| 130B | $Si_xN_y$ | 2.05 | 28.2 | 27.8 |
| 130A | $SiO_2$ | 1.48 | 25.0 | 25.0 |
| 110 | Glass substrate | 1.51 | | |
| Total thickness | | | 376.0 | 378.5 |
| Reflected color | Y | | 0.80 | 0.88 |
| | L* | | 7.2 | 9.4 |
| | a* | | −2.0 | −3.5 |
| | b* | | −4.4 | −2.5 |
| Hardness (GPa) | @ 100 nm depth | | | 10.9 |
| | @ 500 nm depth | | | 9.7 |
| Max hardness (from 100 nm to 500 nm depth) | Hmax (GPa) Depth (nm) | | | 12.8 172.0 |
| Film stress | (MPa) | | | −78 |
| Surface roughness, $R_a$ | (nm) | | | 1.03 |

Figure 6:
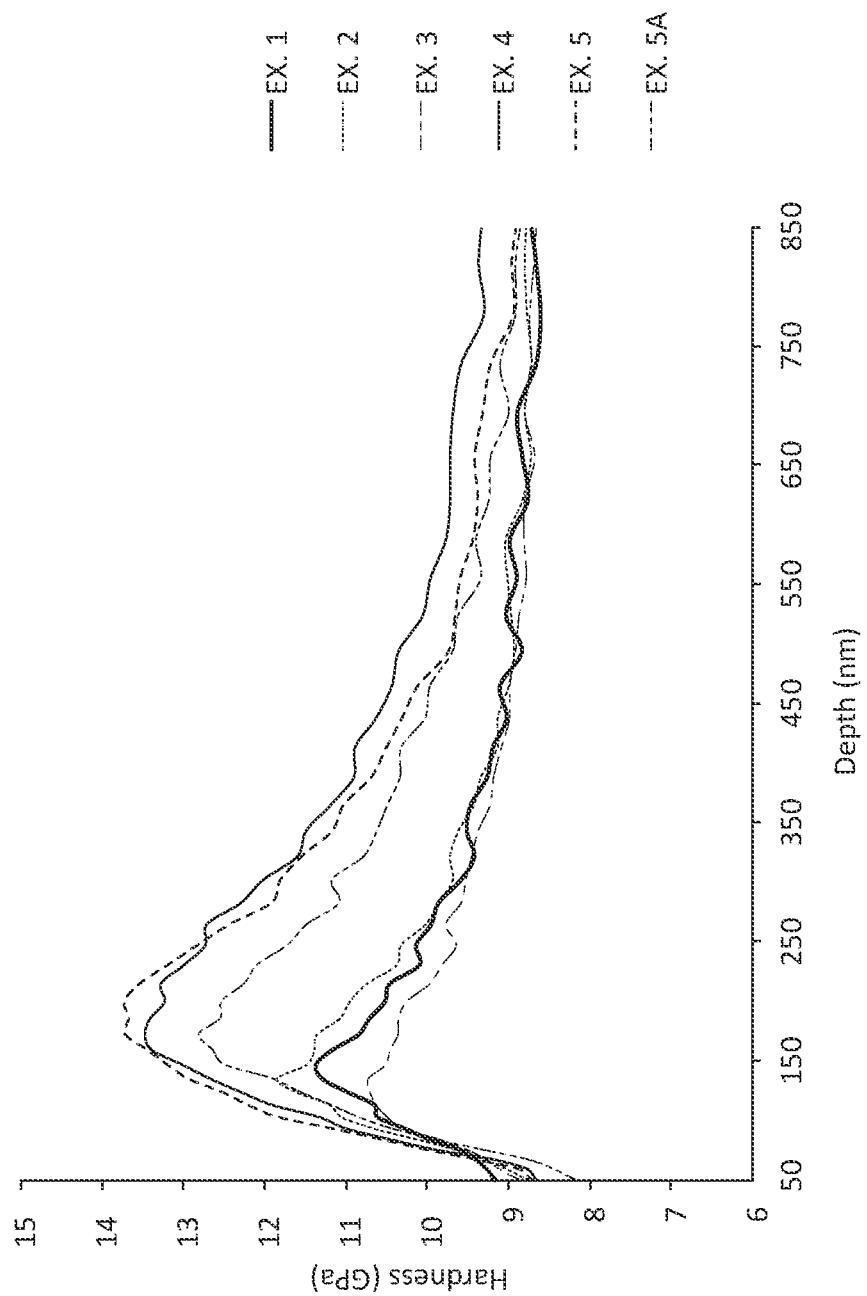
FIG. 6 is a plot of hardness vs. indentation depth for articles disclosed herein.

Referring now to FIG. 6, a plot of hardness vs. indentation depth for the as-fabricated articles of Examples 1, 2, 3, 4, 5 and 5A is provided. The data shown in FIG. 6 was generated by employing a Berkovich Indenter Hardness Test on the samples of Examples 1-5A. As is evident from FIG. 6, hardness values peak at an indentation depth from 150 to 250 nm. Further, the as-fabricated samples of Examples 4, 5 and 5A exhibited the highest hardness values at indentation depths of 100 nm and 500 nm, and the highest maximum hardness values within the indentation depth from 100 nm to 500 nm.

Figure 7:
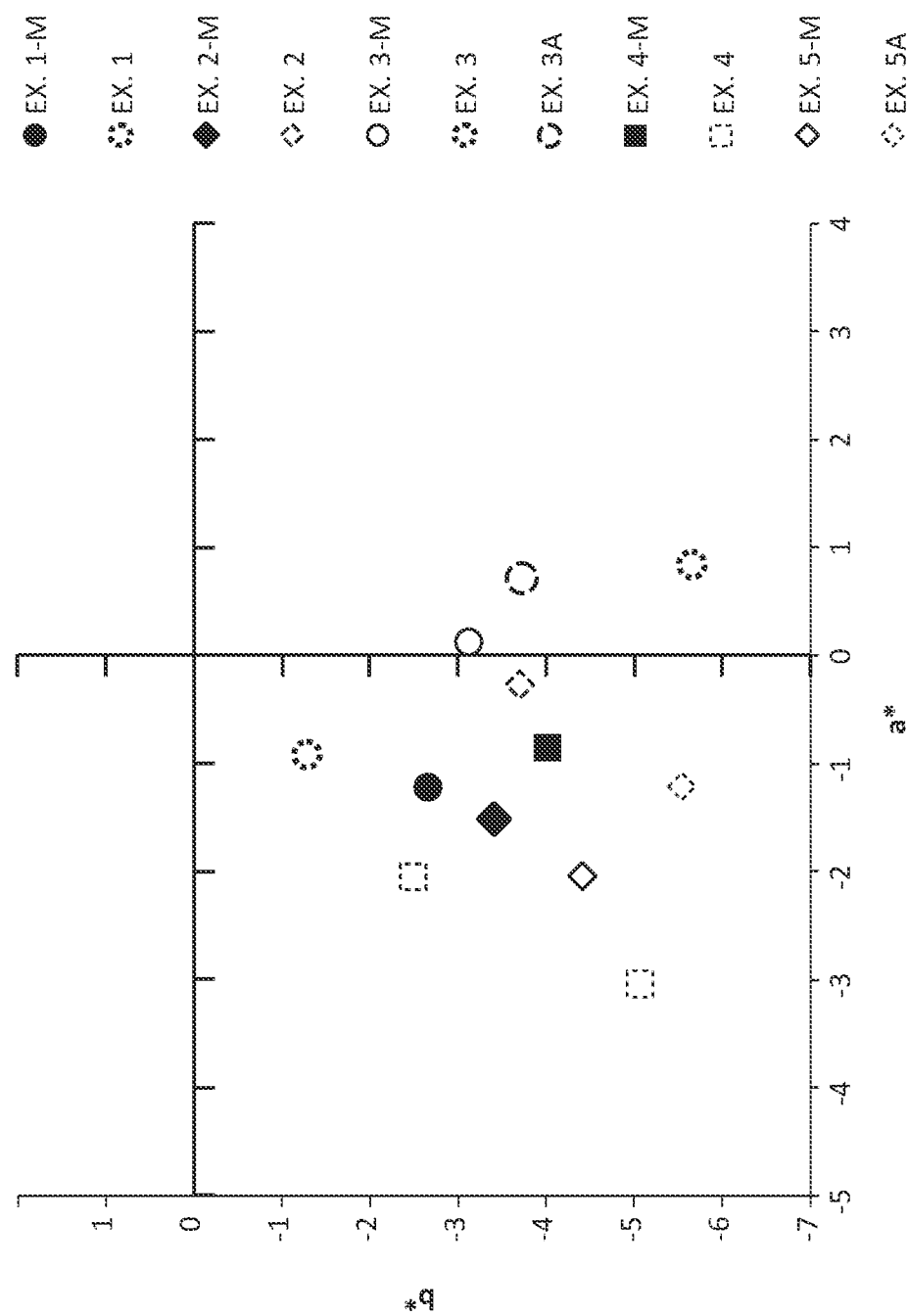
FIG. 7 is a plot of first-surface, reflected color coordinates measured at, or calculated for, near-normal incidence of articles disclosed herein.

Referring now to FIG. 7, a plot is provided of first-surface, reflected color coordinates measured at, or estimated for, near-normal incidence of the samples outlined above in Examples 1-5A. As is evident from FIG. 7, there is a fairly good correlation between the color coordinates exhibited by the as-fabricated and modeled samples from each of the Examples. Further, the color coordinates exhibited by the samples shown in FIG. 7 are indicative of limited color shifting associated with the anti-reflective coatings of the disclosure.

Example 6

Example 6 is directed to two sets of modeled samples. In particular, the modeled samples of Example 6 ("Ex. 3-M" and "Ex. 6-M") were assumed to employ a glass substrate having the same composition of the glass substrate employed in the as-fabricated samples of this example. Note that the Ex. 3-M modeled sample in Example 6 employs the same configuration of the anti-reflective coating as employed in Example 3, i.e., Ex. 3-M. The Ex. 6-M sample, however, has a similar anti-reflective coating configuration, but with a thicker low RI layer in contact with the substrate. More particularly, the anti-reflective coating of each of the modeled samples was assumed to have the layer materials and physical thickness as shown in Table 6 below. As is evident from the data shown in Table 6, the Ex. 6-M sample exhibits an even lower photopic average reflectance (i.e., Y value) as compared to the modeled sample, Ex. 3-M.

TABLE 6

Anti-reflective coating attributes for Example 6

| Reference No. (see FIG. 2B) | Material | Refractive Index | Ex. 3-M Thickness (nm) | Ex. 6-M Thickness (nm) |
|---|---|---|---|---|
| N/A | Air | 1.0 | | |
| 131 | $SiO_2$ | 1.48 | 90.7 | 89.3 |
| 130B | $Si_xN_y$ | 2.05 | 70.0 | 70.0 |
| 130A | $SiO_2$ | 1.48 | 23.3 | 26.3 |
| 130B | $Si_xN_y$ | 2..05 | 27.5 | 23.5 |
| 130A | $SiO_2$ | 1.48 | 25.0 | 53.6 |
| 110 | Glass substrate | 1.51 | | |
| Total thickness | | | 236.5 | 262.62 |
| Reflected color | Y | | 0.28 | 0.196 |
| | L* | | 2.5 | 1.8 |
| | a* | | 0.1 | 4.3 |
| | b* | | −3.1 | −5.2 |

Figure 8:
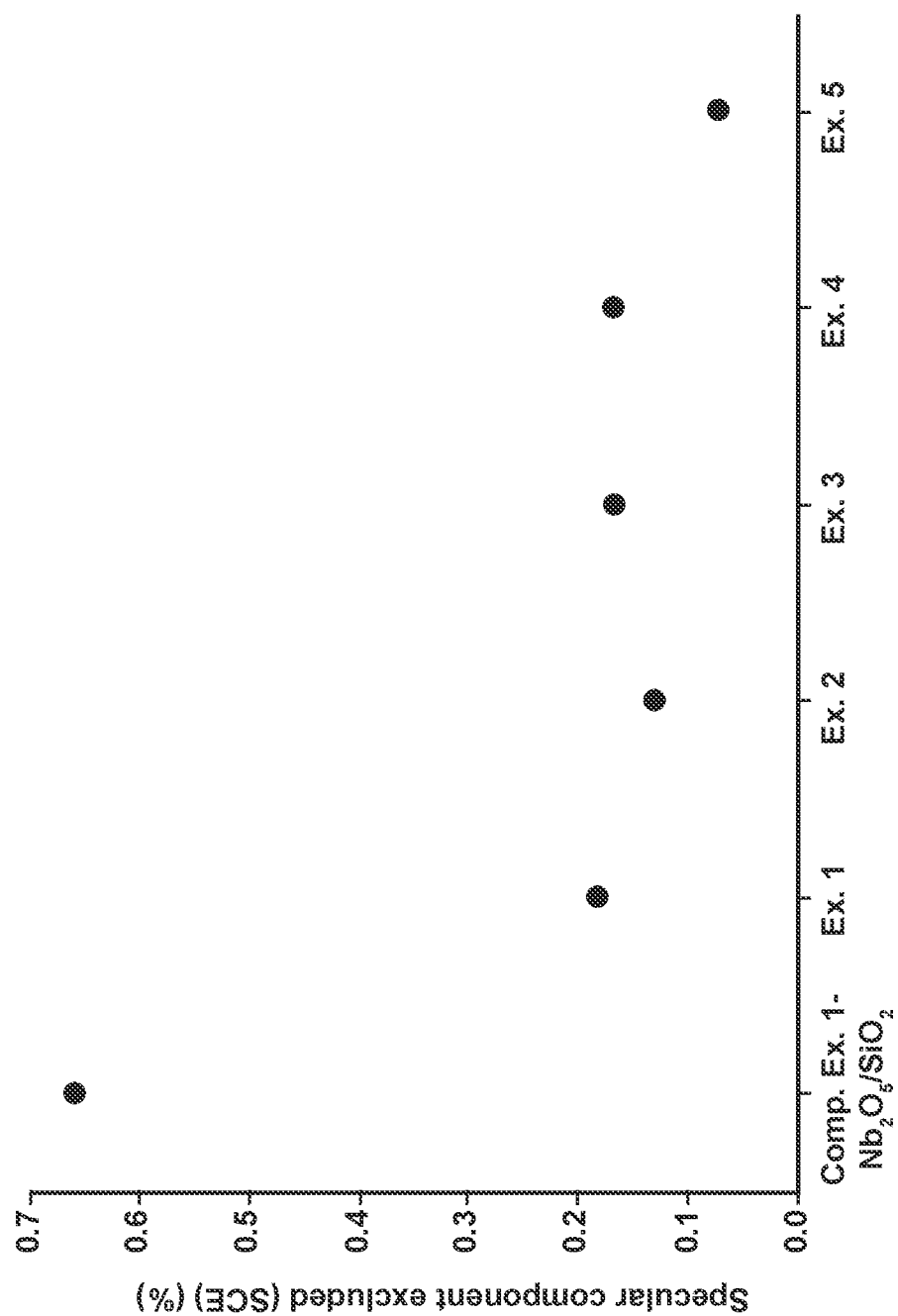
FIG. 8 is a plot of specular component excluded (SCE) values obtained from articles of the disclosure as subjected to the Alumina SCE Test and obtained from a comparative anti-reflective coating comprising niobia and silica.

Referring now to FIG. 8, a plot of specular component excluded (SCE) values is provided for samples of the prior Examples, specifically, Exs. 1-5, as obtained from samples subjected to the Alumina SCE Test. Further, SCE values are also reported from a comparative article ("Comp. Ex. 1"), which includes the same substrate as employed in Exs. 1-5 and has a conventional anti-reflective coating comprising niobia and silica. Notably, the samples from Examples 1-5 of the disclosure (i.e., Exs. 1-5) exhibited SCE values of about 0.2% or less, three times (or more) lower than the SCE value reported for the comparative sample (Comp. Ex. 1). As noted earlier, lower SCE values are indicative of less severe abrasion-related damage.

Figure 9:
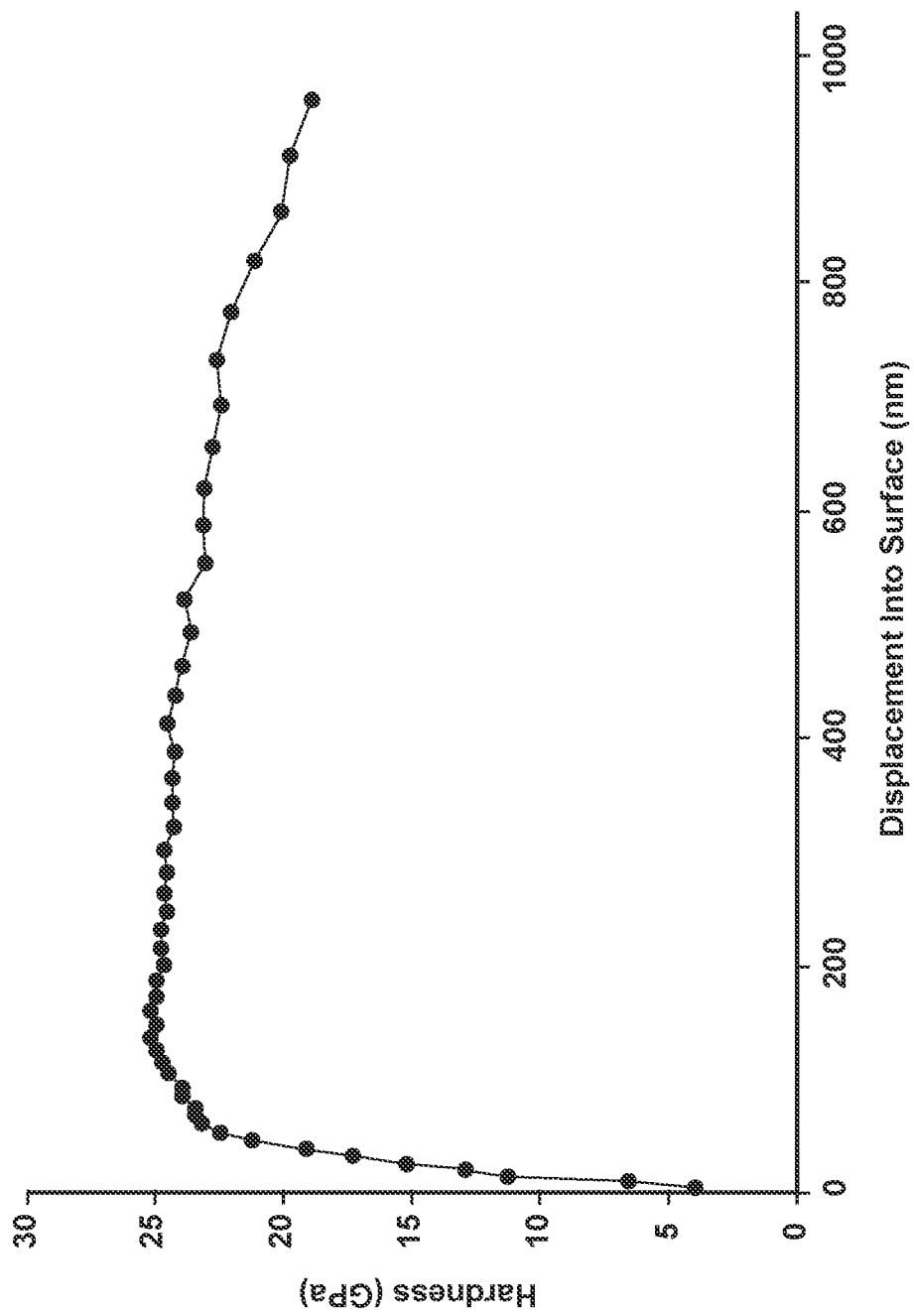
FIG. 9 is a plot of hardness vs. indentation depth for a hardness test stack of high refractive index layer material, according to an embodiment, that is suitable for use in the anti-reflective coatings and articles of the disclosure.

Referring now to FIG. 9, a plot is provided of hardness (GPa) vs. indentation depth (nm) for a hardness test stack of high refractive index layer material (i.e., a material suitable for a high RI index layer 130B as shown in FIGS. 2A and 2B) comprising $SiN_x$, consistent with a high RI layer 130B, according to the disclosure. Notably, the plot in FIG. 9 was obtained by employing the Berkovich Indenter Hardness Test on a test stack comprising a substrate consistent with those in Examples 1-5A and a high index RI layer comprising $SiN_x$ having a thickness of about 2 microns, to minimize the influence of the substrate and the other test-related articles described earlier in the disclosure. Accordingly, the hardness values observed in FIG. 9 on the 2 micron-thick sample are indicative of the actual intrinsic material hardness of the much thinner, high RI layers employed in the anti-reflective coatings 120 of the disclosure.

Example 7

The as-fabricated samples of Example 7 ("Exs. 7, 7A, 7B and 7C") were formed by providing a glass substrate having a nominal composition of 69 mol % $SiO_2$, 10 mol % $Al_2O_3$, 15 mol % $Na_2O$, and 5 mol % MgO and disposing an anti-reflective coating having five (5) layers (Exs. 7, 7A and 7B) and seven (7) layers (Ex. 7C) on the glass substrate, as shown in FIGS. 2A and 2B and Table 7 below. The anti-reflective coating (e.g., as consistent with the anti-reflective coatings 120 outlined in the disclosure) of each of the as-fabricated samples in this Example was deposited using a reactive sputtering process. Selected optical and mechanical properties of the samples in this example are also provided below in Table 7.

TABLE 7

Anti-reflective coating attributes for Example 7

| Reference No. (see FIGS. 2A and 2B) | Material | Refractive Index | Ex. 7 | Ex. 7A | Ex. 7B | Ex. 7C |
|---|---|---|---|---|---|---|
| | | | | Thickness (nm) | | |
| N/A | Air | 1.0 | | | | |
| 131 | $SiO_2$ | 1.47 | 81.12 | 85.01 | 85.89 | 85.46 |
| 130B | $Si_xN_y$ | 2.01 | 105.00 | 105.00 | 105.00 | 105.00 |
| 130A | $SiO_2$ | 1.41 | ** | ** | ** | 18.67 |
| 130B | $Si_xN_y$ | 1.97 | ** | ** | ** | 33.04 |
| 130A | $SiO_2$ | 1.41 | 22.31 | 19.22 | 18.34 | 53.78 |
| 130B | $Si_xN_y$ | 1.97 | 21.38 | 25.63 | 26.42 | 14.58 |
| 130A | $SiO_2$ | 1.41 | 25.00 | 25.00 | 25.00 | 25.00 |
| 110 | Glass substrate | 1.51 | | | | |
| Total thickness | | | 254.8 | 259.9 | 260.7 | 335.5 |
| Reflected color | Y/R | | 0.37 | 0.46 | 0.50 | 0.35 |
| (1-sided) | a* | | −0.01 | 0.37 | 0.44 | −0.20 |
| | b* | | −2.57 | −3.21 | −3.39 | −2.42 |
| Transmittance | T % (avg. 450 to 650 nm) | | 97.57 | 97.49 | 97.45 | 97.13 |
| (1-sided) | T % (avg. 930 to 950 nm) | | 88.22 | 89.46 | 89.70 | 90.50 |
| Hardness (GPa) | @ 100 nm depth | | 10.9 | 10.9 | 10.6 | 11.1 |
| | @ 500 nm depth | | 9.0 | 9.2 | 9.0 | 9.2 |
| Max hardness (from 100 nm to 500 nm depth) | Hmax (GPa) | | 11.7 | 11.6 | 11.6 | 12 |
| Film stress | (MPa) | | −762 | −787 | −802 | −690 |

Figure 10:
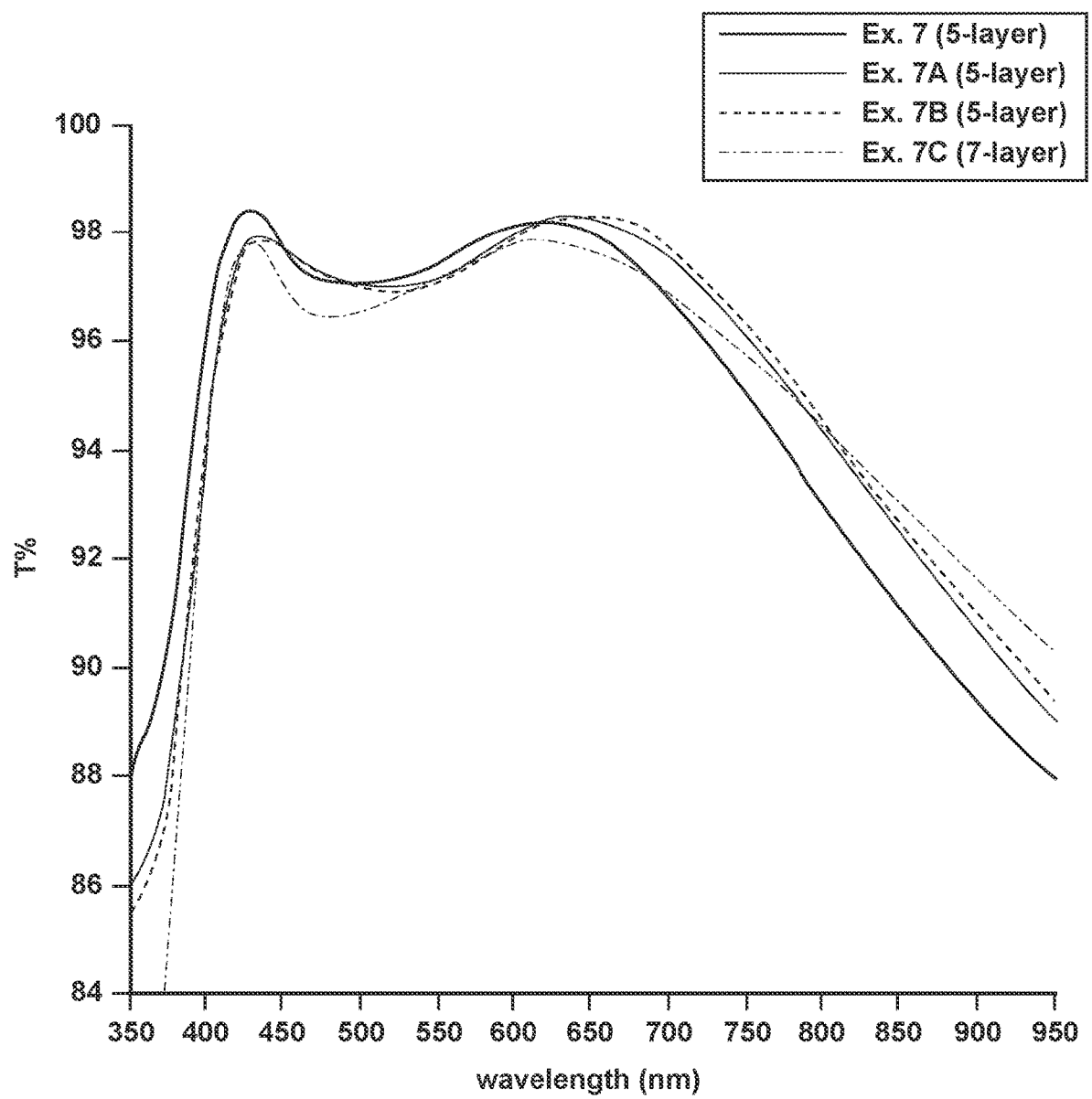
FIG. 10 is a plot of transmittance (one-sided) vs. wavelength of articles according to the disclosure that comprise five- and seven-layer anti-reflective coatings.

Referring now to FIG. 10, a plot is provided of first-surface, reflected transmittance (%) vs. wavelength (i.e., from 350 nm to 950 nm) measured at, or estimated for, near-normal incidence of the samples outlined above in Example 7 (Exs. 7, 7A, 7B and 7C). As is evident from FIG. 10, each of the samples in this example demonstrates an average transmittance of greater than 96% in the visible spectrum from 450 nm to 650 nm and an average transmittance of greater than or equal to 87% in the infrared spectrum from 800 nm to 950 nm, from 800 nm to 950 nm, and from 930 nm to 950 nm.

As used herein, the "$AlO_xN_y$," "$SiO_xN_y$," and "$Si_uAl_xO_yN_z$" materials in the disclosure include various aluminum oxynitride, silicon oxynitride and silicon aluminum oxynitride materials, as understood by those with ordinary skill in the field of the disclosure, described according to certain numerical values and ranges for the subscripts, "u," "x," "y," and "z". That is, it is common to describe solids with "whole number formula" descriptions, for example $Al_2O_3$. It is also common to describe solids using an equivalent "atomic fraction formula" description for example $Al_{0.4}O_{0.6}$, which is equivalent to $Al_2O_3$. In the atomic fraction formula, the sum of all atoms in the formula is 0.4+0.6=1, and the atomic fractions of Al and O in the formula are 0.4 and 0.6, respectively. Atomic fraction descriptions are described in many general textbooks and atomic fraction descriptions are often used to describe alloys. See, for example: (i) Charles Kittel, Introduction to Solid State Physics, seventh edition, John Wiley & Sons, Inc., NY, 1996, pp. 611-627; (ii) Smart and Moore, Solid State Chemistry, An introduction, Chapman & Hall University and Professional Division, London, 1992, pp. 136-151; and (iii) James F. Shackelford, Introduction to Materials Science for Engineers, Sixth Edition, Pearson Prentice Hall, New Jersey, 2005, pp. 404-418.

Again referring to the "$AlO_xN_y$," "$SiO_xN_y$," and "$Si_uAl_xO_yN_z$" materials in the disclosure, the subscripts allow those with ordinary skill in the art to reference these materials as a class of materials without specifying particular subscript values. To speak generally about an alloy, for example aluminum oxide, without specifying the particular subscript values, we can speak of $Al_vO_x$. The description $Al_vO_x$ can represent either $Al_2O_3$ or $Al_{0.4}O_{0.6}$. If v+x were chosen to sum to 1 (i.e., v+x=1), then the formula would be an atomic fraction description. Similarly, more complicated mixtures can be described, for example $Si_uAl_vO_xN_y$, where again, if the sum u+v+x+y were equal to 1, we would have the atomic fractions description case.

Once again referring to the "$AlO_xN_y$," "$SiO_xN_y$," and "$Si_uAl_xO_yN_z$" materials in the disclosure, these notations allow those with ordinary skill in the art to readily make comparisons to these materials and others. That is, atomic fraction formulas are sometimes easier to use in comparisons. For instance, an example alloy consisting of $(Al_2O_3)_{0.3}(AlN)_{0.7}$ is closely equivalent to the formula descriptions $Al_{0.448}O_{0.31}N_{0.241}$ and also $Al_{367}O_{254}N_{198}$. Another example alloy consisting of $(Al_2O_3)_{0.4}(AlN)_{0.6}$ is closely equivalent to the formula descriptions $Al_{0.438}O_{0.375}N_{0.188}$ and $Al_{37}O_{32}N_{16}$. The atomic fraction formulas $Al_{0.448}O_{0.31}N_{0.241}$ and $Al_{0.438}O_{0.375}N_{0.188}$ are relatively easy to compare to one another. For instance, Al decreased in atomic fraction by 0.01, O increased in atomic fraction by 0.065 and N decreased in atomic fraction by 0.053. It takes more detailed calculation and consideration to compare the whole number formula descriptions $Al_{367}O_{254}N_{198}$ and $Al_{37}O_{32}N_{16}$. Therefore, it is sometimes preferable to use atomic fraction formula descriptions of solids. Nonetheless, the use of $Al_vO_xN_y$ is general since it captures any alloy containing Al, O and N atoms.

As understood by those with ordinary skill in the field of the disclosure with regard to any of the foregoing materials (e.g., AlN) for the optical film 80, each of the subscripts, "u," "x," "y," and "z," can vary from 0 to 1, the sum of the subscripts will be less than or equal to one, and the balance of the composition is the first element in the material (e.g., Si or Al). In addition, those with ordinary skill in the field can recognize that "$Si_uAl_xO_yN_z$" can be configured such that "u" equals zero and the material can be described as "$AlO_xN_y$". Still further, the foregoing compositions for the optical film 80 exclude a combination of subscripts that would result in a pure elemental form (e.g., pure silicon, pure aluminum metal, oxygen gas, etc.). Finally, those with ordinary skill in the art will also recognize that the foregoing compositions may include other elements not expressly denoted (e.g., hydrogen), which can result in non-stoichiometric compositions (e.g., $SiN_x$ vs. $Si_3N_4$). Accordingly, the foregoing materials for the optical film can be indicative of the available space within a $SiO_2$—$Al_2O_3$—$SiN_x$—AlN or a $SiO_2$—$Al_2O_3$—$Si_3N_4$—AlN phase diagram, depending on the values of the subscripts in the foregoing composition representations.

Many variations and modifications may be made to the above-described embodiments of the disclosure without departing substantially from the spirit and various principles of the disclosure. All such modifications and variations are intended to be included herein within the scope of this disclosure and protected by the following claims. For example, the various features of the disclosure may be combined according to the following embodiments.

Embodiment 1. An article comprising:
an inorganic oxide substrate comprising opposing major surfaces; and
an optical film structure disposed on a first major surface of the inorganic oxide substrate, the optical film structure comprising a physical thickness from about 50 nm to less than 500 nm and one or more of a silicon-containing oxide, a silicon-containing nitride, and a silicon-containing oxynitride, the optical film structure,
wherein the article exhibits a hardness of 8 GPa or greater measured at an indentation depth of about 100 nm or a maximum hardness of 9 GPa or greater measured over an indentation depth range from about 100 nm to about 500 nm, the hardness and the maximum hardness measured by a Berkovich Indenter Hardness Test, and
further wherein the article exhibits a single-side photopic average reflectance that is less than 1%.

Embodiment 2. The article of Embodiment 1, wherein the article exhibits a hardness of 10 GPa or greater measured at an indentation depth of about 100 nm or a maximum hardness of 11 GPa or greater measured over an indentation depth range from about 100 nm to about 500 nm, the hardness and the maximum hardness measured by a Berkovich Indenter Hardness Test, wherein the physical thickness of the optical film structure is from about 200 nm to about 450 nm, and further wherein the article exhibits a single-side photopic average reflectance that is less than 0.6%.

Embodiment 3. The article of Embodiment 1 or Embodiment 2, wherein the article exhibits an a* value, in reflectance, from about −10 to +5 and a b* value, in reflectance, from −10 to +2, the a* and b* values each measured on the optical film structure at a near-normal incident illumination angle.

Embodiment 4. The article of Embodiment 1 or Embodiment 2, wherein the article exhibits an a* value, in reflectance, from about −4 to +4 and a b* value, in reflectance, from −6 to −1, the a* and b* values each measured on the optical film structure at a near-normal incident illumination angle.

Embodiment 5. The article of any one of Embodiments 1-4, wherein the article exhibits a maximum hardness of about 12 GPa or greater as measured by a Berkovich Indenter Hardness Test over an indentation depth range from about 100 nm to about 500 nm.

Embodiment 6. The article of any one of Embodiments 1-5, wherein the optical film structure comprises a residual stress in the range from about −1000 MPa (compressive) to about +50 MPa (tensile).

Embodiment 7. The article of any one of Embodiments 1-6, wherein the optical film structure comprises a silicon-containing oxide and a silicon-containing nitride, and further wherein the silicon-containing oxide is silicon oxide and the silicon-containing nitride is silicon nitride.

Embodiment 8. The article of any one of Embodiments 1-7, wherein the inorganic oxide substrate comprises a glass selected from the group consisting of soda lime glass, alkali aluminosilicate glass, alkali-containing borosilicate glass, and alkali aluminoborosilicate glass.

Embodiment 9. The article of Embodiment 8, wherein the glass is chemically strengthened and comprises a compressive stress (CS) layer with a peak CS of 250 MPa or more, the CS layer extending within the chemically strengthened glass from the first major surface to a depth of compression (DOC) of about 10 microns or more.

Embodiment 10. The article of any one of Embodiments 1-9, further comprising any one or more of an easy-to-clean coating, a diamond-like coating, and a scratch resistant coating, disposed on the optical film structure.

Embodiment 11. The article of any one of Embodiments 1-10, wherein the article exhibits a specular component excluded (SCE) value of 0.2% or less, as measured according to an Alumina SCE Test.

Embodiment 12. An article comprising:
an inorganic oxide substrate comprising opposing major surfaces; and
an optical film structure disposed on a first major surface of the inorganic oxide substrate, the optical film structure comprising a physical thickness from about 50 nm to less than 500 nm and a plurality of alternating high index and low index layers with a first low index layer on the first major surface and a capping low index layer,
wherein each layer comprises one or more of a silicon-containing oxide, a silicon-containing nitride, and a silicon-containing oxynitride,
wherein a refractive index of the low index layers is within a range of a refractive index of the substrate such that the refractive index of the low index layers is less than about 1.8, and wherein the high index layer comprises a refractive index that is greater than 1.8,
wherein the high index layer exhibits a maximum hardness of 18 GPa or greater as measured by a Berkovich Indenter Hardness Test over an indentation depth from about 100 nm to about 500 nm on a hardness test stack comprising the high index layer with a physical thickness of about 2 microns disposed on the inorganic oxide substrate, and
further wherein the article exhibits a single-side photopic average reflectance that is less than 1%.

Embodiment 13. The article of Embodiment 12, wherein the maximum hardness exhibited by the high index layer is 22 GPa or greater as measured by the Berkovich Indenter Hardness Test over an indentation depth from about 100 nm to about 500 nm on the hardness test stack comprising the high index layer with the physical thickness of about 2 microns disposed on the inorganic substrate, and wherein the physical thickness of the optical film structure is from about 200 nm to about 450 nm, and further wherein the article exhibits a single-side photopic average reflectance that is less than 0.6%.

Embodiment 14. The article of Embodiment 12 or Embodiment 13, wherein the article exhibits an a* value, in reflectance, from about −10 to +5 and a b* value, in reflectance, from −10 to +2, the a* and b* values each measured on the optical film structure at a near-normal incident illumination angle.

Embodiment 15. The article of Embodiment 12 or Embodiment 13, wherein the article exhibits an a* value, in reflectance, from about −4 to +4 and a b* value, in reflectance, from −6 to −1, the a* and b* values each measured on the optical film structure at a near-normal incident illumination angle.

Embodiment 16. The article of any one of Embodiments 12-15, wherein the optical film structure comprises a residual stress in the range from about −1000 MPa (compressive) to about +50 MPa (tensile).

Embodiment 17. The article of any one of Embodiments 12-16, wherein the inorganic oxide substrate comprises a glass selected from the group consisting of soda lime glass, alkali aluminosilicate glass, alkali-containing borosilicate glass and alkali aluminoborosilicate glass.

Embodiment 18. The article of Embodiment 17, wherein the glass is chemically strengthened and comprises a compressive stress (CS) layer with a peak CS of 250 MPa or more, the CS layer extending within the chemically strengthened glass from the first major surface to a depth of compression (DOC) of about 10 microns or more.

Embodiment 19. The article of any one of Embodiments 12-18, further comprising any one or more of an easy-to-clean coating, a diamond-like coating, and a scratch resistant coating, disposed on the optical film structure.

Embodiment 20. The article of any one of Embodiments 12-19, wherein the plurality of alternating high index and low index layers is at least four (4) layers, wherein each layer comprises one or more of a silicon-containing oxide and a silicon-containing nitride, and further wherein the silicon-containing oxide is silicon oxide and the silicon-containing nitride is silicon nitride.

Embodiment 21. The article of any one of Embodiments 12-20, wherein the physical thickness of the high index layer adjacent to the capping low index layer is about 70 nm or more, and the physical thickness of the capping low index layer is about 80 nm or more.

Embodiment 22. The article of any one of Embodiments 12-21, wherein the article exhibits a specular component excluded (SCE) value of 0.2% or less, as measured according to an Alumina SCE Test.

Embodiment 23. An article comprising:
an inorganic oxide substrate comprising opposing major surfaces; and
an optical film structure disposed on a first major surface of the inorganic oxide substrate, the optical film structure comprising a physical thickness from about 50 nm to less than 500 nm and a plurality of alternating high index and low index layers with a first low index layer on the first major surface of the substrate and a capping low index layer,
wherein each layer comprises one or more of a silicon-containing oxide, a silicon-containing nitride, and a silicon-containing oxynitride,
wherein a refractive index of the low index layers is in a range of a refractive index of the inorganic oxide substrate such that the refractive index of the low index layers is less than about 1.8, and wherein the high index layer comprises a refractive index that is greater than 1.8,
wherein the optical film structure further comprises 30% or more of the high index layer by volume, and further wherein the article exhibits a single-side photopic average reflectance that is less than 1%.

Embodiment 24. The article of Embodiment 23, wherein the optical film structure further comprises 50% or more of the high index layer by volume.

Embodiment 25. The article of Embodiment 23 or Embodiment 24, wherein the article exhibits an a* value, in reflectance, from about −10 to +5 and a b* value, in reflectance, from −10 to +2, the a* and b* values each measured on the optical film structure at a near-normal incident illumination angle.

Embodiment 26. The article of Embodiment 23 or Embodiment 24, wherein the article exhibits an a* value, in reflectance, from about −4 to +4 and a b* value, in reflectance, from −6 to −1, the a* and b* values each measured on the optical film structure at a near-normal incident illumination angle.

Embodiment 27. The article of any one of Embodiments 23-26, wherein the optical film structure comprises a residual stress in the range from about −1000 MPa (compressive) to about +50 MPa (tensile).

Embodiment 28. The article of any one of Embodiments 23-27, wherein the inorganic oxide substrate comprises a glass selected from the group consisting of soda lime glass, alkali aluminosilicate glass, alkali-containing borosilicate glass and alkali aluminoborosilicate glass.

Embodiment 29. The article of Embodiment 28, wherein the glass is chemically strengthened and comprises a compressive stress (CS) layer with a peak CS of 250 MPa or more, the CS layer extending within the chemically strengthened glass from the first major surface to a depth of compression (DOC) of about 10 microns or more.

Embodiment 30. The article of any one of Embodiments 23-29, further comprising any one or more of an easy-to-clean coating, a diamond-like coating, and a scratch resistant coating, disposed on the optical film structure.

Embodiment 31. The article of any one of Embodiments 23-30, wherein the plurality of alternating high index and low index layers is at least four (4) layers, wherein each layer comprises one or more of a silicon-containing oxide and a silicon-containing nitride, and further wherein the silicon-containing oxide is silicon oxide and the silicon-containing nitride is silicon nitride.

Embodiment 32. The article of any one of Embodiments 23-31, wherein the high index layer that is adjacent to the capping low index layer comprises a physical thickness of about 70 nm or more, and the capping low index layer comprises a physical thickness of about 80 nm or more.

Embodiment 33. The article of any one of Embodiments 23-32, wherein the article exhibits a specular component excluded (SCE) value of 0.2% or less, as measured according to an Alumina SCE Test.

Embodiment 34. An article comprising:
an inorganic oxide substrate comprising opposing major surfaces; and
an optical film structure disposed on a first major surface of the inorganic oxide substrate, the optical film structure comprising a plurality of alternating high index and low index layers with a first low index layer on the first major surface of the substrate and a capping low index layer,
wherein a refractive index of the low index layers is within a range of a refractive index of the substrate such that the refractive index of the low index layers is less than about 1.8, and wherein the high index layer comprises a refractive index that is greater than 1.8, wherein the article exhibits a hardness of 8 GPa or greater measured at an indentation depth of about 100 nm or a maximum hardness of 9 GPa or greater measured over an indentation depth range from about 100 nm to about 500 nm, the hardness and the maximum hardness measured by a Berkovich Indenter Hardness Test, wherein the article exhibits a single-surface photopic average reflectance that is less than 1%, wherein the optical film structure further comprises 35% or more of the high index layer by volume, wherein the high index layer exhibits a maximum hardness of 18 GPa or greater as measured by a Berkovich Indenter Hardness Test over an indentation depth from about 100 nm to about 500 nm on a hardness test stack comprising the high index layer with a physical thickness of about 2 microns disposed on the inorganic substrate, and further wherein the article exhibits an a* value, in reflectance, from about −10 to +5 and a b* value, in reflectance, from −10 to +2, the a* and b* values each measured on the optical film structure at a near-normal incident illumination angle.

Embodiment 35. The article of Embodiment 34, wherein the high index layer exhibits a maximum hardness of 21 GPa or greater as measured by a Berkovich Indenter Hardness Test over an indentation depth from about 100 nm to about 500 nm on a hardness test stack comprising the high index layer with a physical thickness of about 2 microns disposed on the inorganic substrate.

Embodiment 36. The article of Embodiment 34 or Embodiment 35, wherein the article exhibits a specular component excluded (SCE) of 0.2% or less, as measured according to an Alumina SCE Test.

Embodiment 37. The article of any one of Embodiments 1-11, wherein the article exhibits a single-side average transmittance of greater than or equal to 87% in the infrared spectrum from 900 nm to 1000 nm.

Embodiment 38. The article of any one of Embodiments 12-22, wherein the article exhibits a single-side average transmittance of greater than or equal to 87% in the infrared spectrum from 900 nm to 1000 nm.

Embodiment 39. The article of any one of Embodiments 23-33, wherein the article exhibits a single-side average transmittance of greater than or equal to 87% in the infrared spectrum from 900 nm to 1000 nm.

Embodiment 40. The article of any one of Embodiments 34-36, wherein the article exhibits a single-side average transmittance of greater than or equal to 87% in the infrared spectrum from 900 nm to 1000 nm.

Embodiment 41. A consumer electronic product, comprising:
a housing comprising a front surface, a back surface and side surfaces;
electrical components at least partially within the housing, the electrical components comprising a controller, a memory, and a display, the display at or adjacent the front surface of the housing; and
a cover substrate disposed over the display,
wherein at least one of a portion of the housing or the cover substrate comprises the article of any one of Embodiments 1-40.

What is claimed is:

1. An article comprising:
an inorganic oxide substrate comprising opposing major surfaces; and
an optical film structure disposed on a first major surface of the inorganic oxide substrate, the optical film structure comprising a physical thickness from about 50 nm to less than 500 nm, a plurality of alternating high index and low index layers with a first low index layer on the first major surface, and a capping low index layer,
wherein each low index layer comprises a silicon-containing oxide and each high index layer comprises silicon nitride or silicon oxynitride,
wherein the article exhibits a hardness of 8 GPa or greater measured at an indentation depth of about 100 nm or a maximum hardness of 9 GPa or greater measured over an indentation depth range from about 100 nm to about 300 nm, the hardness and the maximum hardness measured by a Berkovich Indenter Hardness Test,
wherein the first low index layer is in direct contact with the first major surface of the substrate,
wherein a high index layer is adjacent to the capping low index layer and it has an optical thickness from about 45 nm to about 450 nm, and
further wherein one of the high refractive index layers in the optical film structure is the thickest layer in the layers of the optical film structure below the capping index layer.

2. The article of claim 1, wherein the inorganic oxide substrate comprises a glass ceramic or a glass selected from the group consisting of soda lime glass, alkali aluminosilicate glass, alkali-containing borosilicate glass, and alkali aluminoborosilicate glass.

3. The article of claim 1, further comprising any one or more of an easy-to-clean coating, a diamond-like coating, and a scratch resistant coating, disposed on the optical film structure.

4. The article of claim 1, wherein the optical film structure comprises a physical thickness from about 50 nm to about 350 nm.

5. The article of claim 1, wherein the plurality of alternating high index and low index layers is four (4) layers or less, wherein a combined physical thickness of the high index layers is 30% or greater than the physical thickness of the optical film structure, and further wherein the capping layer has a physical thickness of 80 nm or more.

6. The article of claim 1, wherein the physical thickness of the optical film structure is from about 50 nm to less than 350 nm, wherein a combined physical thickness of the high index layers is 30% or greater than the physical thickness of the optical film structure, and further wherein the capping layer has a physical thickness of 80 nm or more.

7. The article of claim 1, wherein the physical thickness of the optical film structure is from about 50 nm to less than 325 nm, wherein a combined physical thickness of the high index layers is 35% or greater than the physical thickness of the optical film structure, and further wherein the capping layer has a physical thickness of 100 nm or less.

8. The article of claim 1, wherein the article exhibits a single-side photopic average light reflectance that is less than 2%.

9. The article of claim 1, wherein the article exhibits a single-side average light reflectance that is less than 2% over an optical wavelength regime in a range from about 400 nm to about 800 nm.

10. A consumer electronic product, comprising:
a housing comprising a front surface, a back surface and side surfaces;
electrical components at least partially within the housing, the electrical components comprising a controller, a memory, and a display, the display at or adjacent to the front surface of the housing; and a cover substrate disposed over the display,
wherein at least one of a portion of the housing or the cover substrate comprises the article of claim 1.

11. An article comprising:
an inorganic oxide substrate comprising opposing major surfaces; and
an optical film structure disposed on a first major surface of the inorganic oxide substrate, the optical film structure comprising a physical thickness from about 50 nm to less than 500 nm, a plurality of alternating high index and low index layers with a first low index layer in direct contact with the first major surface of the substrate, and a capping low index layer,
wherein each low index layer comprises a silicon-containing oxide and each high index layer comprises silicon nitride or silicon oxynitride,
wherein the article exhibits a hardness of 8 GPa or greater measured at an indentation depth of about 100 nm or a maximum hardness of 9 GPa or greater measured over an indentation depth range from about 100 nm to about 300 nm, the hardness and the maximum hardness measured by a Berkovich Indenter Hardness Test,
wherein a refractive index of the low index layers is in a range of a refractive index of the inorganic oxide substrate such that the refractive index of the low index layers is less than about 1.8, wherein the high index layer comprises a refractive index that is greater than 1.8, and
further wherein the total volume of each of the high index layers comprises about 30% to less than 50% of the volume of the optical film structure, and
further wherein one of the high refractive index layers in the optical film structure is the thickest layer in the layers of the optical film structure below the capping index layer.

12. The article of claim 11, wherein the optical film structure comprises a physical thickness from about 50 nm to about 350 nm.

13. The article of claim 11, wherein the plurality of alternating high index and low index layers is less than six (6) layers.

14. The article of claim 11, wherein the total volume of each of the high index layers comprises about 30% to about 45% of the volume of the optical film structure.

15. A consumer electronic product, comprising:
a housing comprising a front surface, a back surface and side surfaces;
electrical components at least partially within the housing, the electrical components comprising a controller, a memory, and a display, the display at or adjacent to the front surface of the housing; and
a cover substrate disposed over the display,
wherein at least one of a portion of the housing or the cover substrate comprises the article of claim 11.

16. An article comprising:
an inorganic oxide substrate comprising opposing major surfaces; and
an optical film structure disposed on a first major surface of the inorganic oxide substrate, the optical film structure comprising a physical thickness from about 50 nm to less than 500 nm, a plurality of alternating high index and low index layers with a first low index layer in direct contact with the first major surface, and a capping low index layer,
wherein each low index layer comprises a silicon-containing oxide and each high index layer comprises silicon nitride or silicon oxynitride,
wherein the article exhibits a hardness of 8 GPa or greater measured at an indentation depth of about 100 nm or a maximum hardness of 9 GPa or greater measured over an indentation depth range from about 100 nm to about 300 nm, the hardness and the maximum hardness measured by a Berkovich Indenter Hardness Test, and
further wherein one of the high refractive index layers in the optical film structure is the thickest layer in the layers of the optical film structure below the capping index layer.

17. The article of claim 16, wherein the inorganic oxide substrate is a ceramic substrate.

18. The article of claim 16, wherein a combined physical thickness of the high index layers is 30% or greater than the physical thickness of the optical film structure, and further wherein the capping layer has a physical thickness of 80 nm or more.

19. The article of claim 16, wherein a combined physical thickness of the high index layers is 30% or greater than the physical thickness of the optical film structure, and further wherein the capping layer has a physical thickness of 100 nm or less.

20. An article comprising:
an inorganic oxide substrate comprising opposing major surfaces; and
an optical film structure disposed on a first major surface of the inorganic oxide substrate, the optical film structure comprising a physical thickness from about 50 nm to less than 500 nm, a plurality of alternating high index and low index layers with a first low index layer on the first major surface, and a capping low index layer,
wherein each low index layer comprises a silicon-containing oxide and each high index layer comprises silicon nitride or silicon oxynitride,
wherein the article exhibits a hardness of 8 GPa or greater measured at an indentation depth of about 100 nm or a maximum hardness of 9 GPa or greater measured over an indentation depth range from about 100 nm to about 300 nm, the hardness and the maximum hardness measured by a Berkovich Indenter Hardness Test,
wherein the first low index layer is in direct contact with the first major surface of the substrate,
wherein a high index layer is adjacent to the capping low index layer and it has an optical thickness from about 45 nm to about 450 nm,
wherein the plurality of alternating high index and low index layers is six (6) layers or less, wherein a combined physical thickness of the high index layers is from about 30% to 45% of the physical thickness of the optical film structure, and
further wherein one of the high refractive index layers in the optical film structure is the thickest layer in the layers of the optical film structure below the capping index layer.

21. The article of claim 20, wherein the capping layer has a physical thickness of 80 nm or more.

22. The article of claim 20, wherein the capping layer has a physical thickness of 100 nm or less.

* * * * *

UNITED STATES PATENT AND TRADEMARK OFFICE
CERTIFICATE OF CORRECTION

| | | |
|---|---|---|
| PATENT NO. | : 11,906,699 B2 | Page 1 of 3 |
| APPLICATION NO. | : 17/571616 | |
| DATED | : February 20, 2024 | |
| INVENTOR(S) | : Shandon Dee Hart et al. | |

It is certified that error appears in the above-identified patent and that said Letters Patent is hereby corrected as shown below:

On the Title Page

On the page 6, in Column 1, under item (56), "Other Publications", Line 11, delete "Incluence" and insert -- Influence --.

On the page 6, in Column 1, under item (56), "Other Publications", Line 12, delete "NIAi" and insert -- N/AI --.

On the page 6, in Column 1, under item (56), "Other Publications", Line 17, delete "notride" and insert -- nitride --.

On the page 6, in Column 1, under item (56), "Other Publications", Line 20, delete "Al203" and insert -- Al2O3 --.

On the page 6, in Column 1, under item (56), "Other Publications", Line 24, delete "Nanoindenlalion"," and insert -- Nanoindentation", --.

On the page 6, in Column 1, under item (56), "Other Publications", Line 24, delete "Maler." and insert -- Mater. --.

On the page 6, in Column 1, under item (56), "Other Publications", Line 26, delete "Ytiria-Stabilized" and insert -- Yttria-Stabilized --.

On the page 6, in Column 1, under item (56), "Other Publications", Line 35, delete "AIN" and insert -- ALN --.

On the page 6, in Column 1, under item (56), "Other Publications", Line 57, delete "AIN" and insert Signed and Sealed this
Third Day of February, 2026

John A. Squires
*Director of the United States Patent and Trademark Office*

CERTIFICATE OF CORRECTION (continued)
U.S. Pat. No. 11,906,699 B2

-- ALN --.

On the page 6, in Column 2, under item (56), "Other Publications", Line 8, delete "AI-0.5% Cu Interconects" and insert -- AI-0.5% Cu Interconnects --.

On the page 6, in Column 2, under item (56), "Other Publications", Line 14, delete "consideratino" and insert -- consideration --.

On the page 6, in Column 2, under item (56), "Other Publications", Line 15, delete "Cotings" and insert -- Coatings --.

On the page 6, in Column 2, under item (56), "Other Publications", Line 45, delete "Coaling" and insert -- Coating --.

On the page 6, in Column 2, under item (56), "Other Publications", Line 53, delete "Characatization" and insert -- Characterization --.

On the page 6, in Column 2, under item (56), "Other Publications", Line 55, delete "Physices" and insert -- Physics --.

On the page 6, in Column 2, under item (56), "Other Publications", Line 65, delete "Ceramiczynych," and insert -- Ceramicznych, --.

On the page 7, in Column 1, under item (56), "Other Publications", Line 15, delete "Si02" and insert -- SiO2 --.

On the page 7, in Column 1, under item (56), "Other Publications", Line 21, delete "Zr02/Al2O3 nanolamianted" and insert -- ZrO2/Al2O3 nanolaminated --.

On the page 7, in Column 1, under item (56), "Other Publications", Line 28, delete "Yttria-Stabilzed Zrconia" and insert -- Yttria-Stabilized Zirconia --.

On the page 7, in Column 1, under item (56), "Other Publications", Line 33, delete "pholoelectron" and insert -- photoelectron --.

On the page 7, in Column 1, under item (56), "Other Publications", Line 41, delete "Sceince" and insert -- Science --.

On the page 7, in Column 1, under item (56), "Other Publications", Line 46, delete "Sputiering" and insert -- Sputtering --.

On the page 7, in Column 1, under item (56), "Other Publications", Line 47, delete "Sputiering";" and insert -- Sputtering"; --.

CERTIFICATE OF CORRECTION (continued)
U.S. Pat. No. 11,906,699 B2

On the page 7, in Column 1, under item (56), "Other Publications", Line 52, delete "oxyynitride" and insert -- oxynitride --.

On the page 7, in Column 2, under item (56), "Other Publications", Line 2, delete "Nanoindenlalion."" and insert -- Nanoindentation." --.

On the page 7, in Column 2, under item (56), "Other Publications", Line 5, delete "iemperature" and insert -- temperature --.

On the page 7, in Column 2, under item (56), "Other Publications", Line 30, delete "IR-Reflecling" and insert -- IR-Reflecting --.